(12) United States Patent
Feng et al.

(10) Patent No.: US 10,823,701 B2
(45) Date of Patent: *Nov. 3, 2020

(54) METHODS AND SYSTEMS FOR NONDESTRUCTIVE MATERIAL INSPECTION

(71) Applicant: ExxonMobil Research and Engineering Company, Annandale, NJ (US)

(72) Inventors: Lang Feng, New York, NY (US); Qiuzi Li, Clinton, NJ (US); Harry W. Deckman, Clinton, NJ (US); Paul M. Chaikin, New York, NY (US); Neeraj S. Thirumalai, Easton, PA (US); Shiun Ling, Washington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/165,024

(22) Filed: Oct. 19, 2018

(65) Prior Publication Data
US 2019/0145934 A1    May 16, 2019

Related U.S. Application Data

(60) Provisional application No. 62/585,167, filed on Nov. 13, 2017.

(51) Int. Cl.
*G01N 27/90* (2006.01)
*G01N 27/72* (2006.01)
(Continued)

(52) U.S. Cl.
CPC ......... *G01N 27/9033* (2013.01); *G01N 27/72* (2013.01); *G01N 27/82* (2013.01);
(Continued)

(58) Field of Classification Search
CPC .. G01N 27/82; G01N 27/9046; G01N 29/043; G01N 27/72
(Continued)

(56) References Cited

U.S. PATENT DOCUMENTS

| | | | |
|---|---|---|---|
| 5,028,869 | A | 7/1991 | Dobmann et al. |
| 5,144,565 | A | 9/1992 | Brown et al. |

(Continued)

FOREIGN PATENT DOCUMENTS

| | | |
|---|---|---|
| CN | 204065016 U | 12/2014 |
| EP | 0833150 A2 | 4/1998 |

(Continued)

OTHER PUBLICATIONS

The International Search Report and Written Opinion of PCT/US2018/056619 dated Jan. 17, 2019.
(Continued)

*Primary Examiner* — Reena Aurora
(74) *Attorney, Agent, or Firm* — Robert A. Migliorini; Kristina Okafor

(57) ABSTRACT

A method for determining one or more material conditions of a hysteretic ferromagnetic material and/or a nonhysteretic material can include interrogating the hysteretic ferromagnetic material and/or the nonhysteretic material with an input time varying magnetic field and detecting a magnetic response and/or acoustic response over time from the hysteretic ferromagnetic material and/or the nonhysteretic material. The method can also include determining a time dependent nonlinear characteristic of the received magnetic response and/or acoustic response and correlating the time dependent nonlinear characteristic of the received magnetic response or acoustic response to one or more material conditions of the material.

23 Claims, 32 Drawing Sheets

(51) Int. Cl.
G01N 27/82 (2006.01)
G01N 29/24 (2006.01)
G01N 29/04 (2006.01)
(52) U.S. Cl.
CPC ......... *G01N 27/9046* (2013.01); *G01N 29/04* (2013.01); *G01N 29/2412* (2013.01)
(58) Field of Classification Search
USPC ....................................................... 324/222
See application file for complete search history.

(56) References Cited

U.S. PATENT DOCUMENTS

| | | | |
|---|---|---|---|
| 6,201,391 B1 | 3/2001 | Burkhardt et al. | |
| 6,239,593 B1 | 5/2001 | Burkhardt et al. | |
| 6,492,808 B1 | 12/2002 | Sukhorukov et al. | |
| 6,847,207 B1 | 1/2005 | Veach et al. | |
| 7,086,285 B2 * | 8/2006 | Reed .................... | G01N 29/043 73/597 |
| 2008/0042645 A1 | 2/2008 | Kaack et al. | |
| 2012/0253696 A1 | 10/2012 | Pearson et al. | |
| 2012/0306483 A1 | 12/2012 | Boenisch | |
| 2015/0330946 A1 * | 11/2015 | Davis .................... | G01N 17/00 324/252 |
| 2017/0168022 A1 * | 6/2017 | Georgeson ........... | G01N 29/225 |
| 2018/0340858 A1 * | 11/2018 | Jahanbin ............... | G01N 29/11 |

FOREIGN PATENT DOCUMENTS

| | | |
|---|---|---|
| GB | 1567166 A | 5/1980 |
| GB | 2492745 A | 1/2013 |

OTHER PUBLICATIONS

The International Search Report and Written Opinion of PCT/US2018/056626 dated Jan. 8, 2019.
The International Search Report and Written Opinion of PCT/US2018/056637 dated Feb. 12, 2019.
The International Search Report and Written Opinion of PCT/US2018/056645 dated Mar. 19, 2019.
Rigmant et al., "Instruments for Magnetic Phase Analysis of Articles Made of Austenitic Corrosion-Resistant Steels", Russian Journal of Nondestructive Testing, vol. 41, No. 11, 2005, pp. 701-709.
Byeon et al., "Magnetic Evaluation of Microstructures and Strength of Euctectoid Steel", Materials Transactions 44 (2003): 2184-2190.
Pollard et al., "Managing HIC Affected Pipelines Utilizing MFL Hard Spot Technology", Corrosion 2004, Mar. 28-Apr. 1, 2004, New Orleans, LA.
Jiles et al., "Investigation of the microstructural dependence of the magnetic properties of 4130 alloy steels and carbon steels for NDE", Review of Progress in Quantitative Nondestructive Evaluation, Ed. D.O. Thompson et al., New York, Springer, 1987, 1681-1690.
Crouch et al., "Nonlinear harmonic monitoring of gouged dents in pipeline specimens under cyclic loading", International Pipeline Conference, Sep. 25-29, 2006, Calgary, Alberta, Canada.
Dobmann et al., "Magnetic tangential field-strength-inspection a further NDT-tool for 3MA", Nondestructive characterization of Materials, Ed. P. Holler et al., Heidelberg, Springer-Verlag, 1989, 636-643.
Dobmann et al., "Industrial application of 3MA—micromagnetic multiparameter microstructure and stress analysis", 5th International Conference Structural Integrity of Welded Structures, Nov. 20-21, 2007, Timisora, Romania.
Deng et al., "Electromagnetic imaging methods for nondestructive evaluation applications", Sensors 11 (2011): 11774-11808.
Nestleroth et al., "The effects of remanent magnetization on magnetic flux leakage signals", Review of Progress in Quantitative Nondestructive Evaluation, Ed. D.O. Thompson et al., New York, Plenum Press, 1995, 483-490.
Nestleroth et al., "Variation of magnetic properties in pipeline steels", Report prepared for U.S. Department of Transportation Office of Pipeline Safety, Report No. DTRS56-96-C-0010, 1998.
McGilp et al., "Extracting the hysteresis loops of magnetic interfaces from optical second-harmonic intensity measurements", Journal of Physics: Condensed Matter 19 (2007) 396002.
Jiles et al., "Theory of ferromagnetic hysteresis" Journal of Applied Physics 55 (1984): 2115-2120.
Jiles et al., "Numerical determination of hysteresis parameters for the modeling of magnetic properties using the theory of ferromagnetic hysteresis", IEEE Transactions on Magnetics 28 (1992): 27-35.
Belanger et al., "Calculation of hardness using high and low magnetic fields", ECNDT, Sep. 25-29, 2006, Berlin.
Takahashi et al., "Analysis of minor hysteresis loops of cold rolled low carbon steel", IEEE Transactions on Magnetics 42 (2006): 3782-3784.
Peyton et al., "The application of electromagnetic measurements for the assessment of skin passed steel samples", 19th World Conference on Non-Destructive Testing, Jun. 13-17, 2016, Munich, Geermany.
Stegemann et al., "Determination of mechanical properties of steel sheet by electromagnetic techniques", Nondestructive Characterization of Materials VIII, Ed. Robert E. Green Jr., New York, 1998, 269-275.
Kroos et al., "Combined measuring system for an improved nondestructive determination of the mechanical/technological material properties of steel sheet", EUR 21339 (2005): 1-169.
Heutling et al., "Online material characterisation of steel sheets in hot-dip galvanizing lines by means of harmonic analysis of eddy current signals", Proceedings of the 16th World Conference on Nondestructive Testing, Montreal, 2004.
Cosarinsky et al., "Non-destructive characterisation of laser-hardened steels", INSIGHT 56 (2014): 553-559.
Gabi et al., "FEM simulations of incremental permeability signals of a multi-layer steel with consideration of the hysteretic behavior of each layer", IEEE Transactions on Magnetics 50 (2014) 7026504.
Szielasko et al., "Early detection of critical material degradation by means of electromagnetic multi-parametric NDE", 40th Annual Review of Progress in Quantitative Nondestructive Evaluation 1581 (2014): 711-718.
Szielasko et al., "Minimalistic devices and sensors for micromagnetic materials characterization", IEEE Transactions on Magnetics 49 (2013): 101-104.
Altpeter et al., "Nondestructive characterizing stress states in conventional deep drawing processes by means of electromagnetic methods", Electromagnetic Nondestructive Evaluation Conference (2008) Korea.
Schreiber et al., "New sensor principles based on Barkhausen noise", Sensor Systems and Networks: Phenomena, Technology, and Applications for NDE and Health Monitoring 2007, ed. Kara J. Peters, Proc. of SPIE 6530 (2007).
Dobmann et al., "ND-materials characterization of neutron-induced embrittlement in German nuclear reactor pressure vessel material by micromagnetic NDT techniques", Electromagnetic Nondestructive Evaluation (XI), Ed. A. Tamburrino et al., IOS Press, 2008.
Dobmann et al., "Non-destructive characterization of thermal ageing of the Cu-rich WB 36 steel 15 NiCuMoNb 5 (1.6368)", Materials at High Temperatures, 23 (2006): 263-266.
Theiner et al., "Process integrated nondestructive testing (PINT) for evaluation of hardness, case depth and grinding defects", Advanced Sensors for Materials Processing, Eds. B. Brusey et al. (1999): 159-171.
Conrad et al., "Industrial demands and nondestructive testing (NDT) for process monitoring and quality control in hot and cold formed steel production", CHS2-Series: Hot Sheet Metal Forming of High-Performance Steel, Eds. K. Steinhoff et al., Issue 5, 243-250.
Altpeter et al., "Nondestructive characterization of neutron induced embrittlement in nuclear pressure vessel steel microstructure by using electromagnetic testing", Electromagnetic Nondestructive Evaluation (XIV), Ed. T. Chady et al., IOS Press, 2011.

* cited by examiner

METHODS AND SYSTEMS FOR NONDESTRUCTIVE MATERIAL INSPECTION

CROSS-REFERENCE TO RELATED APPLICATIONS

This application claims priority to U.S. Provisional Application No. 62/585,167 entitled "Methods And Systems For Nondestructive Material Inspection" filed on Nov. 13, 2017, which is hereby incorporated by reference here in its entirety. This application is related to three other U.S. provisional applications, filed on Nov. 13, 2017: U.S. Provisional Application No. 62/585,177 entitled "Methods And Systems For Nondestructive Material Inspection"; U.S. Provisional Application No. 62/585,185 entitled "Methods Of Using Nondestructive Material Inspection Systems"; and U.S. Provisional Application No. 62/585,191 entitled "Methods Of Using Nondestructive Material Inspection Systems", each of which are hereby incorporated by reference here in its entirety.

FIELD

The present disclosure relates to material inspection, more specifically to nondestructive material inspection.

BACKGROUND

Systems and methods to evaluate hard spots and/or other suitable material conditions and inhomogeneities (e.g., in pipeline steel or other suitable materials) for nondestructive inspection of pipeline, piping, steel plates, welded structures and welds of different types that can include, but are not limited to, girth welds, fillet welds, lap welds and butt welds are valuable in determining material integrity (e.g., pipeline integrity) as well as material and weld quality. Such systems and methods for example, can obtain information on welds and pipeline materials nondestructively on such materials.

Currently, pipeline inspection gauges (PIGs) have been used as a tool to perform nondestructive pipeline inspection to detect anomalies and defects in a pipe, such as cracks and hard spots. The most commonly used technologies include magnetic flux leakage (MFL), ultrasonic crack detection tool (UT), and electromagnetic acoustic transducer (EMAT) that couples electromagnetic energy with a mechanic wave. Similarly, welds are non-destructively inspected using technologies including magnetic particle testing, ultrasonic testing, and eddy current testing. All these inspection technologies are based on the principle that the anomalies and defects possess some material properties that are detectably different from that of the bulk material, e.g., the leaked magnetic flux due to difference in magnetic permeabilities, or the reflected ultrasonics due to difference in mechanical vibration behaviors.

There is a useful but overlooked material property that can be used to detect anomalies and defects in pipeline, piping, steel plates, welded structures, and welds of different types that can include, but are not limited to, girth welds, fillet welds, lap welds and butt welds. This is the nonlinear nature of the magnetic response in ferromagnetic materials. The nonlinear magnetic response provides information and accuracy not attainable with the current methods which probe magnetic flux leakage or linear response functions. Because of the importance of material integrity as well as material and weld quality, there is a continuing need to further improve the art of nondestructive material inspection by improving the inspection systems and methods. The present disclosure provides a solution for this need.

SUMMARY

In accordance with at least one aspect of this disclosure, a method for determining one or more material conditions of a sample composed of at least one hysteretic ferromagnetic material and/or at least one nonhysteretic material. This method can include interrogating the sample with an input time varying magnetic field and detecting the magnetic responses or acoustic responses over time from the hysteretic ferromagnetic materials and/or the nonhysteretic material. The method can also include determining a time dependent non-linear characteristic of the received magnetic field or acoustic responses and correlating the time dependent nonlinear characteristic of the received magnetic responses or acoustic responses to one or more material conditions of the material.

Determining the time dependent non-linear characteristic can include performing a frequency domain analysis such as power spectral density analysis of the received magnetic field or acoustic responses to create power spectral density data. In certain embodiments, determining the time dependent non-linear characteristic can include determining one or more harmonic peak values of the power spectral density (PSD) data.

Determining the one or more harmonic peak values can include determining one or more harmonic coefficients of the spectral density data. For example, determining the one or more harmonic coefficients and/or peak values can include determining odd harmonic coefficients and/or peak values of the spectral density data.

In certain embodiments, determining the odd harmonic coefficients and/or peak values can include determining 3rd and/or 5th harmonics of the spectral density data. Correlating the time dependent nonlinear characteristic can include comparing and correlating the 3rd and/or 5th harmonics to the one or more material conditions of the interrogated sample.

The interrogated sample (comprising at least one hysteretic ferromagnetic material and/or at least one nonhysteretic material) can include, but is not limited to, a test material composed of at least one material phase with one or more material conditions. The one or more material conditions can include, but are not limited to, the presence of at least one material phase of the hysteretic ferromagnetic material and/or the nonhysteretic material. In certain embodiments, the hysteretic ferromagnetic material can include, but is not limited to steel, nickel, cobalt, and their alloys, such as a variety of carbon steels. In certain embodiments, the non-hysteretic material can include, but is not limited to air, aluminum, austenitic stainless steel, duplex stainless steel, and high manganese steel. The material phase can include, but is not limited to, at least one of austenite, martensite, ferrite, pearlite, bainite, lath bainite, acicular ferrite, and quasi-polygonal ferrite with different chemical compositions and/or crystallographic orientations. The inhomogeneities of a sample can include, but are not limited to, a test material composed of more than one material phase. Nonlimiting examples of inhomogeneities are hard spots and/or cracks/defects, e.g., in a steel pipe.

In accordance with at least one aspect of this disclosure, a non-transitory computer readable medium can include instructions for performing any suitable method as described herein and/or any suitable portion(s) thereof. For example, the method can include generating a time varying magnetic field and detecting a magnetic response or acoustic response signal over time from a magnetic sensor or acoustic sensor, determining a time dependent non-linear characteristic of the received magnetic field or acoustic responses, and correlating the time dependent nonlinear characteristic of the received magnetic response or acoustic responses to one or more material conditions of the material. Any other suitable portions of any embodiment of a method as described herein can be included additionally or alternatively.

In accordance with at least one aspect of this disclosure, a device for detecting one or more material conditions of an interrogated sample composed of at least one hysteretic ferromagnetic material and/or at least one nonhysteretic material can include a magnetic transmitter configured to output an interrogation magnetic field; a magnetic sensor or an acoustic sensor configured to receive a magnetic response or an acoustic response, respectively; and to convert the magnetic response or the acoustic response into magnetic signals or acoustic response signals, and a processor, configured to execute any suitable method as described herein and/or any suitable portion(s) thereof. In certain embodiments, the device can include an indicator configured to indicate to a user the one or more conditions of the material. In certain embodiments, the output device can include an indicator, which implies to notify one or more nearby users for appropriate immediate, real-time actions, and the users can directly observe the indicator. In some other embodiments, the output device 207 can also include, a device for communicating to users, which also implies notify users for appropriate immediate, real-time actions, but the users may be at a remote location, and the communication may be through wired or wireless routes. In some other embodiments, the output device 207 can also include, a data collection and storage device for later retrieval and post-processing, which is not for immediate, real-time actions.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 13A and 13B are data maps generated from two configurations of the device relative to the sample. FIG. 13C is a data map with combined data sets from both FIGS. 13A and 13B and at any specific location FIG. 13C only uses the lower value of the normalized $3^{rd}$ harmonics between FIGS. 13A and 13B. FIG. 13E is an overlay of Vickers Hardness (VHN) measurements on the sample photo. FIG. 13D is an excerpt of data from FIG. 13E.

DETAILED DESCRIPTION

Figure 1:
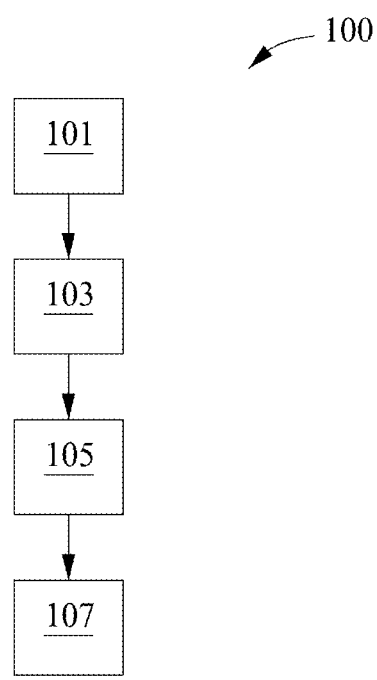
FIG. 1 is a flow diagram of an embodiment of a method in accordance with this disclosure.

All numerical values within the detailed description and the claims herein are modified by "about" or "approximately" the indicated value, and take into account experimental error and variations that would be expected by a person having ordinary skill in the art. The current invention relates to methods and apparatus to detect nonlinear magnetic response of a sample composed of at least one hysteretic ferromagnetic material. The linear response function of a magnetic material is given by the equation $$B(x)=\mu_0(H(x)+M(x))=F(H(x))$$

where H(x) is the applied field magnetic field strength (units of ampere/meter) which can vary with position (x) in space, M(x) is the magnetization (units of ampere/meter) which depends on position (x) as well as the initial magnetization state of the material, $\mu_0$ is the magnetic permeability constant (unit of henry/meter), B(x) is the magnetic flux density (units of Tesla) which can vary with position (x) in space, and F(H(x)) is a function that depends linearly on H(x). Hereafter, B(x), H(x), M(x) and F(H(x)) are referred to as B, H, M and F(H) respectively, and/or B(t), H(t), M(t) and F(H(t)) if the corresponding parameters are varying with time. This linear dependence is the type of response seen in static magnetic fields. Current inspection tools such as magnetic flux leakage (MFL), and electromagnetic acoustic transducer (EMAT) tools are configured to respond to the function that depends primarily linearly on H. It should be noted that for a ferromagnetic material this dependence can be complicated. When the applied field is time varying, the linear operator no longer describes the relationship between the applied magnetic field and the magnetization. The magnetic flux density B(t) in a ferromagnetic material with an applied time varying magnetic field H(t) can be approximated by a linear operator along with a time integral of a series of nonlinear functions:

$$B(t) = F(H(t)) + \int_{-\infty}^{0} F_1(H(t+\tau))d\tau +$$
$$\int_{-\infty}^{0} F_2(H^2(t+\tau))d\tau +$$
$$\int_{-\infty}^{0} F_3(H^3(t+\tau))d\tau + \ldots$$
$$= F(H(t)) + \int_{-\infty}^{0} \sum_{n=1}^{\infty} F_n(H^n(t+\tau))d\tau$$

Equation 1

The function $F_2$ gives rise to a second order nonlinear response, the function $F_3$ gives rise to a third order nonlinear response, and the function $F_n$ gives rise to an nth order nonlinear response. The time integral $\int_{-\infty}^{0} F_n(H^n(t+\tau))d\tau$ represents that the magnetic flux density B(t) depends on the history of function $F_n(H^n(t))$.

The present invention utilizes these nonlinear responses to provide a better way to characterize material conditions and inhomogeneities in ferromagnetic materials. If the applied field H(t) is sinusoidal and varies sinusoidally with a frequency ω, then the second order response varies as 2ω, the third order response varies as 3ω and the nth order response varies as nω. If the applied field has an arbitrary time dependence then the nonlinear response can be extracted from an analysis of the time dependence of signals that can arise from magnetization and the magnetic flux density (B(t) in Eq. 1). In some cases this can be done by Fourier analysis of the time dependence of signals arising from magnetization and the magnetic flux density (B(t) in Eq. 1). In some instances the nonlinear response can be directly characterized from the time dependence of signals arising from magnetization and the magnetic flux density (B(t) in Eq. 1).

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and the method is designated generally by reference character 100. Other embodiments and/or aspects of this disclosure are shown in FIGS. 2A-16B. The systems and methods described herein can be used to determine material conditions of a material (e.g., a material phase and/or imperfection in a metal pipeline).

Below a general understanding of the nonlinear magnetic response in hysteretic ferromagnetic materials is provided. Embodiments described below provide a fast, simple, and general way to detect material conditions and inhomogeneities of a sample being studied. Nonlimiting examples of inhomogeneities are hard spots and/or cracks/defects, e.g., in a steel pipe. Certain embodiments described herein do not require a built-in ferromagnetic core, and can thus be calibrated in air environment to provide precise background signal. The method also allows calibration in environments other than air (for example samples immersed in oil).

The nonlinear response of the magnetic flux density (B(t) in Eq. 1) in an applied time varying magnetic field gives rise to a number of responses that can be detected. These responses track the time dependence of the magnetic flux density created from the applied time varying magnetic field and the nonlinear responses arise from the hysteretic responses of the magnetization and the magnetic flux density (B(t) in Eq. 1). Both theoretically and experimentally, it is shown that symmetric hysteretic responses leads to odd numbers of harmonics, while asymmetric hysteretic responses lead to even numbers of harmonics. A symmetric hysteresis response usually connects to, but not limited to, ferromagnetic materials, and an asymmetric hysteresis response usually connects to, but not limited to, the residual magnetization state in the hysteretic materials, embodiments can also be applied to detect magnetization state of hysteretic materials. One embodiment of the present invention includes interrogation of a sample with a time varying magnetic field from a magnetic transmitter and detection of the magnetic flux density (B(t) in Eq. 1) with a magnetic sensor that is in proximity to the sample. A variation of this embodiment includes the incorporation of a DC magnetic field that biases the magnetization. Another variation includes the measurement of a sample with a residual magnetization. Yet another variation includes measurement of a sample that has been degaussed. A different embodiment includes interrogation of a sample with a time varying magnetic field from a magnetic transmitter and detection of the magnetic flux density (B(t) in Eq. 1) and a nonlinear magneto-acoustic response (e.g., similar to EMAT), but looks at the nonlinear spectra of acoustic signal. A variation of this embodiment includes the incorporation of a DC magnetic field that biases the magnetization. Another variation includes the measurement of a sample with a residual magnetization. Yet another variation includes measurement of a sample that has been degaussed.

The general principle of the nonlinear magnetic response relies on applying a time varying magnetic field H(t) to a sample and detecting a response. This principle will be illustrated from the case in which the time varying magnetic field is an AC magnetic modulation $H_{AC}(\vec{r}, t) = H_1(\vec{r})e^{i\omega t}$ with a spatially varying magnetizing field $H_1(\vec{r})$ and angular frequency ω=2πf. Such AC modulation can be achieved by a time varying electrical current $J_f = J_0(\vec{r})e^{i\omega t}$ (considering Ampere's law $$\nabla \times H_1 = J_f + \frac{\partial D}{\partial t},$$

and the second term $$\frac{\partial D}{\partial t}$$

is negligible in our frequency range $$\left|\frac{\partial D}{\partial t}\right| \sim |-i\omega\epsilon E| \ll \sigma|E|\Big).$$

A DC magnetizing field $H_{DC}(\vec{r})$ can also be applied by a DC electrical current or permanent magnet, and leads to a total field generated by the source: $H_s(\vec{r}, t)=H_{DC}(\vec{r})+H_{AC}(\vec{r})e^{i\omega t}$. For ferromagnetic materials such as carbon steel and other ferritic phase in steels, the relative permeability $\mu_r$ that connects field B and H is a hysteretic and nonlinear operator. Therefore the primary magnetic field $B_s(\vec{r}, t)=\mu_0\mu_r H_s(\vec{r}, t)$ would be nonlinear inside the ferromagnetic materials and can be described as Taylor series $$B_s(\vec{r}, t) = \sum_{n=-\infty}^{n=\infty} B_n(\vec{r})e^{in\omega t}$$ Equation (2)

With Faraday's law $$\nabla \times E_2(\vec{r}, t) = -\frac{\partial B_s(\vec{r}, t)}{\partial t},$$

the induced electric field in steel $E_2(\vec{r}, t)$ and the resulting Eddy current $J_{eddy}(\vec{r}, t)=\sigma E_2(\vec{r}, t)$ are both nonlinear, as the conductivity $\sigma$ in steel is normally a scalar and linear operator. The Eddy current is only distributed around the surface of conductive materials with a skin depth $$d_p = \sqrt{\frac{1}{\pi f \mu \sigma}},$$

and it generates a secondary magnetizing field $H_2(\vec{r}, t)$ from Ampere's law $\nabla \times H_2 J_{eddy}=\sigma E_2$. As a result, the secondary magnetizing field $$|H_2| \propto -\sigma \frac{\partial B_s}{\partial t}$$

would contain similar nonlinear information as the primary field $B_s(\vec{r}, t)$.

Different ferromagnetic materials have different hysteresis curves and magnetic responses, and would result in different nonlinear harmonic coefficient $B_n(\vec{r})$ under the same magnetic modulation. The difference in the harmonic coefficients can be measured with two methods:

1. Nonlinear magnetic detection: The total magnetizing field is nonlinear, and can be measured by a magnetic sensor at a point A in air: $H_{total}(\vec{r}_A, t)=H_{DC}(\vec{r}_A)+H_{AC}(\vec{r}_A)e^{i\omega t}+H_2(\vec{r}_A, t)$.

2. Nonlinear magnetoacoustic detection. With a large constant DC magnetic field $B_{DC}(\vec{r})$, a strong Lorentz body force $f(\vec{r}, t)=J_{eddy}(\vec{r}, t)\times B_{DC}(\vec{r})$ takes place and launches a time-varying mechanic wave. Such magnetoacoustic response is also nonlinear.

Finally considered is the generation of different nonlinear harmonics under sinusoidal modulation $J_f=J_0(\vec{r})e^{i\omega t}$, and in this case all the nonlinear effects originate from $B_s(\vec{r}, t)=\mu_0\mu_r H_s(\vec{r}, t)$. When the local hysteresis B-H loop is symmetric inside the hysteretic materials, $B_s(\vec{r}, t)$ reverse its direction after half a period $B_s(\vec{r}, t)=-B_s(\vec{r}, t+T/2)$. This normally happens at near zero magnetization. With Taylor expansion from equation (1), the symmetry constraint suggests $\sum_{n=-\infty}^{n=\infty} B_n(\vec{r})e^{in\omega t}=-\sum_{n=-\infty}^{n=\infty} B_n(\vec{r})e^{in\omega(t+T/2)}$ and $B_n(\vec{r})=(-1)^{(n+1)}B_n(\vec{r})$. Therefore for even numbers of n, the harmonic coefficient $B_n(\vec{r})=0$. In other words, a symmetric B-H curve prohibits the generation of even number of harmonics and only allows odd number of harmonics. In contrast, if the B-H loop is asymmetric, $B_s(\vec{r}, t)\ne -B_s(\vec{r}, t+T/2)$ and all Taylor coefficient $B_n(\vec{r})$ in the expansion could exist. In other words, an asymmetric B-H curve allows for both odd and even numbers of harmonics.

Referring now to FIG. 1 a method 100 for determining one or more material conditions of a sample composed of at least one hysteretic ferromagnetic material can include interrogating (e.g., at block 101) the hysteretic ferromagnetic material by applying a time varying magnetic field. Optionally in block 101 an additional DC magnetic field can be applied. Optionally a degaussing magnetic field can be applied in block 101. Optionally the sample in block 101 can have a residual magnetization. A DC magnetic field is a magnetic field that is not varying over time, and a degaussing magnetic field is a time-varying magnetic field that is used to eliminate residual magnetization of a material. The time varying magnetic response or acoustic response is detected in block 103. The method 100 can also include determining (e.g., at block 105) a time dependent non-linear characteristic of the received magnetic field or acoustic response and correlating (e.g., at block 107) the time dependent nonlinear characteristic of the received magnetic response or acoustic response to one or more material conditions of the material.

Interrogating the hysteretic ferromagnetic material with an input time varying magnetic field can include, but is not limited to, utilizing at least one magnetic transmitter that generates a time varying magnetic field and placing the magnetic transmitter at a nearby location to the interrogated sample. For example, an example proximity (or nearby location) for the magnetic transmitter is 1 cm to the surface of the interrogated sample; a more preferred nearby location for the magnetic transmitter is 0.2 cm or less to the surface of the interrogated sample; an even more preferred nearby location for the magnetic transmitter is in direct contact on the surface of the interrogated sample.

The time varying magnetic field can include, but is not limited to, a combination of sinusoidal wave, square wave, triangular wave and symmetric and asymmetric pulses. In certain embodiments, a preferred time varying magnetic field can include sinusoidal wave with peak amplitude ranging from 0.01 milliTesla to 1 Tesla, and frequency ranging from 1 Hz to 1 MHz. A more preferred time varying magnetic field can include sinusoidal wave with peak amplitudes from 0.1 milliTesla to 10 milliTesla, and frequency ranging from 100 Hz to 100 kHz. For examining 4140 carbon steel materials, and other carbon steel materials made with the Thermo-Mechanical Controlled Processing (TMCP) such as X60 and/or X65 carbon steel, a preferred time varying magnetic field can include sinusoidal wave with peak amplitude ranging from 0.01 milliTesla to 1 Tesla, and frequency ranging from 1 Hz to 1 MHz; a more preferred time varying magnetic field can include sinusoidal wave with peak amplitudes from 0.1 milliTesla to 10 milliTesla, and frequency ranging from 100 Hz to 100 kHz; an even more preferred time varying magnetic field can include sinusoidal wave with peak amplitudes from 0.1 milliTesla to 10 milliTesla, and frequency ranging from 8 kHz to 100 kHz; an even more preferred time varying magnetic field can include sinusoidal wave with peak amplitudes from 0.5 milliTesla to 5 milliTesla, and frequency ranging from 8 kHz to 100 kHz.

Similar to the common practice in other non-destructive inspection tool, one familiar with the technique can optimize the time varying magnetic field by calibrating the nonlinear magnetic response and/or the size of $3^{rd}$ harmonics with respect to frequency range, amplitude range, and material phases.

The magnetic transmitter can include, but is not limited to, a device to generate the time varying magnetic field, such as a transmitting coil, a translating/rotating magnet such as Neodymium magnet, ceramic magnet, electromagnet or a superconducting magnet. In certain embodiments, a preferred magnetic transmitter can include a transmitting coil with an outer diameter between 2 mm to 10 cm, number of turns between 1 to 100,000 and an inductance between 0.001 mH to 1000 mH. In certain embodiments, a more preferred magnetic transmitter can include a transmitting coil with an outer diameter between 5 mm to 5 cm, number of turns between 10 to 1000 and an inductance between 0.01 mH to 100 mH. In certain embodiments, an even more preferred magnetic transmitter can include a transmitting coil with an outer diameter of 1 inch (25.4 mm), 100 turns, and an inductance of L~0.25 mH. In certain embodiments, a smaller-diameter magnetic transmitter can be used to generate inspection results with higher lateral spatial resolution. In certain embodiments, an even more preferred magnetic transmitter can include one or more coils with their diameters smaller than 1-inch to improve the lateral spatial resolution of the inspection results.

Detecting a magnetic response or an acoustic response can include, but is not limited to, utilizing at least one magnetic sensor or acoustic sensor configured to receive a magnetic response or acoustic response, respectively, and to convert the magnetic response or acoustic response into magnetic response signals or acoustic response signals. Preferably, the magnetic sensor is located in a region near the magnetic transmitter. In one embodiment, the distance between the magnetic sensor and the magnetic transmitter is less than 50 meters, preferably less than 10 meters, preferably less than 1 meter, preferably less than 10 centimeters, preferably less than 1 centimeter, preferably less than 1 millimeter, and even more preferably in direct contact to each other.

A magnetic response can include, but is not limited to, a spatially varying magnetic field produced by the interrogated material as a result of input time varying magnetic field and any additional magnetic fields. A magnetic sensor can include, but is not limited to, a device to receive the magnetic response from at least one point or averaged over a sensing area, and convert the magnetic response to a digital or analog signal that can be interpreted by a computer or observer, such as pickup coils, Hall sensors, Fluxgate magnetometers, Cesium atomic magnetometers or superconducting SQUID magnetometers. In certain embodiments, a preferred magnetic sensor can include a sensing coil with an outer diameter between 2 mm to 10 cm, number of turns between 1 to 100,000 and an inductance between 0.001 mH to 1000 mH. In certain embodiments, a more preferred magnetic transmitter can include a transmitting coil with an outer diameter between 5 mm to 5 cm, number of turns between 10 to 1000 and an inductance between 0.01 mH to 100 mH. In certain embodiments, an even more preferred magnetic sensor can include a sensing coil with an outer diameter of 1 inch, 100 turns, and an inductance of L~0.25 mH. In certain embodiments, a smaller-diameter magnetic sensor can be used to generate inspection results with higher lateral spatial resolution. In certain embodiments, a more preferred magnetic sensor can include one or more coils with their diameters smaller than 1-inch to improve the lateral spatial resolution of the inspection results. In one embodiment, the magnetic sensor is chosen so that it can respond sufficiently fast to record at least the signal arising from the second order nonlinear effect, in a more preferred embodiment the magnetic sensor is chosen so that it can respond sufficiently fast to record at least the signal arising from the third order nonlinear effect, and in an even more preferred embodiment the magnetic sensor is chosen so that it can respond sufficiently fast to record at least the signal arising from the fifth order nonlinear effect.

An acoustic response can include, but is not limited to, a mechanical motion produced by the interrogated material as a result of input time varying magnetic field and any additional magnetic fields. An acoustic sensor can include, but is not limited to, a device to receive the acoustic response from at least one point or averaged over a sensing area, and convert the acoustic response to a digital or analogue signal that can be interpreted by a computer or observer, such as piezoelectric acoustic transducer, microphone, seismometer, or geophone. In certain embodiments, a preferred acoustic sensor can include a ceramic piezoelectric acoustic transducer with a diameter of 1.2 cm and a resonance frequency of 500 kHz. In one embodiment, the acoustic sensor is chosen so that it can respond sufficiently fast to record at least the signal arising from the second order nonlinear effect, in a more preferred embodiment the acoustic sensor is chosen so that it can respond sufficiently fast to record at least the signal arising from the third order nonlinear effect and in an even more preferred embodiment the sensor is chosen so that it can respond sufficiently fast to record at least the signal arising from the fifth order nonlinear effect.

Determining the time dependent non-linear characteristic can include performing a frequency domain analysis such as power spectral density analysis of the received magnetic response or acoustic response to create power spectral density data. In certain embodiments, determining the time dependent non-linear characteristic can include determining one or more harmonic peak values of the power spectral density data.

Determining the one or more harmonic peak values can include determining one or more harmonic coefficients of the spectral density data. For example, determining the one or more harmonic coefficients and/or peak values can include determining odd harmonic coefficients and/or peak values of the spectral density data.

In certain embodiments, determining the odd harmonic coefficients and/or peak values can include determining 3rd and/or 5th harmonics of the spectral density data. Correlating the time dependent nonlinear characteristic can include comparing and correlating the 3rd and/or 5th harmonics to the one or more material conditions of an interrogated sample. In certain embodiments, a large 3rd harmonics of the spectral density data, ranging from $10^{-6}$ or above after normalization, correlate to a material condition that include, but is not limited to, the presence of ferrite or pearlite carbon steel phases in an interrogated sample; a small 3rd harmonics of the spectral density data, ranging from $10^{-8}$ to $10^{-6}$ after normalization, correlate to a material condition that include, but is not limited to, the presence of hard steel phase such as martensite or lath bainite carbon steel phases, or nonhysteretic material such as air gap in an interrogated sample.

The interrogated sample can include, but is not limited to, a test material composed of at least one material phases with one or more material conditions. The one or more material conditions can include, but are not limited to, at least one material phase of the hysteretic ferromagnetic material or the nonhysteretic material. In certain embodiments, the hysteretic ferromagnetic material can include, but is not limited to steel, nickel, cobalt, and some of their alloys, such as a variety of carbon steels. In certain embodiments. The nonhysteretic material can include, but is not limited to air, aluminum, austenitic stainless steel, duplex stainless steel and high manganese steel. The material phase can include, but is not limited to, at least one of austenite, martensite, ferrite, pearlite, bainite, lath bainite, acicular ferrite, and quasi-polygonal ferrite with different chemical compositions and/or crystallographic orientations. The inhomogeneities of a sample can include, but are not limited to, a test material composed of more than one material phases. Nonlimiting examples of inhomogeneities are hard spots and/or cracks/defects, e.g., in a steel pipe.

In accordance with at least one aspect of this disclosure, a non-transitory computer readable medium can include instructions for performing any suitable method as described herein and/or any suitable portion(s) thereof. For example, the method can include generating a time varying magnetic field and detecting a magnetic response or acoustic response signal over time from a pickup coil, determining a time dependent non-linear characteristic of the received magnetic field or acoustic response, and correlating the time dependent nonlinear characteristic of the received magnetic response or acoustic response to one or more material conditions of the material. Any other suitable portions of any embodiment of a method as described herein can be included additionally or alternatively.

Figure 2A:
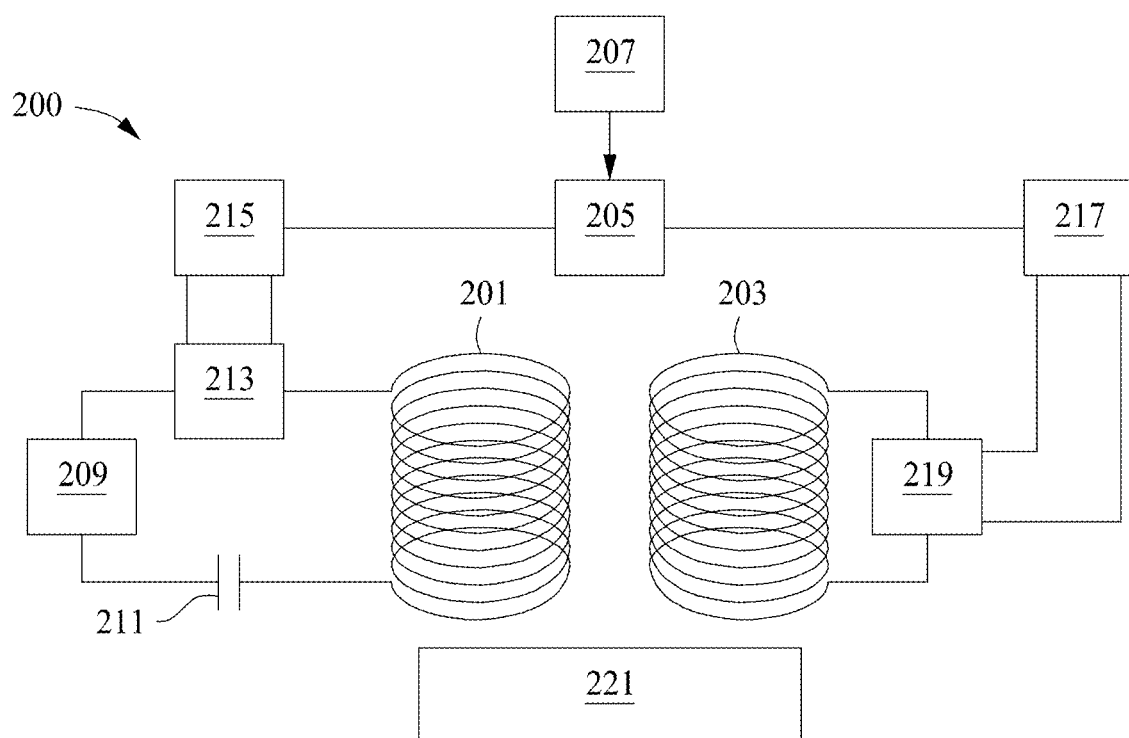
FIG. 2A is a schematic diagram of an embodiment of a device in accordance with this disclosure, shown having a transmitting coil and a pickup coil on the same side of a material.
Figure 2B:
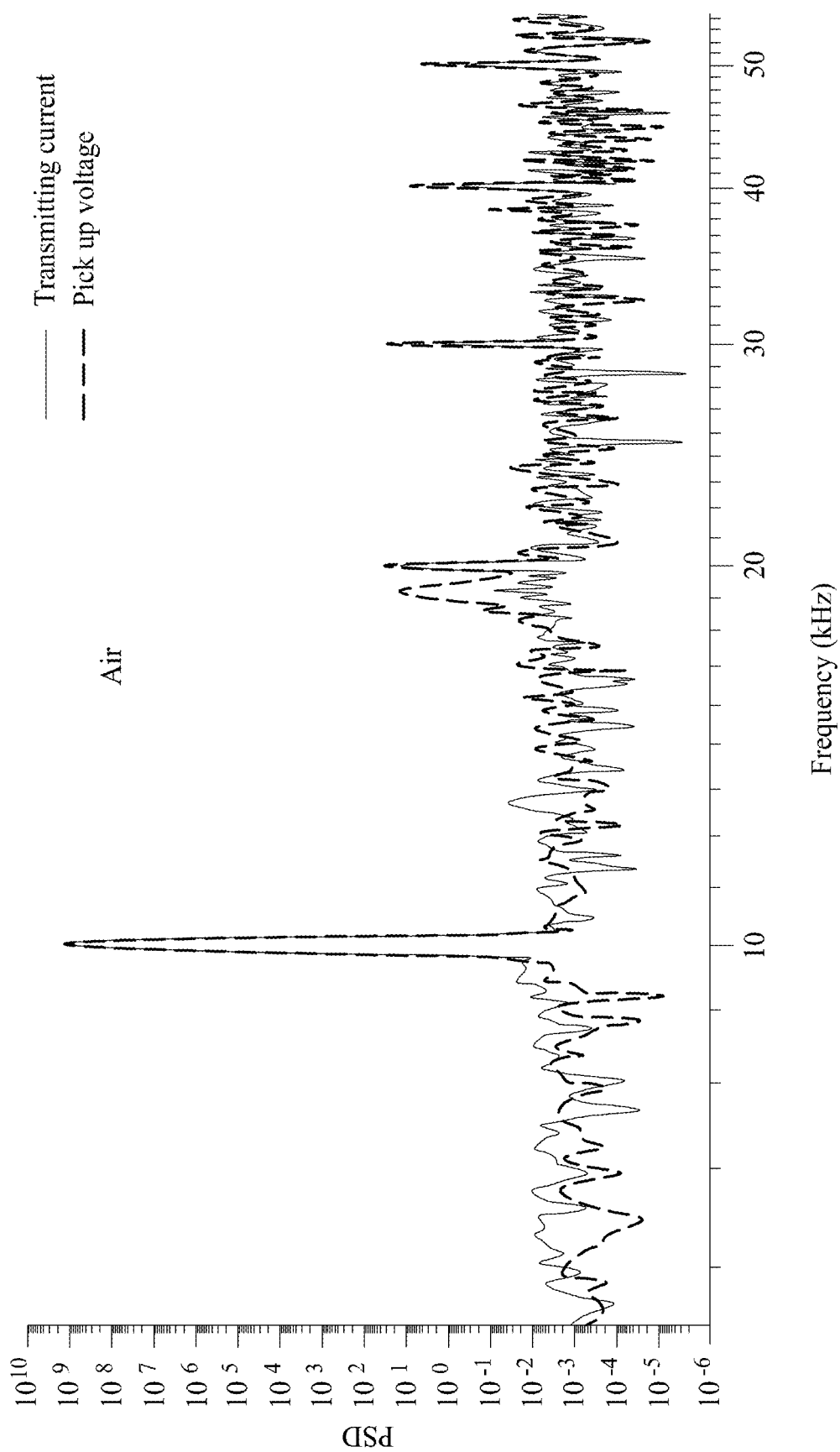
FIGS. 2B-2D are power spectral density charts of the embodiment of FIG. 2A in use on Air, Martensite, and Ferrite, respectively.
Figure 2C:
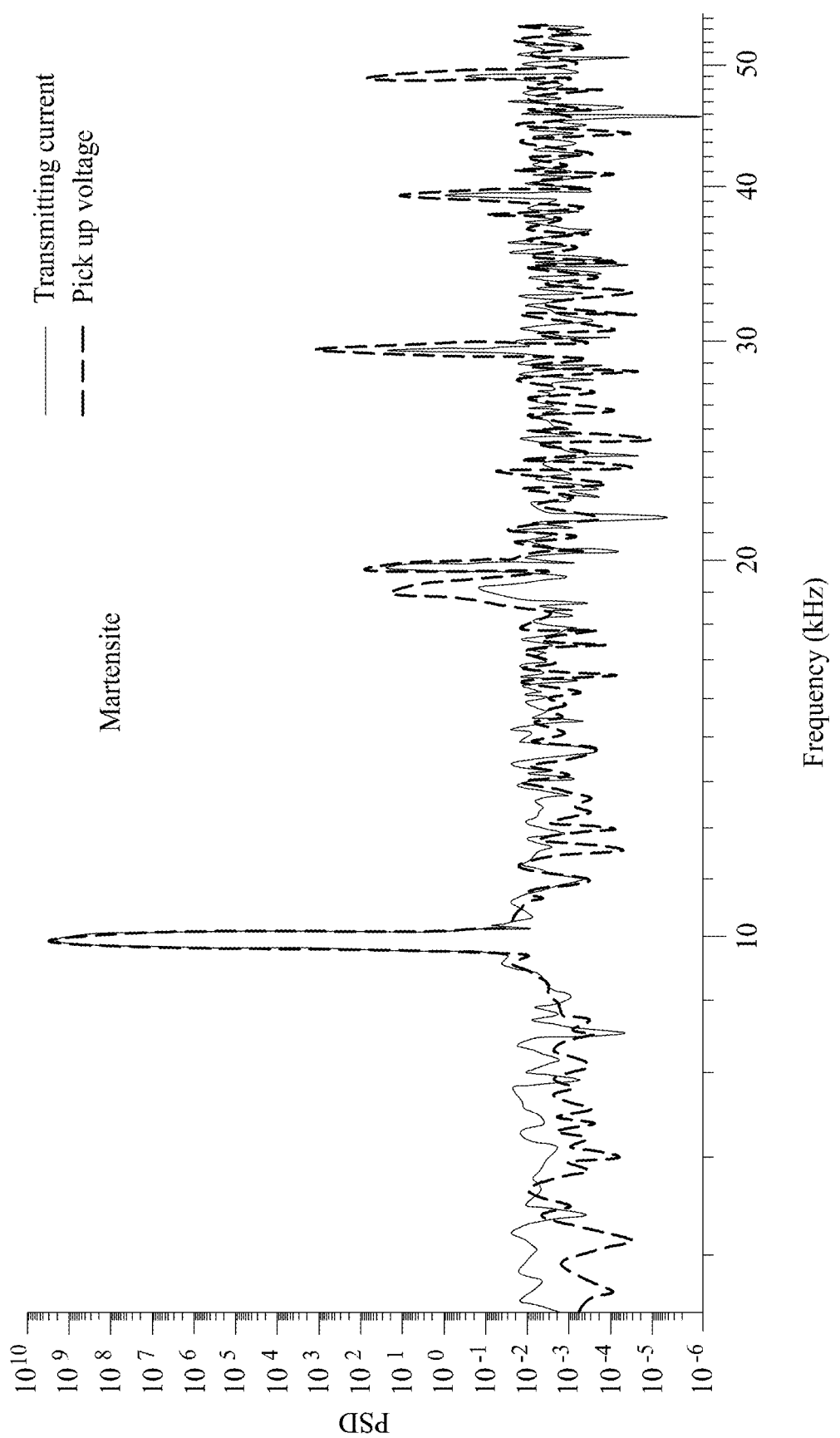

Referring additionally to FIG. 2A, in accordance with at least one aspect of this disclosure, a device 200 for detecting one or more material conditions of a hysteretic ferromagnetic material (e.g., a sample 221 comprising a hysteretic ferromagnetic material) can include a transmitting coil 201 configured to output an interrogation magnetic field, a pickup coil 203 or acoustic transducer (e.g., as described in more detail below) configured to receive a magnetic response or acoustic response, respectively, and to convert the magnetic response or acoustic response into magnetic signals or acoustic response signals. The device 200 can include a processor 205 configured to execute any suitable method, e.g., as described hereinabove and/or any suitable portion(s) thereof.

In certain embodiments, the device 200 can include an output device 207 configured to indicate to a user the one or more conditions of the material. The system 200 can include any other suitable signal processing components (e.g., one or more digitizers, a current meter, a signal generator, one or more bandpass filters, one or more pre-amplifiers or amplifiers, etc.) as appreciated by those having ordinary skill in the art. The output device 207 can include, but is not limited to, an indicator, which implies to notify one or more nearby users for appropriate immediate, real-time actions, and the users can directly observe the indicator. The output device 207 can also include, but is not limited to, a device for communicating to users, which also implies notify users for appropriate immediate, real-time actions, but the users may be at a remote location, and the communication may through wired or wireless routes. The output device 207 can also include, a data collection and storage device for later retrieval and post-processing and analysis.

Carbon steels are key materials in the pipeline and oil & gas industry. Generally, all the carbon steels compose of multiple material phases. Ferrite (soft phase of carbon steel) is a key material phase in the carbon steels. Hard phase, such as martensite or lath bainite could form in the steels when they have been rapidly quenched from high temperature (for example, from 900° C.) to room temperature, which could happen during steel mill plate manufacture or an electric resistance seam welding process. The presence of hard steel phase such as martensite or lath bainite phases can be particularly precarious as it is more susceptible to failures and cracking compared to soft ferrite phase. As a result, a carbon steel sample composed of ferrite and martensite are tested herein, since the application to pipelines is a good example of where such devices can be used. Any other suitable materials and applications are contemplated herein.

In the embodiment shown, a voltage or current signal can be generated through the signal generator 209 (e.g., a sinusoidal wave of frequency f). With current passing through, the transmitting coil 201 is used as a magnetic transmitter to generate a modulating magnetic field. The transmitting coil 201 used to produce data below includes an outer diameter of about 1 inch, 100 turns, and an inductance of L~0.25 mH. The electrical impedance of a transmitting coil is $Z_{coil}=R_{internal}+i\omega L$. Typically the internal resistance $R_{internal}$ of a coil is relatively small (<1Ω for the coil we tested), while the imaginary inductive term increases proportionally with frequency. Any other suitable coil with any suitable characteristics can be used.

To minimize the impedance effect of the inductor and maximize the output current, a capacitor C 211 is used to change the total impedance to $$Z_{coil} = R_{internal} + i\omega L + \frac{1}{i\omega C},$$

while imaginary term can be cancelled out when $$i\omega L + \frac{1}{i\omega C} = 0 \text{ or } C = \frac{1}{\omega^2 L}.$$

Frequencies from 1 kHz to 100 kHz were used in generating the data below, and different capacitances can be used at different frequencies to ensure that $$C \sim \frac{1}{\omega^2 L}$$

for me same transmitting coil 201. The current passing through the transmitting coil 201 can be measured with a current meter 213 and recorded with a first digitizer 215.

To detect the magnetic response from nearby materials, a magnetic sensor such as the pickup coil 203 can be used to measure time varying magnetic signal. The voltage generated through the pickup coil 203 is $$\varepsilon = -N\frac{dB}{dt} \cdot A,$$

which is related to number of turns N of the pickup coil 203, time derivative of local magnetic field $$\frac{dB}{dt}$$

and crosssection area of the loop A. This voltage can be measured through a second digitizer 217, for example. An optional pre-amplifier and/or bandpass filter 219 can be utilized between pickup coil 203 and the second digitizer 217, e.g., to enhance weak signal or detect specific frequency components in the measured signal if necessary. After receiving the waveforms of the transmitting current and pickup voltage from both digitizers, PSD analysis can be performed by the processor 205 in real time to extract nonlinear coefficients and/or peak values of the testing materials.

Figure 3A:
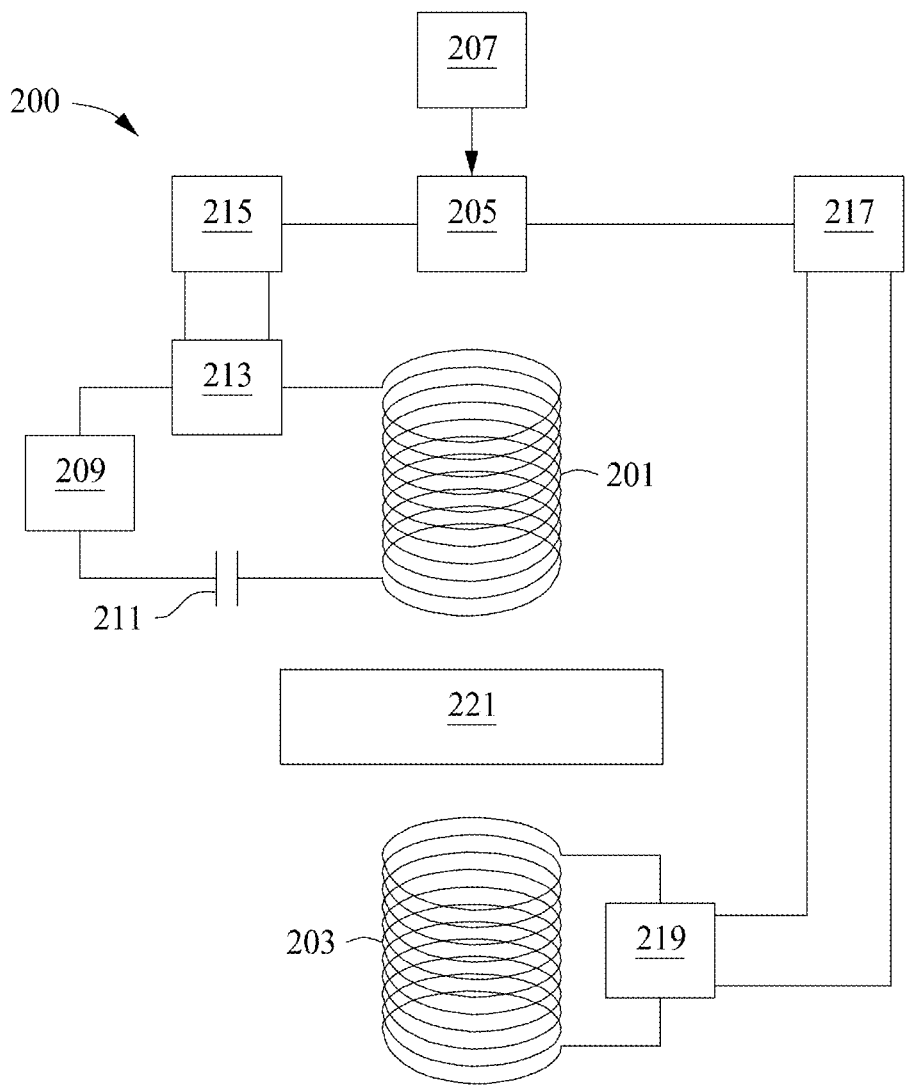
FIG. 3A is a schematic diagram of an embodiment of a device in accordance with this disclosure, shown having a transmitting coil and a pickup coil on the opposite side of a material.
Figure 3B:
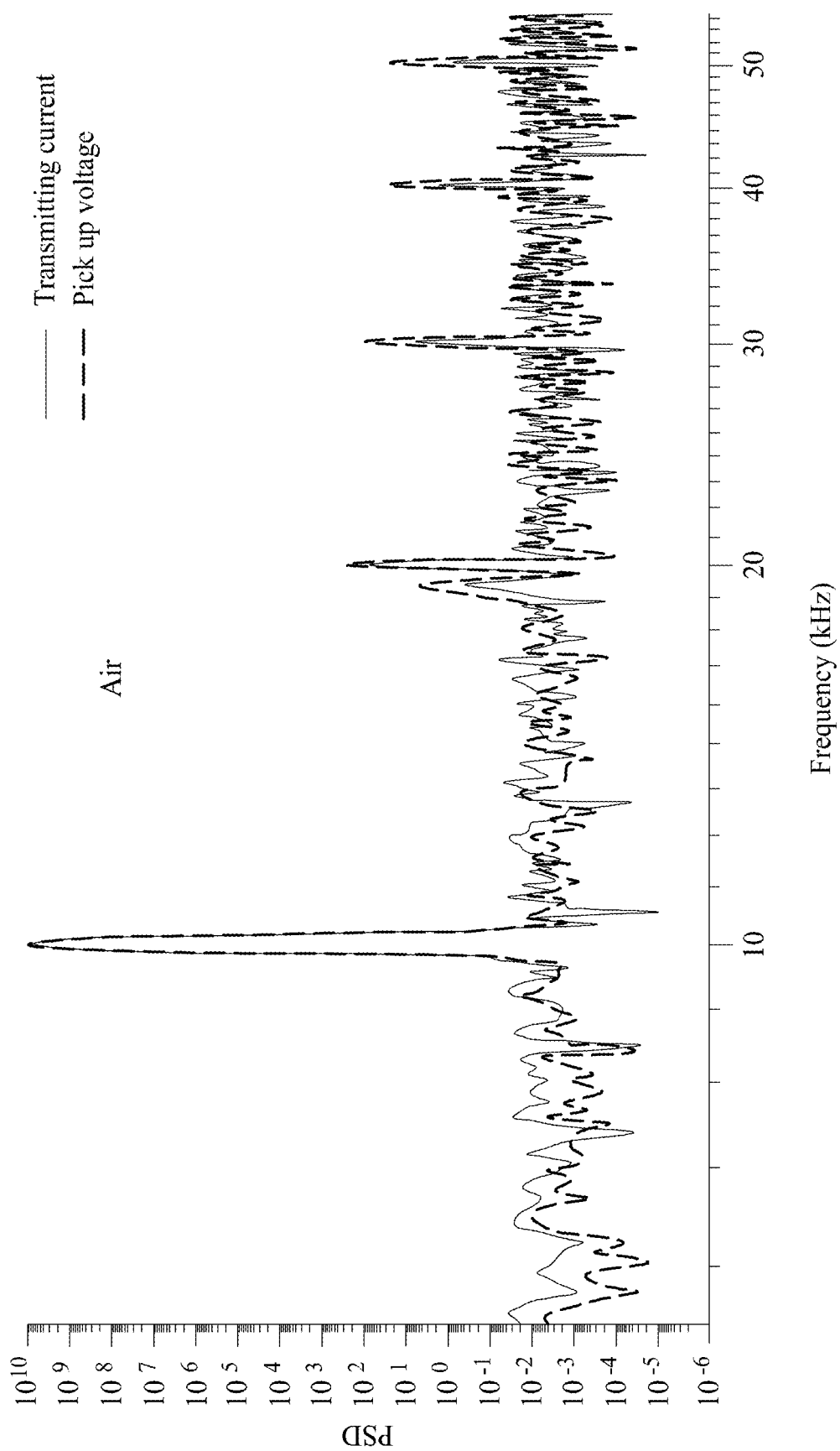
FIGS. 3B-3D are power spectral density charts of the embodiment of FIG. 3A in use on Air, Martensite, and Ferrite, respectively.
Figure 3C:
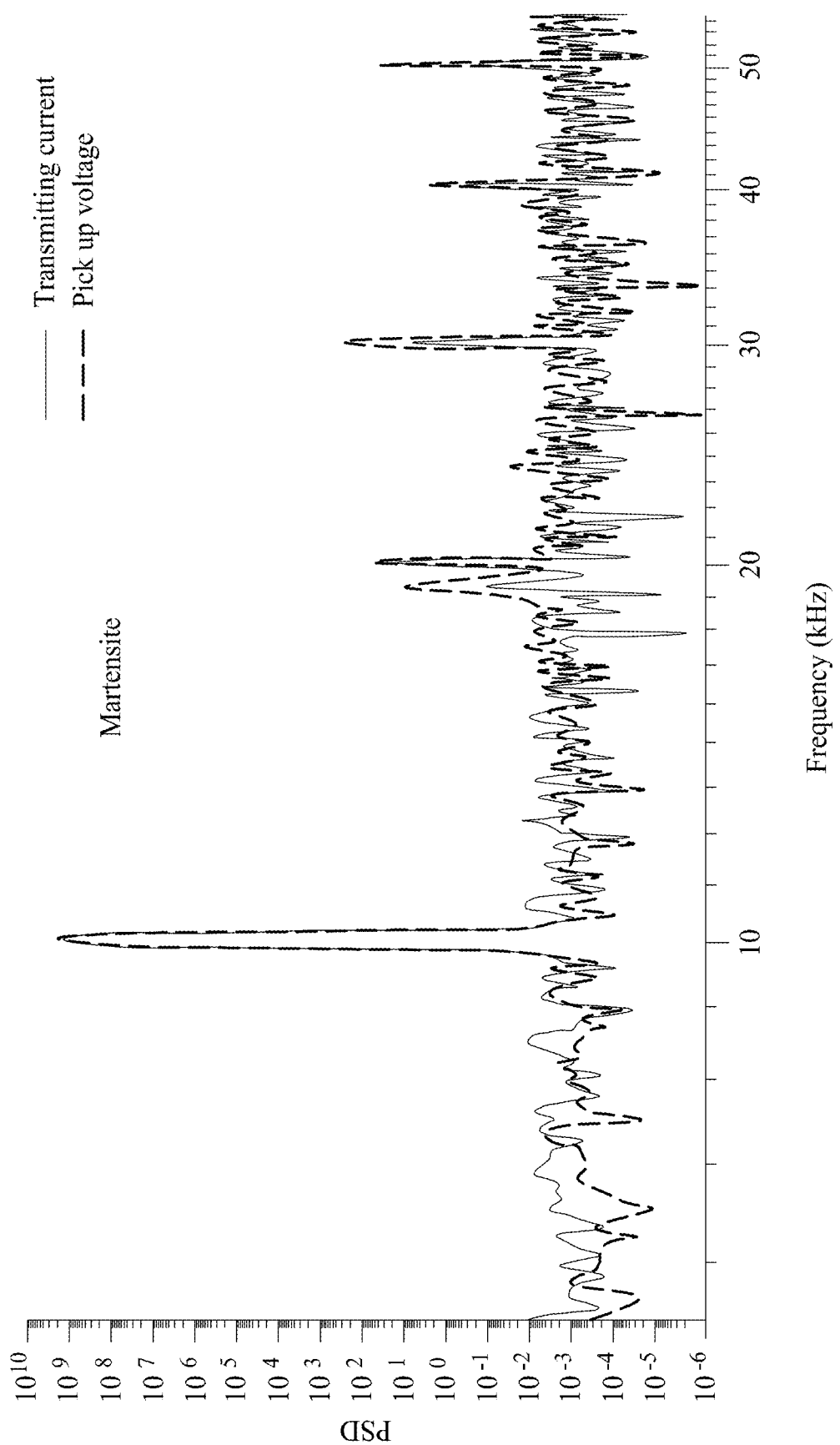
Figure 3D:
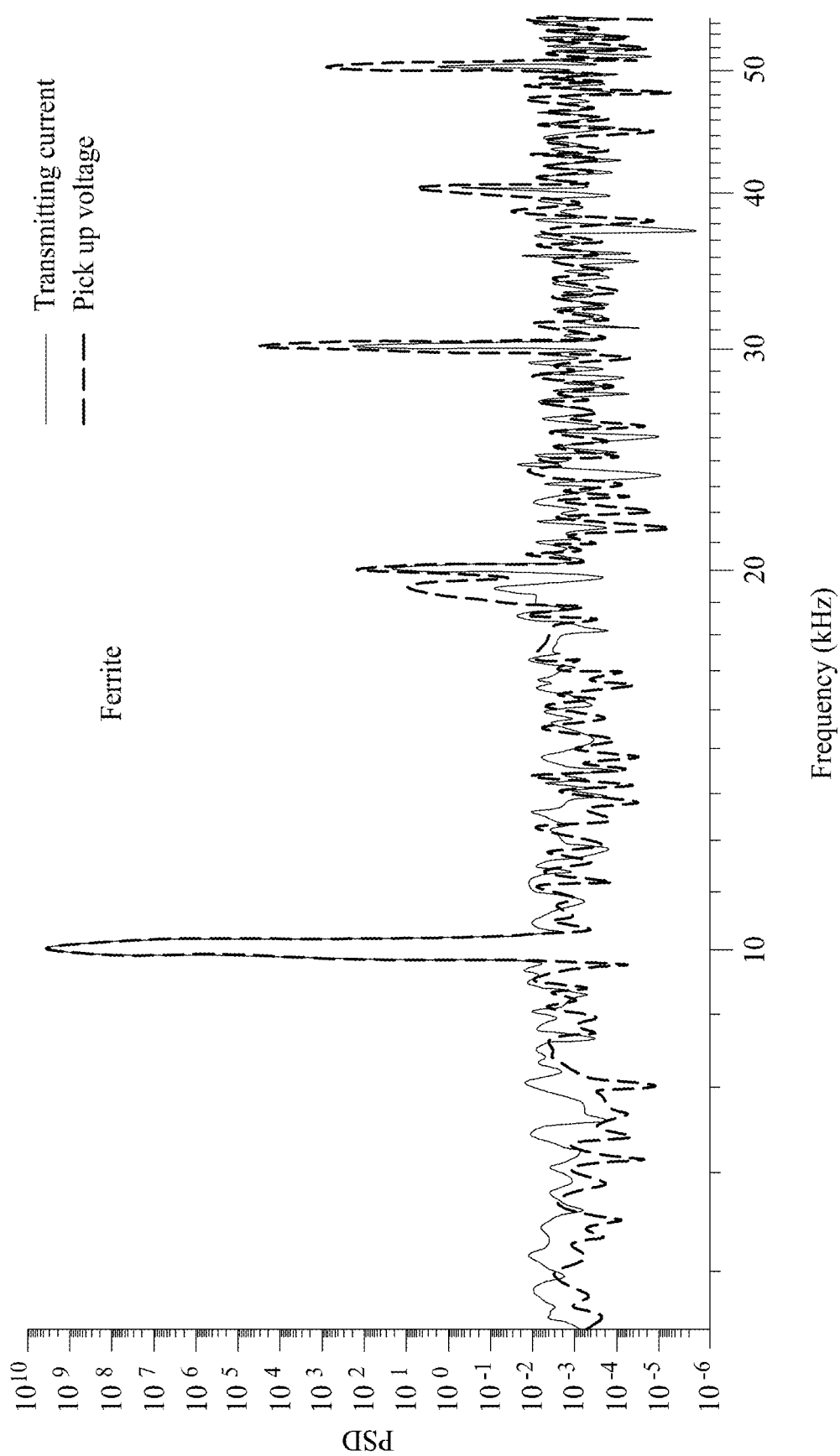

The transmitting coil 201, pickup coil 203, and the interrogated material can be arranged in any suitable configuration. Two specific examples are shown in FIGS. 2A and 3A. In FIG. 2A, the transmitting coil 201 and pickup coil 203 are placed to the same side of the interrogated material (e.g., ferromagnetic plate), and this configuration could be readily applied to conventional PIG for nondestructive pipeline inspection. In FIG. 3A, an alternate configuration is shown with the transmitting coil 201 and pickup coil 203 placed on opposite sides of interrogated material.

Accordingly, as shown in FIG. 2A, the system 200 can be configured for use on a single side of the interrogated material. As presented above, in certain embodiments, the one or more conditions of the material to be determined can include a material phase, for example. Example results for determining material phases for Air (as a baseline), Martensite (as a first phase), and Ferrite (as a second phase) in the place of the sample 221 are shown in the below Table 1 and in FIGS. 2B-2D.

As a control experiment, the device 200 was tested at 10 kHz frequency in air without any conducting/magnetic materials within half a meter. The power spectral densities (PSDs) of transmitting current and pickup voltage are shown as solid and dashed curves. The peaks of higher order harmonics (2nd, 3rd, 4th, and 5th, etc.) are at least 7 orders of magnitude lower than the primary frequency of 10 kHz. These small values of harmonics are due to electronic processing and system noise, and should be calibrated as a baseline for material testing.

TABLE 1

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Air (a) | $4.71 \times 10^{-8}$ | $1.32 \times 10^{-8}$ | $3.92 \times 10^{-9}$ | $2.91 \times 10^{-9}$ |
| Martensite (b) | $2.35 \times 10^{-8}$ | $4.58 \times 10^{-7}$ | $4.30 \times 10^{-9}$ | $2.43 \times 10^{-8}$ |
| Ferrite (c) | $1.38 \times 10^{-7}$ | $3.60 \times 10^{-5}$ | $2.99 \times 10^{-8}$ | $1.07 \times 10^{-6}$ |

Referring to FIG. 3A, in certain embodiments, the system 200 can be configured for use on opposite sides of the interrogated material. Example results for determining material phases for Air (as a baseline), Martensite (as a first phase), and Ferrite (as a second phase) are shown in the below Table 2 and in FIGS. 3B-3D.

TABLE 2

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Air (a) | $4.72 \times 10^{-8}$ | $1.52 \times 10^{-8}$ | $4.22 \times 10^{-9}$ | $3.40 \times 10^{-9}$ |
| Martensite (b) | $3.93 \times 10^{-8}$ | $2.01 \times 10^{-7}$ | $1.93 \times 10^{-9}$ | $2.14 \times 10^{-8}$ |
| Ferrite (c) | $9.59 \times 10^{-8}$ | $1.17 \times 10^{-5}$ | $3.10 \times 10^{-9}$ | $3.44 \times 10^{-6}$ |

Figure 2D:
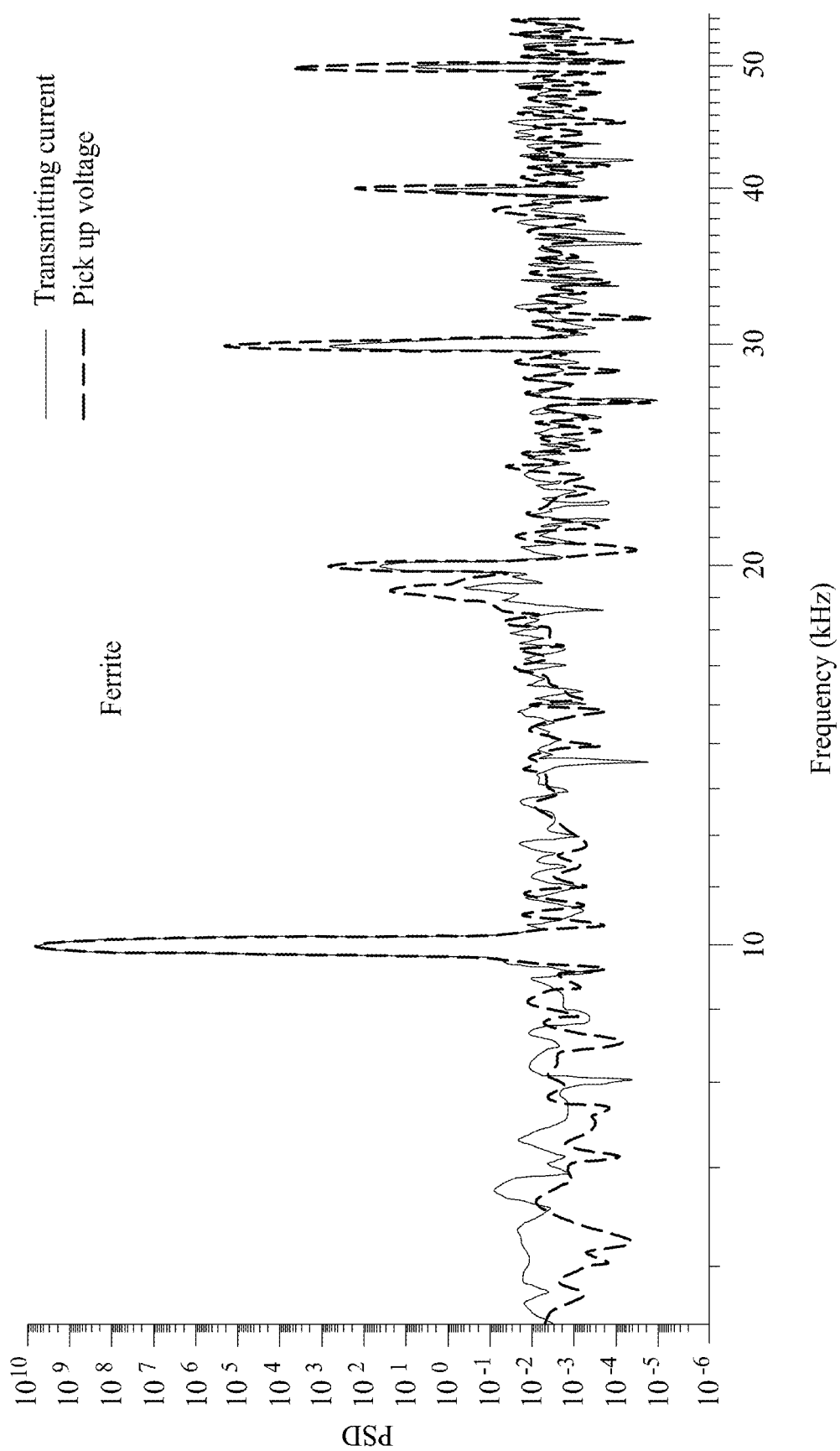

As can be seen in both examples, odd harmonics show orders of magnitude differences between the different material types, allowing for identification of different materials, for example. The nonlinear response changes dramatically once a coupon (sample 221) of martensite or ferrite (e.g., 38.1 mm (L)×25.4 mm(W)×4.7 mm (H)) is placed at the end of the coils. The even numbers of harmonics do not experience significant changes, while the peaks for odd number of harmonics increase dramatically, with the most significant increases coming from 3rd and 5th harmonics at 30 kHz and 50 kHz (e.g., in FIGS. 2C and 2D). In particular, the peak of 3rd harmonics increases by over one order of magnitude with a martensite coupon (FIG. 2C) and over three orders of magnitude with ferrite coupon (FIG. 2D). In the data shown, the primary harmonic peak is used as a standard calibration and normalized all higher order harmonics coefficients with respect to the primary peak.

Again, the most distinguishing signatures were seen to be the 3rd and 5th harmonics. The same phenomenon is observed with either the same-side configuration (e.g., of FIG. 2A) or the opposite-side configuration (e.g., of FIG. 3A). In both configurations, the significant contrasts of 3rd harmonics across air (~1-×$10^{-8}$), martensite (~1×$10^{-7}$ to 5×$10^{-7}$) and ferrite (~1×$10^{-5}$ to 5×$1^{-5}$) provide unique nonlinear magnetic signatures that can be directly utilized to detect the hard phases such as martensite phase that make up the hard spots in pipeline steel, for example.

In principle, the self-inductance of the transmitting coil is changed with ferromagnetic materials nearby, and the change should be naturally nonlinear due to the hysteretic response. We have observed relatively small increases in the PSDs of the transmitting current (solid curves in FIGS. 2B-3D) across air, martensite and ferrite samples. While it is possible to differentiate ferromagnetic materials by just analyzing voltage and current from a single transmitting coil, the signatures of different materials are not as distinguishable as compared to the measured responses from pickup coil. In this regard, the transmitting coil and the pickup coil can be the same coil in certain embodiments.

Referring to Table 3, in certain embodiments, the system 200 can be configured for use on a single side of the interrogated material and the transmitting and pickup coils can be placed at a preferred nearby location with a limited distance to the surface of the interrogated sample. The distance and/or the spacing between the interrogated sample and the two coils is called a lift-off distance. While the Table 1 and FIGS. 2C-2D demonstrated unique nonlinear magnetic signatures when the two coils are in direct contact with the surface of the interrogated sample, here Table 3 shows that similar unique nonlinear magnetic signatures are observed even when there is a lift-off distance of 0.8 mm or 2.0 mm. For either ferrite or martensite, the normalized $3^{rd}$ harmonics slightly decrease with increasing amount of lift-off distance, but overall the peak of 3rd harmonics in the case of ferrite is larger by about two orders of magnitude as compared to the case of martensite, regardless of the 0, 0.8 mm or 2.0 mm lift-off distance. This robust and significant contrasts of 3rd harmonics, martensite ($\sim 1\times 10^{-7}$ to $5\times 10^{-7}$) and ferrite ($\sim 1\times 10^{-5}$ to $5\times 10^{-5}$), provide unique nonlinear magnetic signatures that can be directly utilized to detect specific material phases such as martensite phase even when a constant or time-varying lift-off distance is present during applications.

TABLE 3

| | $3^{rd}$ Harmonics normalized to $1^{st}$ peak | | |
|---|---|---|---|
| | No lift-off | 0.8 mm lift-off | 2.0 mm lift-off |
| Martensite | $4.6 \times 10^{-7}$ | $3.0 \times 10^{-7}$ | $1.3 \times 10^{-7}$ |
| Ferrite | $3.8 \times 10^{-5}$ | $2.8 \times 10^{-5}$ | $1.6 \times 10^{-5}$ |

Figure 4A:
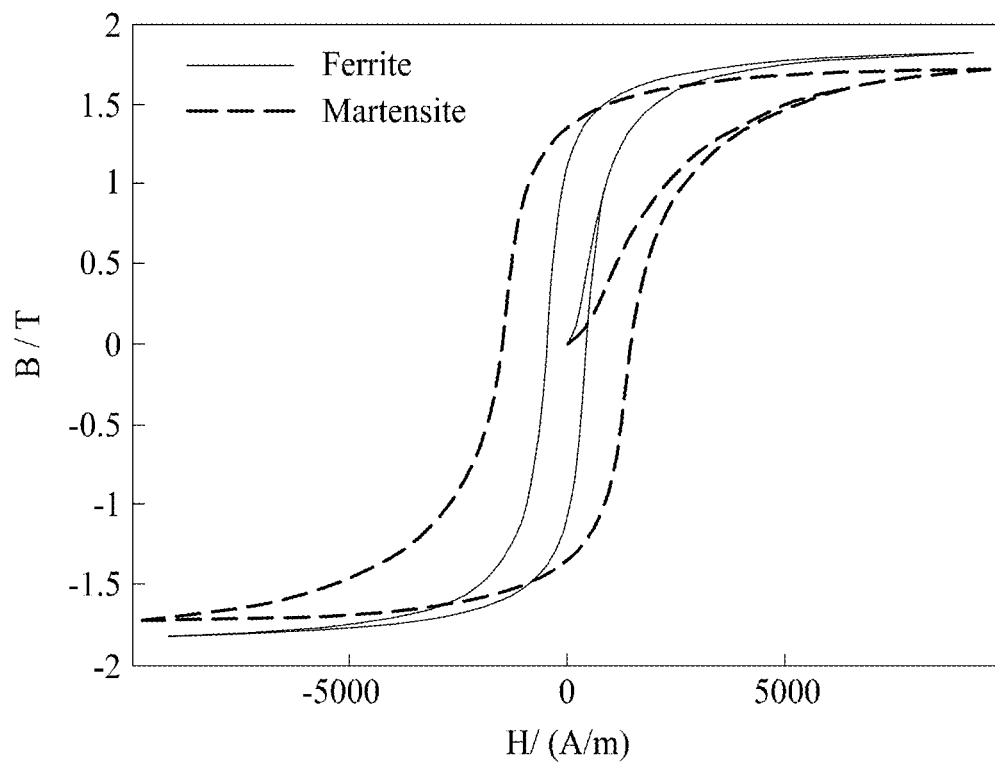
FIGS. 4A and 4B show simulation results on nonlinear magnetic detection of model materials with a same side configuration (e.g., of FIG. 2A).
Figure 4B:
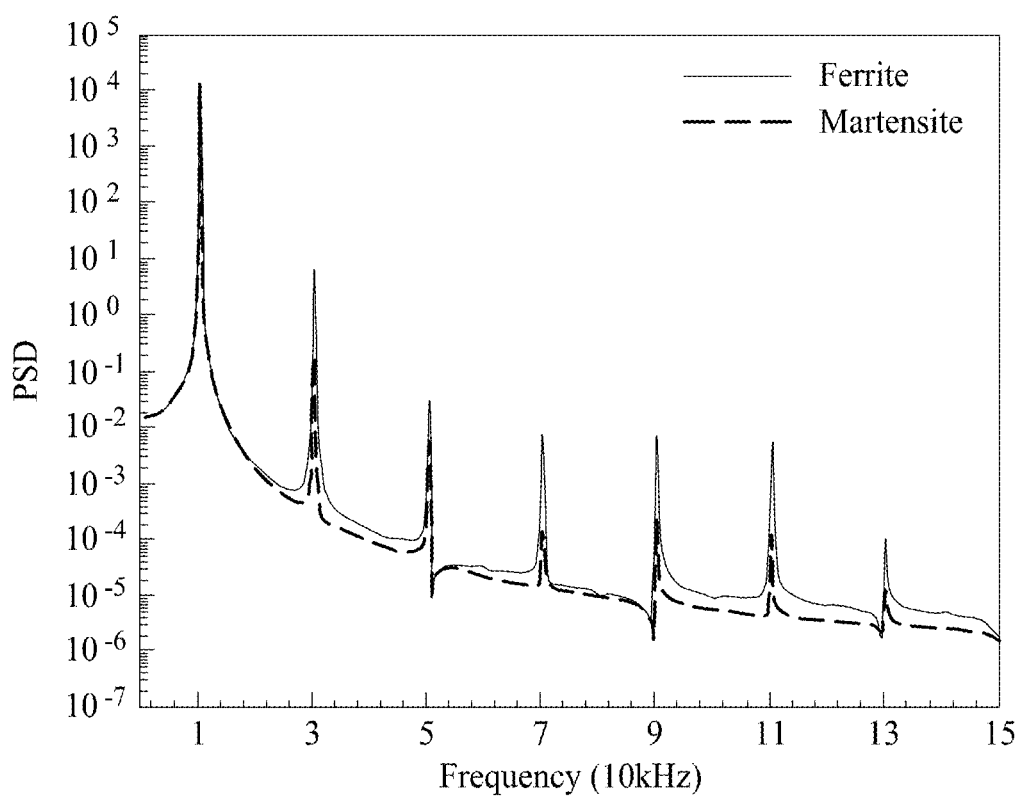

Referring to FIGS. 4A and 4B, computer simulations were performed to incorporate the magnetic hysteresis response and understand the experimentally observed 3rd harmonics of ferrite and martensite phases. The hysteresis models used here were originally developed by Jiles and Atherton, and are known as J-A model. There are five parameters in J-A model to describe the hysteretic response of a specific material, and in simulations these five parameters are obtained by best matching J-A hysteresis curves to experimental measurements in the literature. For ferrite and martensite phases, two different sets of parameters are obtained and the full hysteresis curves are shown in FIG. 4A (solid curve for ferrite phase and dashed curve for martensite phase). Then a COMSOL multiphysics computer software package is used to simulate magnetic response under the same experimental condition and parameters as in FIGS. 2A-3D.

The simulation incorporates full Maxwell equation solver with five J-A parameters to account for the nonlinear hysteretic magnetic permeability. As the simulation starts with zero residual magnetization, the results (FIG. 4B) show the presence of odd-number harmonics only in both ferrite and martensite cases, which is consistent with the theoretical description of symmetric B-H curve. Furthermore in the simulation results, the 3rd and 5th harmonics of ferrite are about 1.5 orders of magnitude (~40 times) larger than those of martensite, which also agree with the experimental observations above. With the reliable simulation tool, the quantitative linkage between the generation of harmonics and hysteresis curve has been elucidated, and additionally it is possible to design specific amplitude and frequency of AC magnetic modulation to optimize the detection of hard phase in specific applications.

FIG. 4A shows full hysteresis curves for ferrite (solid) and martensite (dashed). Five J-A parameters are obtained by matching hysteresis curves to experimental measurements in literature. FIG. 4B shows simulated Power Spectral Density (PSD) results for nonlinear magnetic detection of martensite (dashed) and ferrite (solid) in the configuration of FIG. 2A. As can be seen, only odd harmonics show up due to symmetric magnetization. For 3rd and 5th harmonics, about 1.5 orders of magnitude difference between ferrite and martensite is consistent with experimental observations above.

In the next example, additional experimental tests are performed to better understand the measured non-linear signatures. As the hysteresis loop for ferromagnetic materials is highly nonlinear and history dependent, we would expect that the nonlinear magnetic response of these materials depend on their magnetization states. Therefore, the measurement of nonlinear magnetic response could in principle be an indicator of magnetization state of the testing materials, and could provide additional information in the detection of magnetic anomalies.

Based on the theoretical description, a locally symmetric hysteresis loop would result in odd numbers of harmonics only and this would occur in two scenarios: 1) The material has small residual magnetization compared to its saturation magnetization, and this applies to the cases in FIGS. 2A-3D, or 2) The materials are externally magnetized in a direction that is perpendicular to the small AC magnetic modulation.

Figure 5A:
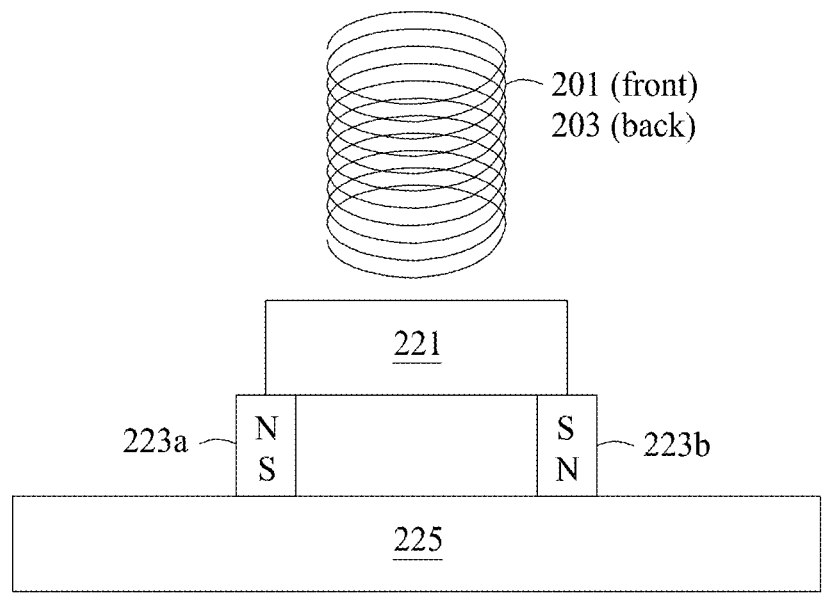
FIGS. 5A and 5B show schematic embodiments of a set up to test nonlinear magnetic response of model materials under strong external magnetic field.

The latter scenario is tested in FIG. 5A. The same coupons 221 (ferrite or martensite, 38.1 mm (L)×25.4 mm(W)×4.7 mm (H)) are magnetized across its longer edge with two neodymium permanent magnets 223a, 223b placed at the ends of the coupon 221. One of the magnets 223a has its north pole facing up and the other one 223b is in opposite orientation. A large carbon steel plate 225 is attached at the bottom to complete the magnetic flux loop. The bundle of transmitting and pickup coils 201, 203 has a cross-section dimension of 1 inch by 2 inches, and we align the shorter side (1 inch) of the coil-bundle with the longer side (1.5 inches) of the coupon 221 to avoid the interference with fringe field near the ends, as in FIG. 5(A). In this scenario, the magnetization at the center of coupon 221 is in horizontal direction while the small AC magnetic modulation from the coil is in vertical direction. The experimental results are shown in Table 4, and for both ferrite and martensite cases, all the peaks of harmonics experience very small changes before and after this perpendicular magnetization. In addition, the even numbers of harmonics are very small and similar to the noise level as in the baseline air case (1st line of the table), which is consistent with our theoretical description.

This symmetry in hysteresis loop can be broken if the direction of magnetization is not perpendicular to the direction of AC modulation. If we rotate the coil-bundle by 90 degrees horizontally and align its longer side (~2 inches) with the longer side of the steel coupon as in FIG. 5B, the AC magnetic modulation generated from the transmitting coil 201 is strongly interfering with the fringe field at the end of the steel coupon, and thus breaks the symmetry in the hysteresis loop and would allow even numbers of harmonics. Compared to the steel coupons without magnetization in the same configuration, in Table 4-5 we have indeed observed experimentally an increase in the 2nd harmonics that is consistent with our theory. In addition, the peaks for odd numbers of harmonics are reduced by at least one order of magnitude.

Figure 5B:
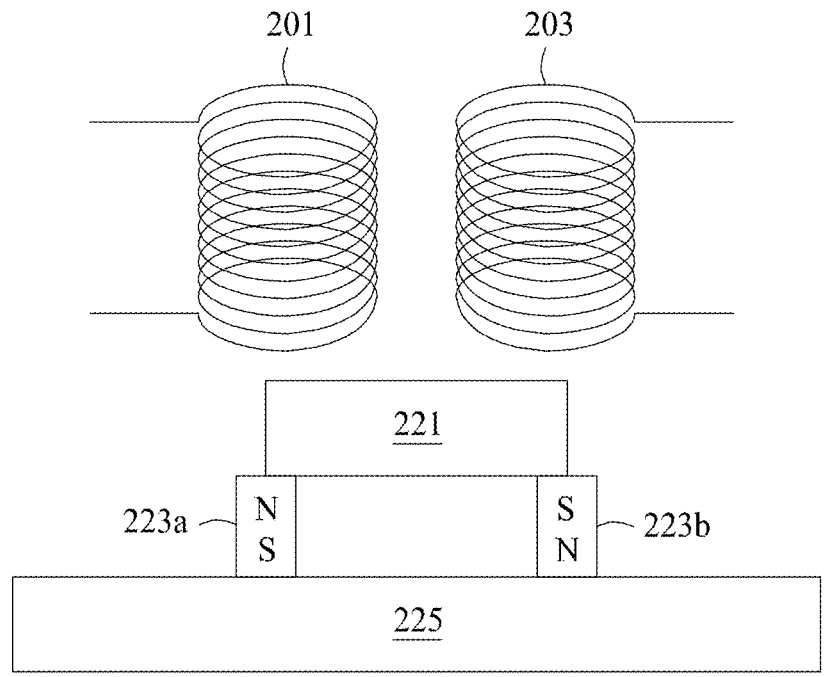

FIGS. 5A and 5B show embodiments of a set up for testing nonlinear magnetic response of model materials under strong external magnetic field. In the embodiment of FIG. 5A, when the shorter side of coil-bundle aligns with the longer side of steel coupon, the magnetic modulation is mostly perpendicular to the external magnetization in steel coupon. Thus the external magnetization does not change the nonlinear response, and the experimental results are summarized in Table 4 below.

TABLE 4

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Air | $4.71 \times 10^{-8}$ | $1.32 \times 10^{-8}$ | $3.92 \times 10^{-9}$ | $2.91 \times 10^{-9}$ |
| Martensite without magnet | $1.92 \times 10^{-8}$ | $1.32 \times 10^{-7}$ | $3.85 \times 10^{-9}$ | $8.97 \times 10^{-9}$ |
| Martensite with magnet | $4.67 \times 10^{-8}$ | $1.56 \times 10^{-7}$ | $2.41 \times 10^{-9}$ | $1.26 \times 10^{-8}$ |

TABLE 4-continued

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Ferrite without magnet | $7.30 \times 10^{-8}$ | $2.91 \times 10^{-6}$ | $4.15 \times 10^{-9}$ | $8.69 \times 10^{-8}$ |
| Ferrite with magnet | $4.03 \times 10^{-8}$ | $4.51 \times 10^{-6}$ | $7.20 \times 10^{-9}$ | $1.86 \times 10^{-7}$ |

In the embodiment of FIG. 5B, when the longer side of coil-bundle aligns with the longer side of steel coupon, the magnetic modulation strongly interferes with the fringe field in the steel and they are barely perpendicular to each other. The symmetry breaking leads to a rise in 2nd harmonics and a surprising depression of odd numbers of harmonics, as summarized in Table 5 below.

TABLE 5

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Air | $4.71 \times 10^{-8}$ | $1.32 \times 10^{-8}$ | $3.92 \times 10^{-9}$ | $2.91 \times 10^{-9}$ |
| Martensite without magnet | $2.35 \times 10^{-8}$ | $4.58 \times 10^{-7}$ | $4.30 \times 10^{-9}$ | $2.43 \times 10^{-8}$ |
| Martensite with magnet | $2.63 \times 10^{-7}$ | $4.09 \times 10^{-8}$ | $2.07 \times 10^{-9}$ | $1.78 \times 10^{-9}$ |
| Ferrite without magnet | $1.38 \times 10^{-7}$ | $3.60 \times 10^{-5}$ | $2.99 \times 10^{-8}$ | $1.07 \times 10^{-6}$ |
| Ferrite with magnet | $3.95 \times 10^{-7}$ | $5.62 \times 10^{-7}$ | $1.45 \times 10^{-9}$ | $1.53 \times 10^{-8}$ |

Figure 6A:
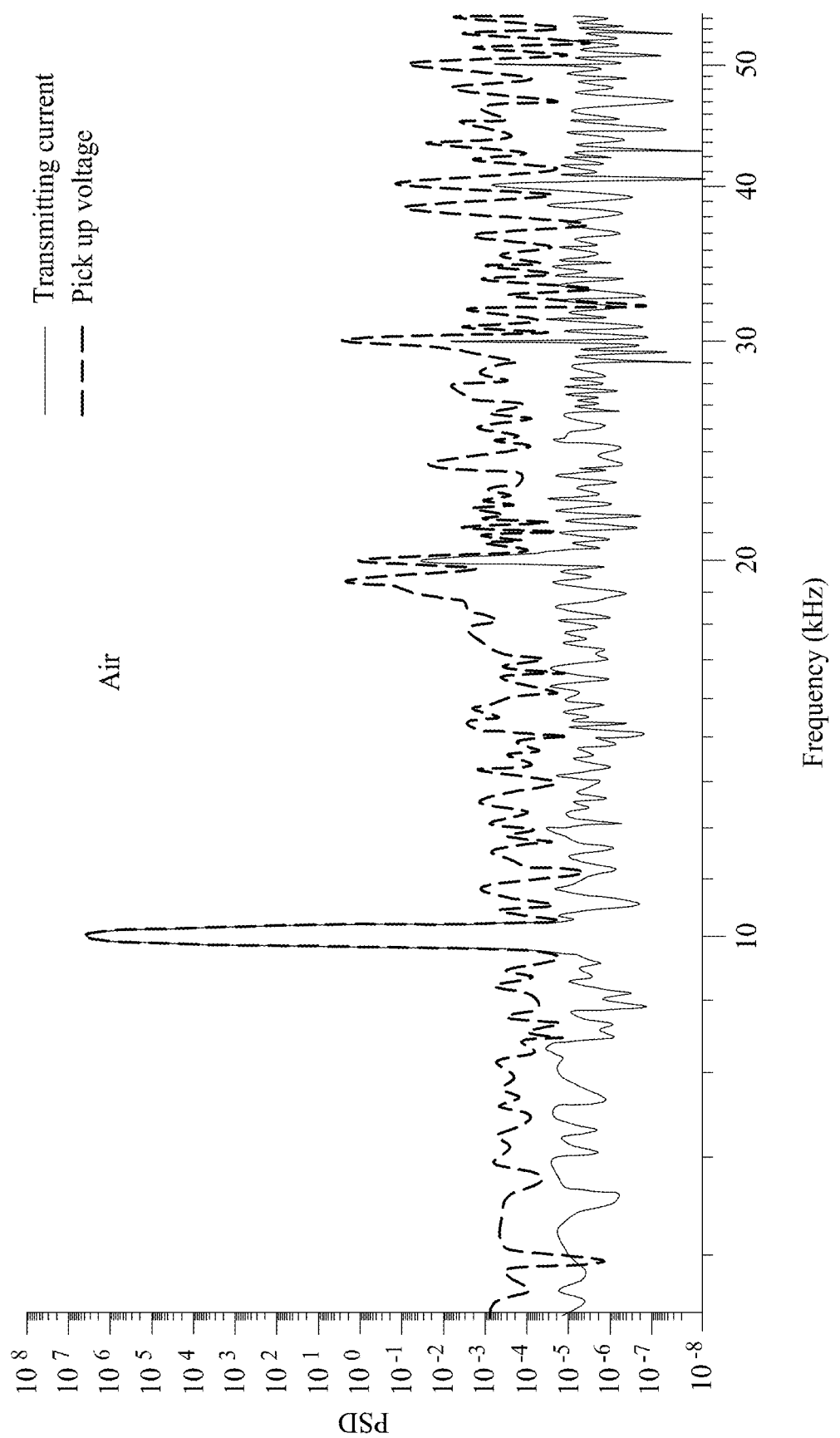
FIGS. 6A-6C show second harmonics PSD test results at different frequencies.
Figure 6B:
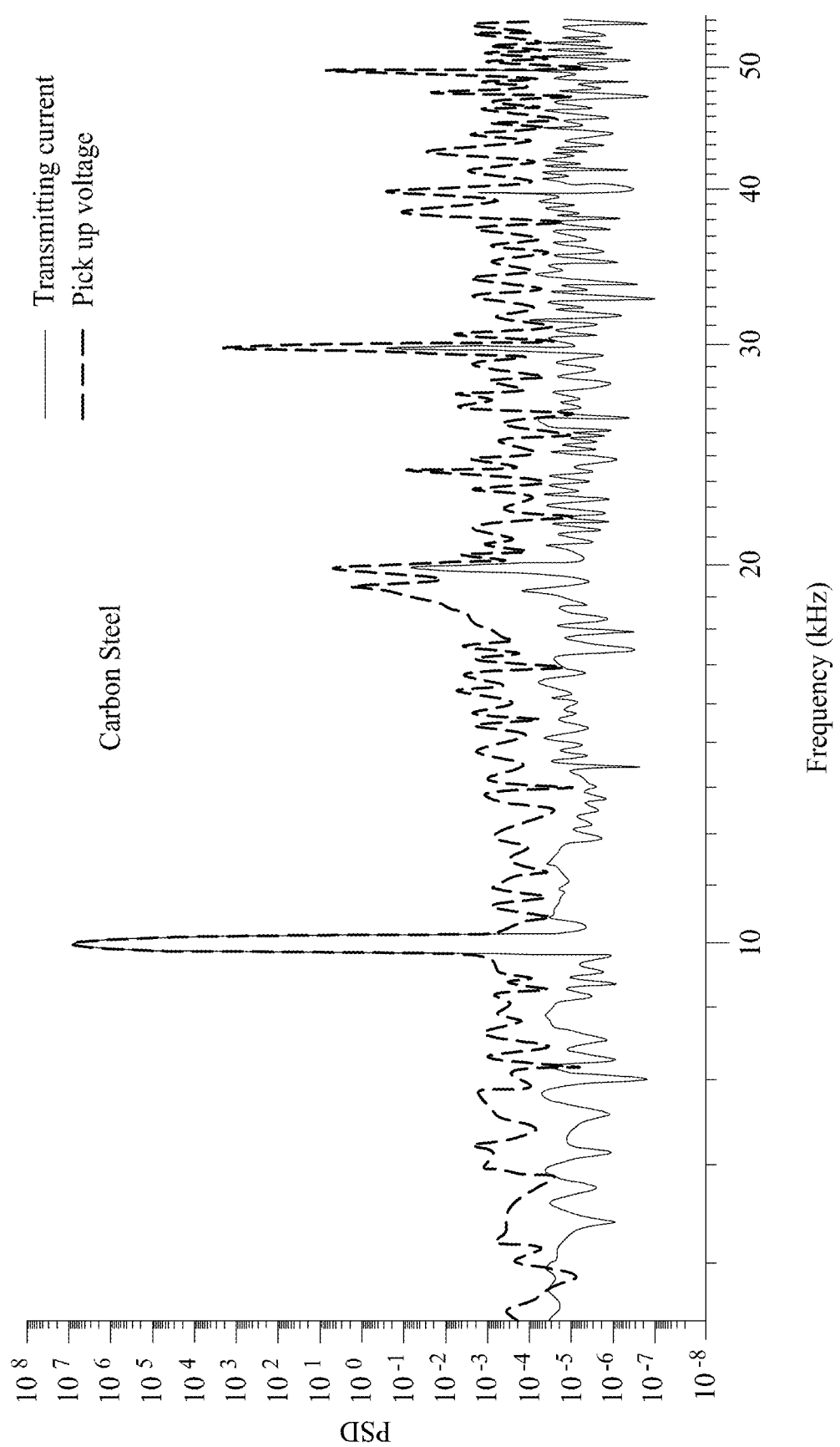
Figure 6C:
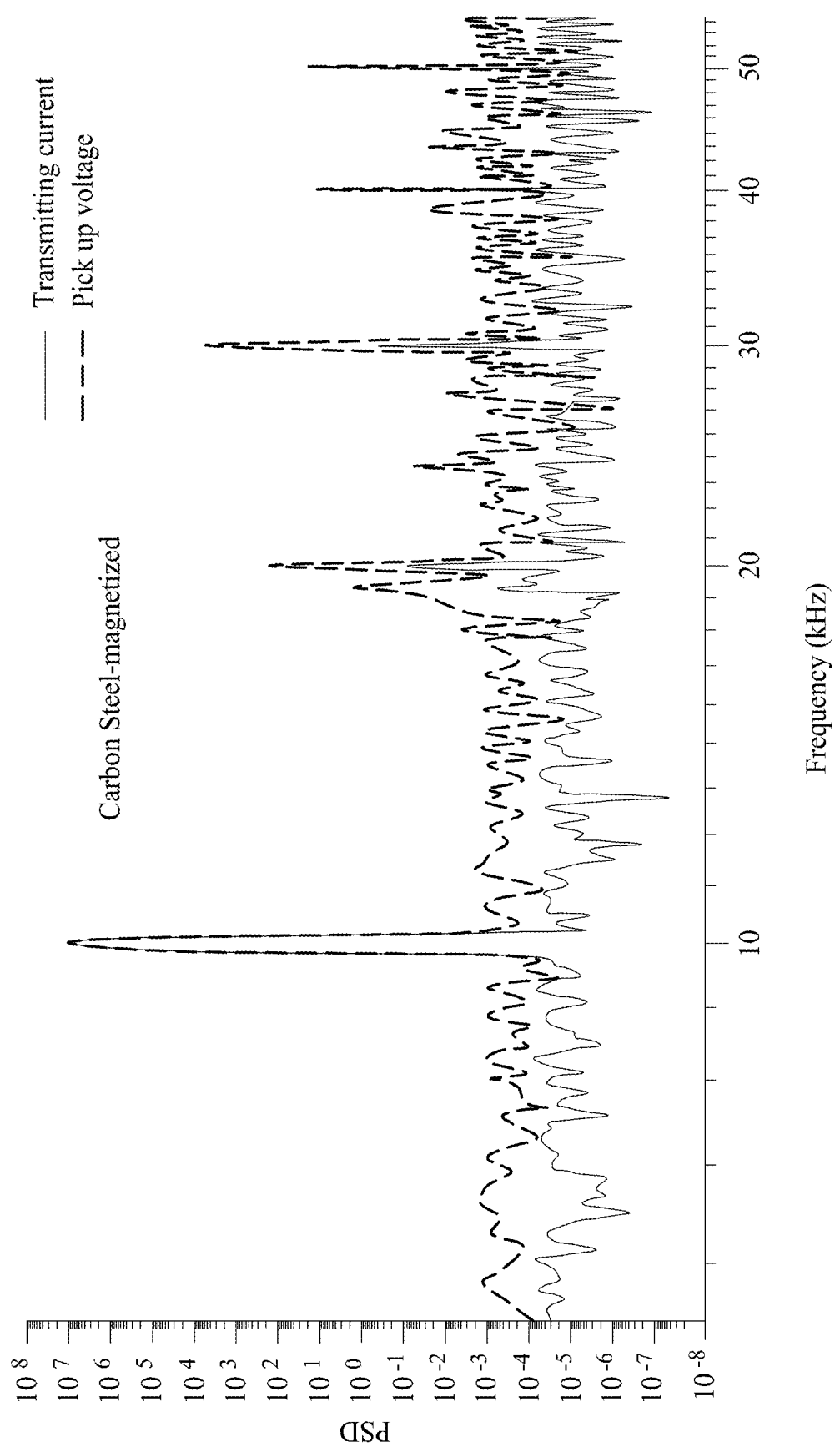

To see a more pronounced symmetry breaking effect, a ferromagnetic material can be strongly magnetized and the external magnetization can be removed afterwards. A test was performed using a sample of low carbon steel that has a remanence or residual magnetization that is over half the value of saturation magnetization, which and is an model material. In FIGS. 6A-6C, a series of tests on this carbon steel sample were performed before and after magnetization. Before the low carbon steel plate is strongly magnetized, a significant increase in odd harmonics is detected as shown in FIG. 6B similar to previous data in Table 1 and 2. The large carbon steel plate is then magnetized locally around a specific point "B" with a 1.27 cm-cubic 0.8 Tesla Neodymium permanent magnet. After removing the permanent magnet from the plate, the residual magnetization near point "B" should be over 0.4 Tesla on the carbon steel plate. Compared to the PSD of carbon steel before the magnetization (FIG. 6B), the nonlinear magnetic detection near magnetized area "B" shows a strong increase in even number of harmonics in FIG. 6C. It is now clear that in addition to the steel phase detection by odd numbers of harmonics, the detection of even numbers of harmonics could provide additional materials information, such as magnetization state of the materials, including the pre-existing residual magnetization of the materials. FIGS. 6A-6C show Power Spectral Density (PSD) results for nonlinear magnetic detection of air (FIG. 6A), low carbon steel plate (FIG. 6B), and low carbon steel plate after magnetization (FIG. 6C) as measured in a FIG. 2A configuration. The dashed curve and solid curve are PSDs of pickup voltage and transmitting current respectively. Table 6 summarizes normalized harmonic coefficients for the pickup voltages across all the samples here.

TABLE 6

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Air (a) | $3.25 \times 10^{-7}$ | $8.03 \times 10^{-7}$ | $4.44 \times 10^{-8}$ | $2.22 \times 10^{-8}$ |
| Martensite (b) | $5.70 \times 10^{-7}$ | $1.97 \times 10^{-4}$ | $3.16 \times 10^{-8}$ | $8.23 \times 10^{-7}$ |
| Ferrite (c) | $1.49 \times 10^{-5}$ | $4.30 \times 10^{-4}$ | $9.93 \times 10^{-7}$ | $1.61 \times 10^{-6}$ |

In FIGS. 6A-6C, the pickup circuit was slightly modified to enhance the signal-to-noise ratio around the 3rd harmonics (using a RLC bandpass filter with resonance frequency at 30 kHz), and, as a result, the baseline calibration in air environment experience stronger harmonics from electronic noise while the ratios of higher order harmonics between samples are not altered.

In addition to the manipulation of magnetization of steel, the samples were tested at different frequencies, from 1 kHz to 100 kHz. A few examples with low carbon steel at 1 kHz and 10 kHz are shown in Table 7, and examples with 100 kHz are shown later in FIGS. 9D-F. Table 7 shows normalized harmonic coefficients for nonlinear magnetic detection of air and carbon steel at 1 kHz and 10 kHz.

TABLE 7

| | Harmonics normalized to $1^{st}$ peak | | | |
|---|---|---|---|---|
| | $2^{nd}$ Harmonics | $3^{rd}$ Harmonics | $4^{th}$ Harmonics | $5^{th}$ Harmonics |
| Air (10 kHz) | $5.28 \times 10^{-8}$ | $2.50 \times 10^{-8}$ | $4.17 \times 10^{-9}$ | $3.70 \times 10^{-9}$ |
| Carbon steel (10 kHz) | $2.30 \times 10^{-8}$ | $1.39 \times 10^{-5}$ | $5.29 \times 10^{-9}$ | $3.33 \times 10^{-7}$ |
| Air (1 kHz) | $3.00 \times 10^{-8}$ | $9.00 \times 10^{-9}$ | $1.05 \times 10^{-8}$ | $3.55 \times 10^{-8}$ |
| Carbon steel (1 kHz) | $4.29 \times 10^{-8}$ | $1.12 \times 10^{-6}$ | $1.43 \times 10^{-8}$ | $1.72 \times 10^{-7}$ |

With a frequency-dependent skin depth of conductive materials $$d_p = \sqrt{\frac{1}{\pi f \mu \sigma}}$$

and the complicated dynamics of magnetic domain walls, it is hard to predict the frequency dependency of the nonlinear magnetic response. However, our experiment demonstrated it is possible to measure a significant nonlinear magnetic response in ferromagnetic materials across the frequency band from 1 kHz to 100 kHz, and this frequency-dependent response can be used to provide material information from different depths.

Figure 7A:
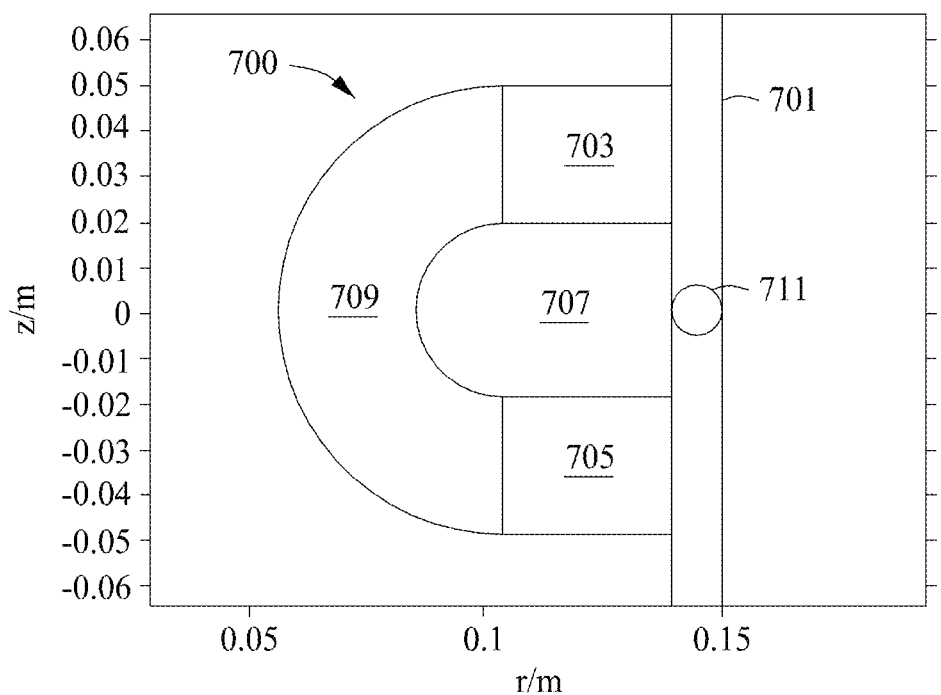
FIGS. 7A-7C show axial symmetric simulation of a horseshoe magnet on a steel pipe.
Figure 7B:
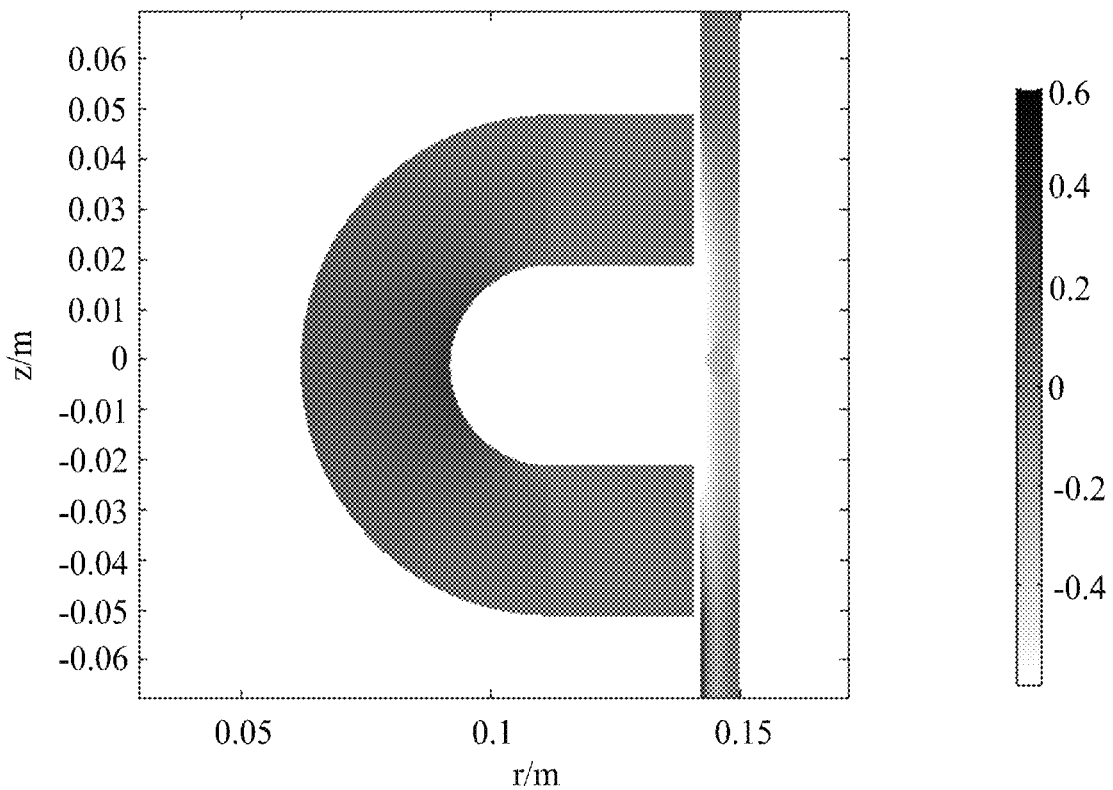
Figure 7C:
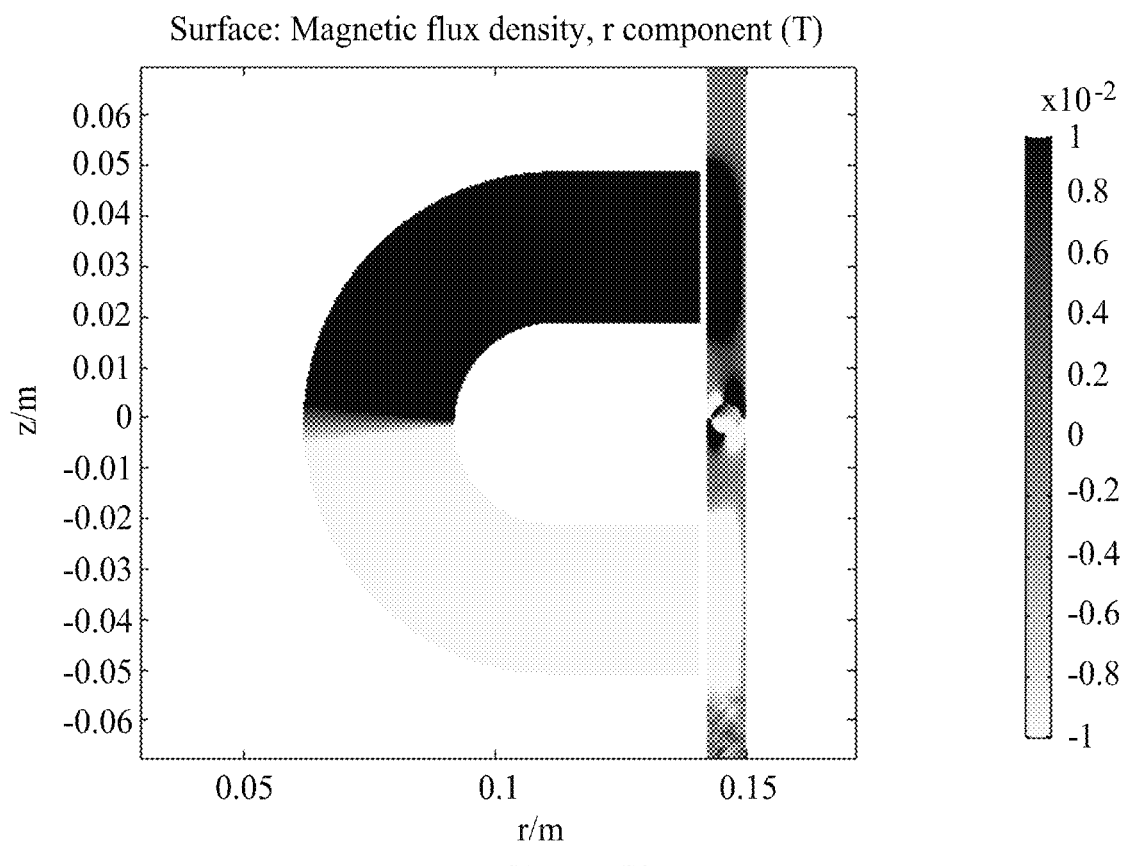

In accordance with at least one aspect of this disclosure, embodiments include, but not limited to, using an external magnetic field to regulate nonlinear magnetoacoutic detection. A computer simulation was performed to demonstrate the functioning of such embodiments. Although the symmetry breaking effects lead to the generation of even numbers of harmonics, which could be useful to probe the residual magnetization of steel, the effects on odd numbers of harmonics can be relatively complicated. Both enhancement of 3rd harmonics as in FIGS. 6B and 6D and reduction of 3rd harmonics as in FIG. 5B have been observed. Referring to FIGS. 7A-7C, which illustrate without limiting the embodiments of a method of regulating magnetization in a steel pipe to achieve consistency in measurements and avoid such potential complications is described. Embodiments of the method involve an external magnetic field applied by a horseshoe magnet with magnetization of $10^5$ A/m and dimensions specified in the legend of FIG. 7A. COMSOL multiphysics computer software package can be used to simulate the magnetic field strength when the horseshoe magnet is moving vertically along the pipe wall at a speed of 0.5 m/s, for example. FIGS. 7B and 7C show the spatially varying induced magnetic field.

FIG. 7A shows an embodiment of a moving horseshoe magnet 700 on a steel pipe 701. Regions 703 and 705 are squares with width 3 cm. Region 707 has a vertical length of 4 cm. Region 709 has an inner diameter of 2 cm and outer diameter of 5 cm. The pipe is axial symmetric with a radius of 15 cm and thickness of 8 mm. The pipe composed of ferrite phase except for a circular region 711 of radius 3 mm. The magnet is moving vertically up at a speed of 0.5 m/s. FIG. 7B shows a vertical z-component of magnetic flux density in the horseshoe magnet and pipe wall. FIG. 7C shows an embodiment a horizontal r-component of magnetic flux density in the horseshoe magnet and pipe wall.

The magnetic field in the steel pipe between the legs of horseshoe is almost along the vertical z-direction ($|B_z|$~−0.2 to 0.4 T) with a minor perturbation of $|B_r|$~up to $0.8*10^{-2}$ T in the horizontal direction owing to the small hard phase defect and the hysteretic nature of the material. As a result, this external magnetic regulation could effectively modify and align the magnetization in steel pipe along the vertical axis near the circular region 711 in FIG. 7A, and a small perpendicular AC magnetic modulation based on this configuration would be one of the preferred implementation in pipeline application as it leads to a unique and comprehensible 3rd harmonic signature as demonstrated in FIG. 5A.

Figure 8A:
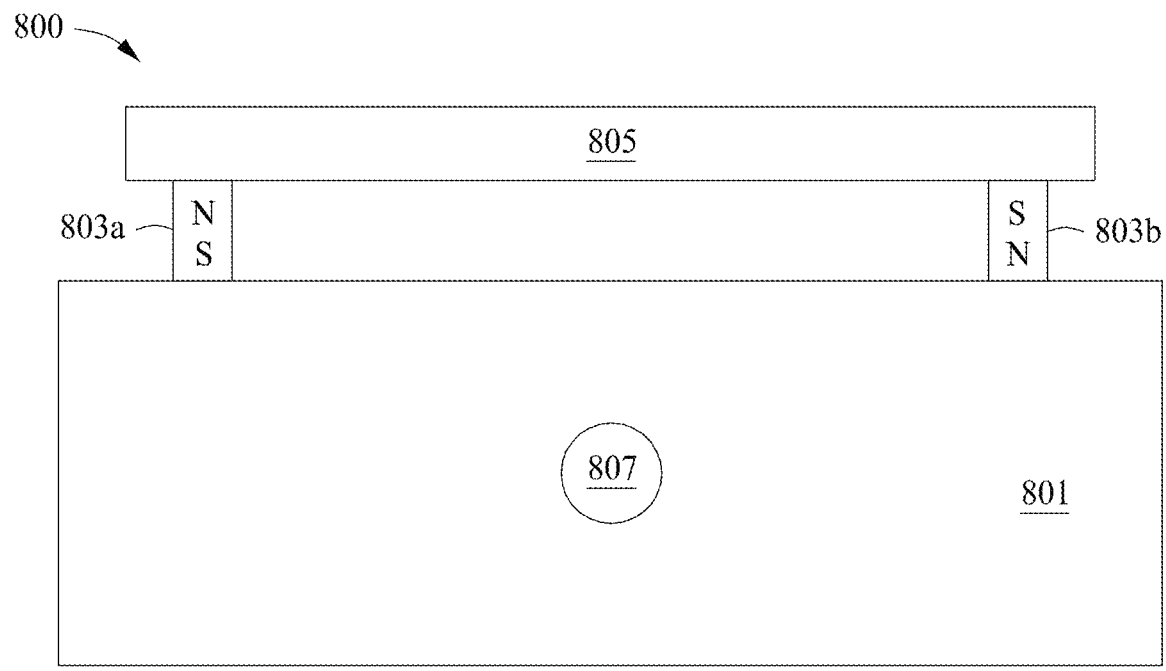
FIG. 8A shows an embodiment of a setup for nonlinear magnetoacoustic detection.
Figure 8B:
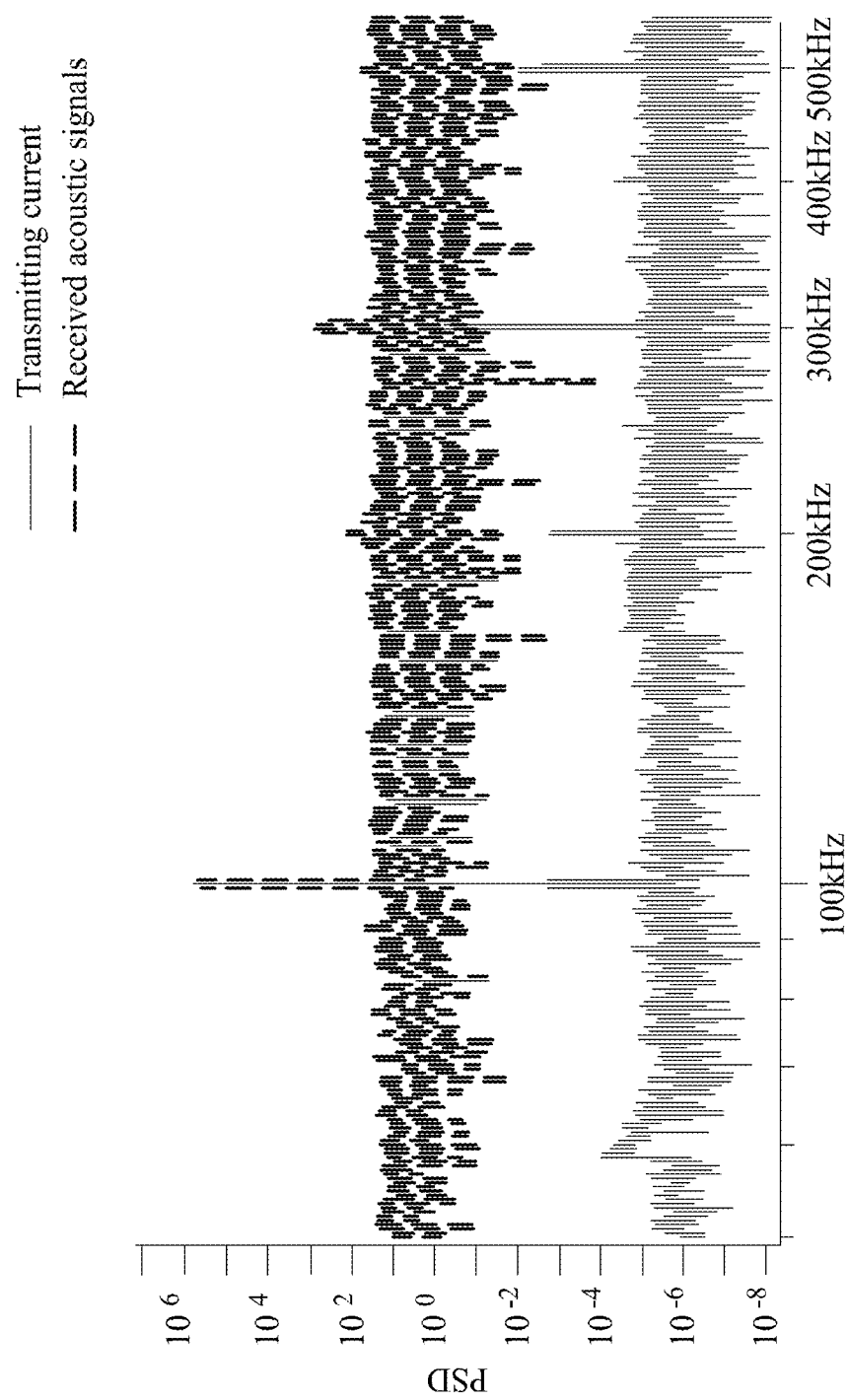
FIG. 8B shows PSD results for nonlinear magnetoacoustic detection.
Figure 9:
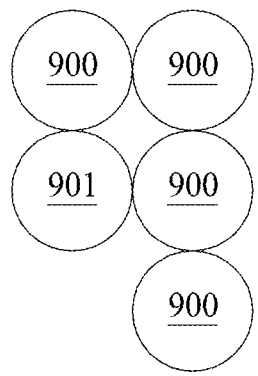
FIG. 9 is an example arrangement that includes 4 copies of magnetic sensors and/or acoustic sensors at different locations around and/or paired with each magnetic transmitter.
Figure 10:
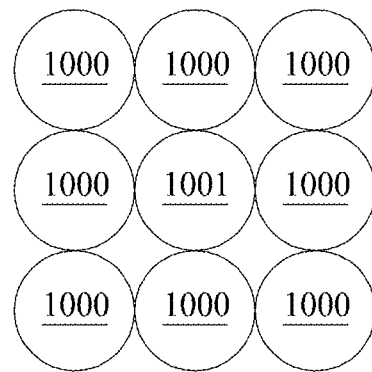
FIG. 10 is an example arrangement that includes 8 copies of magnetic sensors and/or acoustic sensors at different locations around and/or paired with each magnetic transmitter.

Referring now to FIGS. 8A and 8B, along with nonlinear magnetic detection, embodiments herein include nonlinear magnetoacoustic detection based on the same principle. FIG. 8A shows an embodiment of a setup 800 for nonlinear magnetoacoustic detection. A large carbon steel plate 801 (6 inches by 2 inches by 0.5 inch) can be magnetized with two Neodymium permanent magnets 803a, 803b, for example. A carbon steel rod 805 (or any other suitable material rod) can be attached to the opposite sides of permanent magnets 803a, 803b to complete magnetic flux loop. An acoustic transducer 807 can be attached (e.g., glued) to the front center of the 6-by-2-inches surface of the carbon steel plate 801, and the current transmitting coil (not illustrated) can be attached to the back center of the opposing surface of the carbon steel plate.

When a large carbon steel plate is magnetized with two Neodymium permanent magnets attached as in FIG. 8A, there is a strong DC magnetic field $B_{DC}(\vec{r})$ inside the carbon steel plate. Once a small AC magnetic modulation is applied with the transmitting coil, the time varying magnetic fields generates an oscillating Eddy current $J_{eddy}(\vec{r}, t)$, which interacts with strong DC magnetic field, resulting in an oscillating Lorentz body force $f(\vec{r}, t) = J_{eddy}(\vec{r}, t) \times B_{DC}(\vec{r})$ and mechanical motion. This coupled response is commonly called magnetoacoustic response, and the mechanical motion is measured through an acoustic sensor such as a piezoelectric acoustic transducer.

FIG. 8B shows the experimental PSD results for nonlinear magnetoacoustic detection. The dashed curve and solid curve are PSDs of received acoustic signals and transmitting current respectively. As the transducer used for simulation has a resonance frequency of 500 kHz, the mechanical motion was barely measurable for 10 kHz magnetic modulation. A 100 kHz magnetic modulation was used instead, and a strong 3rd harmonics generation in the PSD of acoustic signal (dashed curve in FIG. 8B) was observed. As discussed above, weaker 3rd harmonics also show up in the PSD of transmitting current (solid curve in FIG. 8B) due to the change in self-inductance.

The implementation or design of the non-destructive material inspection systems described herein can include, but is not limited to, multiple copies of magnetic transmitters, magnetic sensors, acoustic sensors, and horseshoe magnets located at positions placed at a preferred nearby location of the interrogated material. In certain embodiments, such implementation includes, but is not limited to, one or more copies of magnetic sensors and/or acoustic sensors paired with one magnetic transmitter. In certain embodiments, a preferred arrangement includes 4 copies of magnetic sensors and/or acoustic sensors 900 at different locations around and/or paired with each magnetic transmitter 901 (shown in FIG. 9). A more preferred arrangement may include 8 copies of magnetic sensors and/or acoustic sensors 1000 at different locations around and/or paired with each magnetic transmitter 1001 (shown in FIG. 10). An even more preferred arrangement may include maximum copies of magnetic sensors and/or acoustic sensors with different sizes and at different locations around and/or paired with each magnetic transmitter. In certain embodiments, such implementation includes, but is not limited to, at least one horseshoe magnet with its two legs contacting the surface of interrogated material. In certain embodiments, such implementation includes, but is not limited to, at least one magnetic transmitter, and at least one of either magnetic sensor or acoustic sensor located at the center of the horseshoe magnets. In certain embodiments, such implementation includes, but is not limited to, an optional magnet or electromagnet to regulate the magnetization in the interrogated material. In certain embodiments, such implementation includes, but is not limited to, an optional magnet or electromagnet to provide DC magnetic field.

Figure 11A:
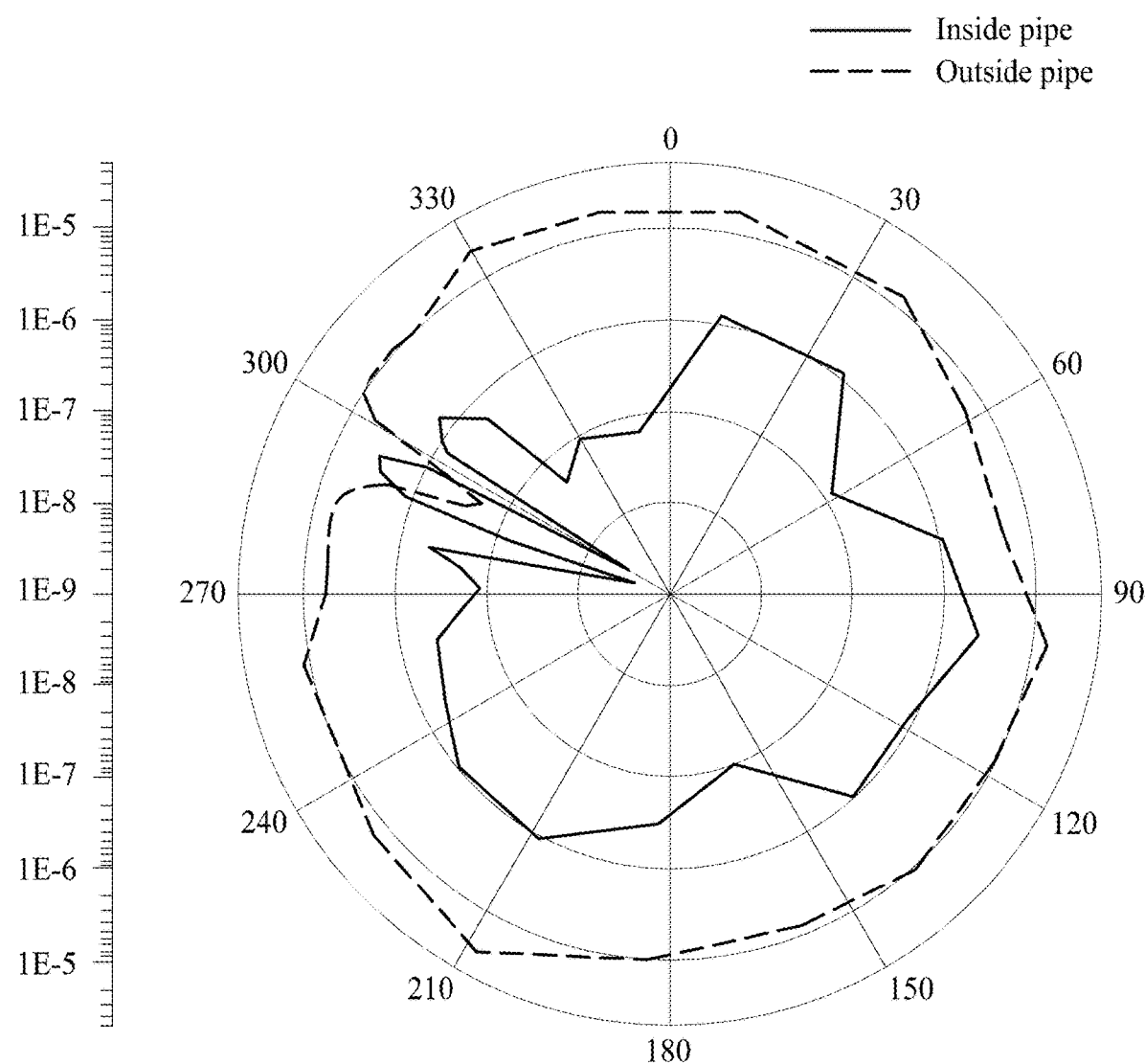
FIGS. 11A-11F shows data of nonlinear magnetic detection on real pipe with hard phase in the weld (FIGS. 11A, 11B, 11D, and 11E) and pipe section without hard phase in the weld (FIGS. 11C and 11F).
Figure 11B:
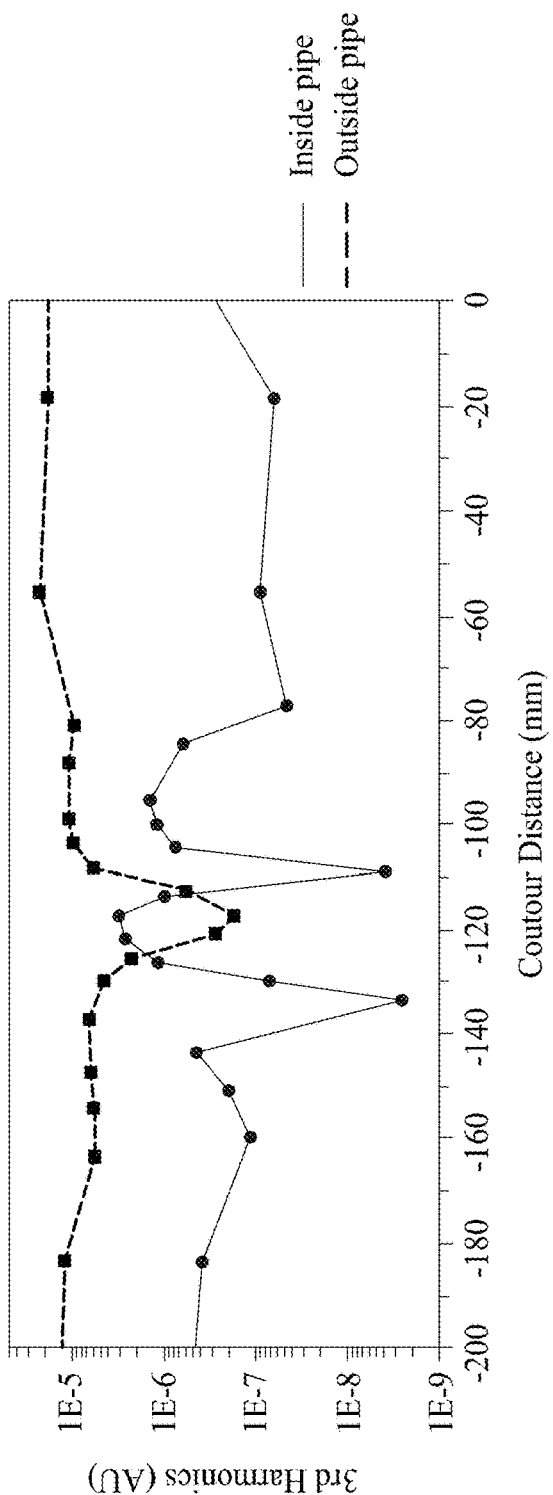

In accordance with at least one aspect of this disclosure, embodiments can be used without limitation for detection on real pipe with hard phase in the weld. Referring to FIGS. 11A-11F, embodiments can be applied to detect anomalies in real pipeline steel, for example. A cylindrical pipe section about 10 cm long with a radius of 21 cm and thickness of 0.5 cm was tested, which was taken from a vintage, pre-70s pipeline. The majority of the pipe has ferrite/pearlite phase, while the seam weld in the pipe was joined by electrical resistance welding without heat treatment and thus it contains bainite or martensite hard steel phase. During measurement, the longer side of the coil-bundle is aligned with the circumferential direction. The nonlinear magnetic response at different angular positions was measured, both from inside and outside of the pipe section at 10 kHz magnetic modulation, and the normalized 3rd harmonics coefficients are shown in FIGS. 11A and 11B.

Figure 11C:
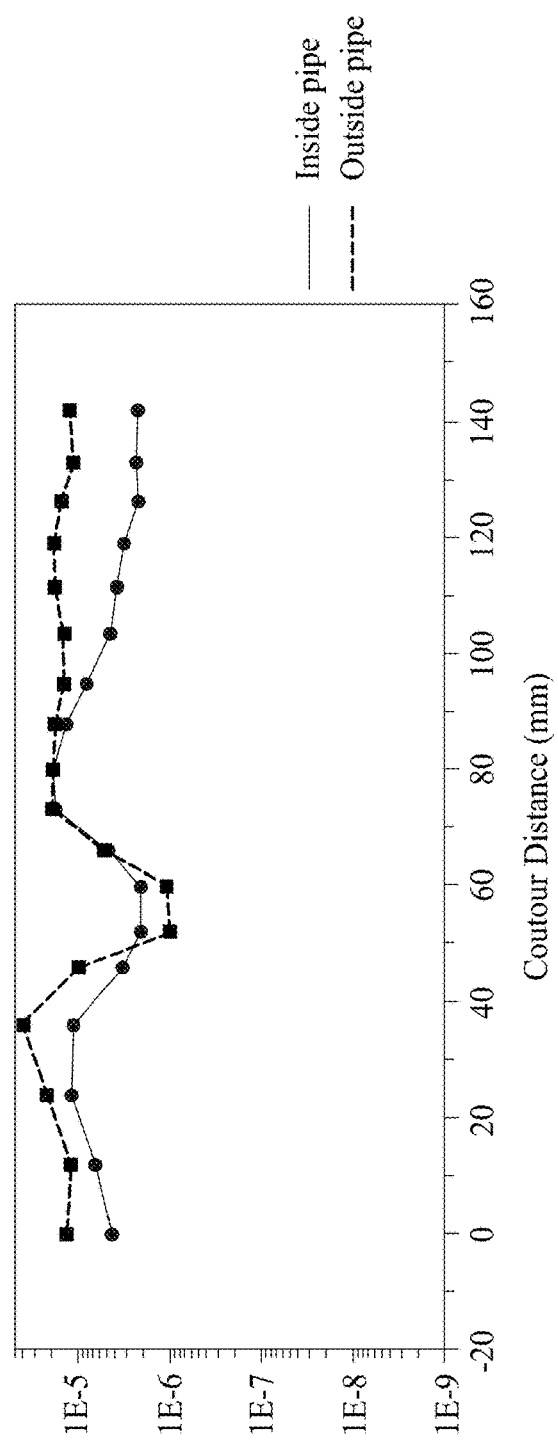

FIG. 11A shows data of normalized 3rd harmonics coefficients around the cylindrical pipe section with 10 kHz magnetic modulation. The dashed curve represents the measurements from outside of the pipe and the solid curve represents the measurements from inside of the pipe. FIG. 11B shows the same data in FIG. 11A plotted against circumferential distance from the seam weld. FIG. 11C shows data of normalized 3rd harmonics coefficients with 10 kHz magnetic modulation, which was measured in a separate experiment across an arc-shaped section of pipeline materials that does not have hard steel phase in its seam weld. The dashed curve represents the measurements from outside of the pipe and the solid curve represents the measurements from inside of the pipe.

In FIG. 11A, the measurement from outside of the pipe (dashed curve) shows a fluctuating 3rd harmonics around $1\times10^{-5}$ in ferrite/ferrite pearlite regions, and a dramatic decrease to almost $1\times10^{-7}$ near the seam weld that contains bainite or martensite hard steel phase. The angular position of the hard spot is identified as the minimal point in the dashed curve at 294.5 degrees, which is within 1 degree of the actual hard microstructure spot.

In embodiments where the coils are placed inside the pipe, the magnetic flux lines inside the cylinder can be quite different and can be highly compressed, which can alter the nonlinear measurement. The experimental measurement from inside of the pipe indeed shows a different pattern of 3rd harmonic responses (solid curve in FIG. 11A) and a double-minimal near the weld. From symmetry consideration, the midpoint of the double minimal (293.2 degrees) may best describe the position of the measured anomaly, which is also within 1 degree of the actual hard martensite spot. The quadruple pattern in the solid curve might come from a residual magnetization of the materials, while the double-minimal feature and the significantly lower harmonic response might result from a specific EM resonance mode inside the complete cylindrical pipe.

In comparison, in FIG. 11C we have tested an arc-shaped section of pipeline materials that does not have a hard phase such as martensite or bainite phase in its seam weld. The measurements from outside and inside of the pipe section are shown respectively as the dashed and solid curves in FIG. 11C. As this cut section is arc-shaped and not a complete cylindrical shape, the results from inside and outside are similar. Although both data show certain extent of reduction of 3rd harmonics around the actual weld flash (between 49 mm to 63 mm), these anomalies (coefficient $\sim 1\times10^{-6}$) are yet not significant enough to indicate the presence of hard phase such as martensite or bainite, which has a distinguishing signature close to $1\times10^{-7}$. Instead, a small crack of depth about 1 mm at outer surface of the weld flash was observed, and, as a result, the changes of 3rd harmonics in FIG. 11C can be used indicate the presence of air gaps, cracks or different stress states around the weld.

Figure 11D:
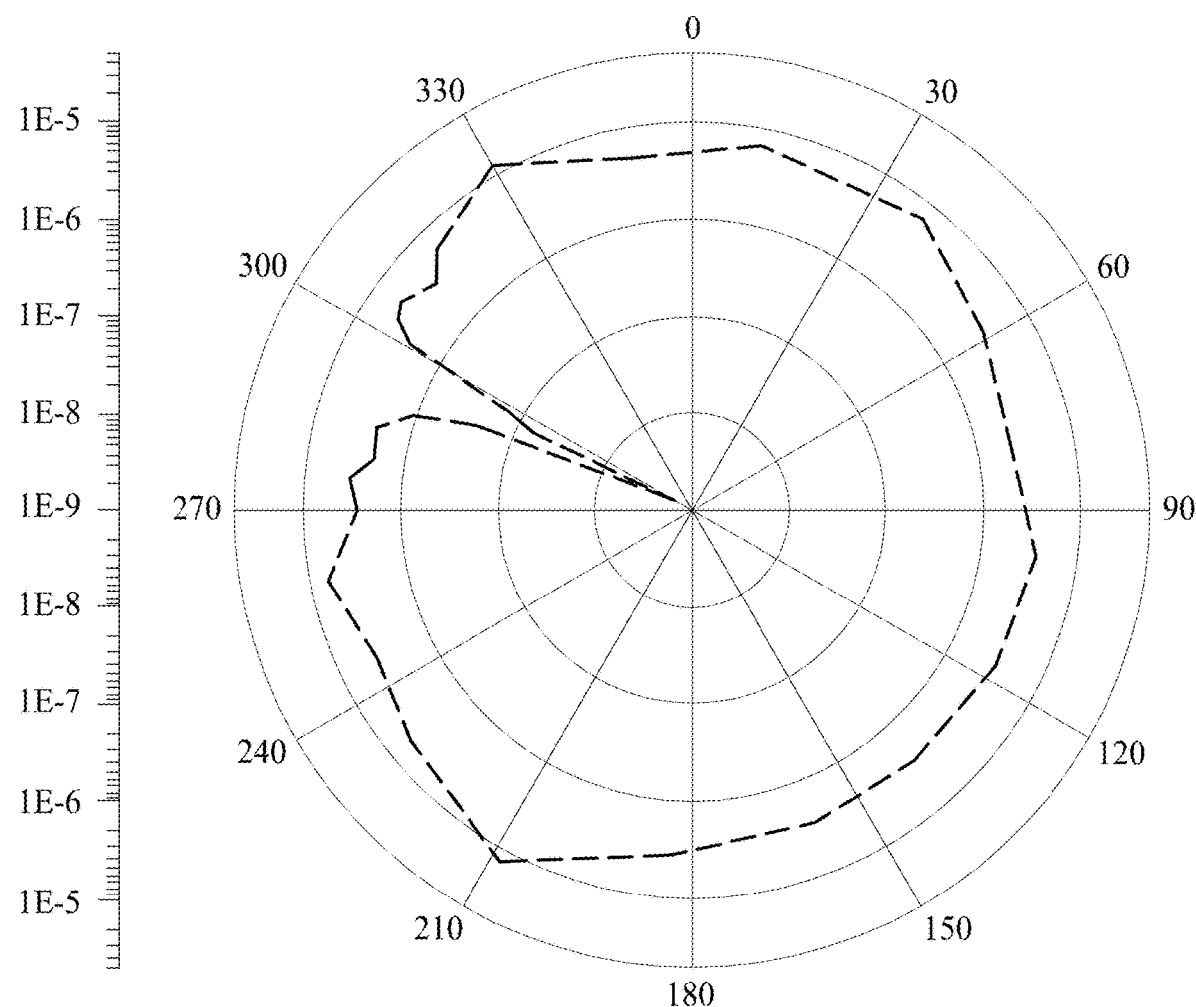
Figure 11E:
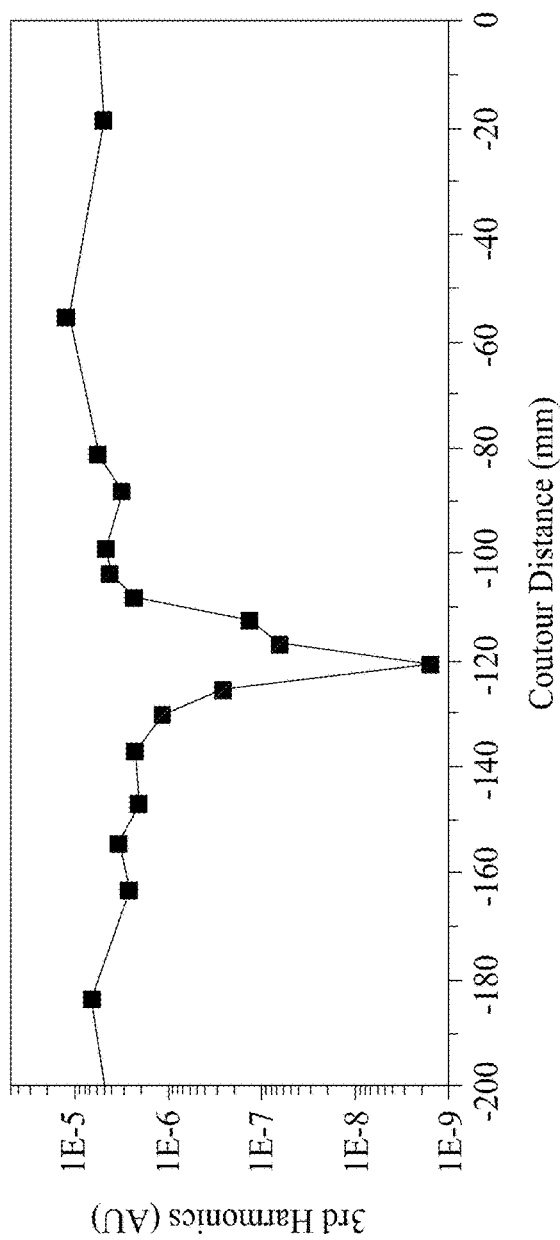
Figure 11F:
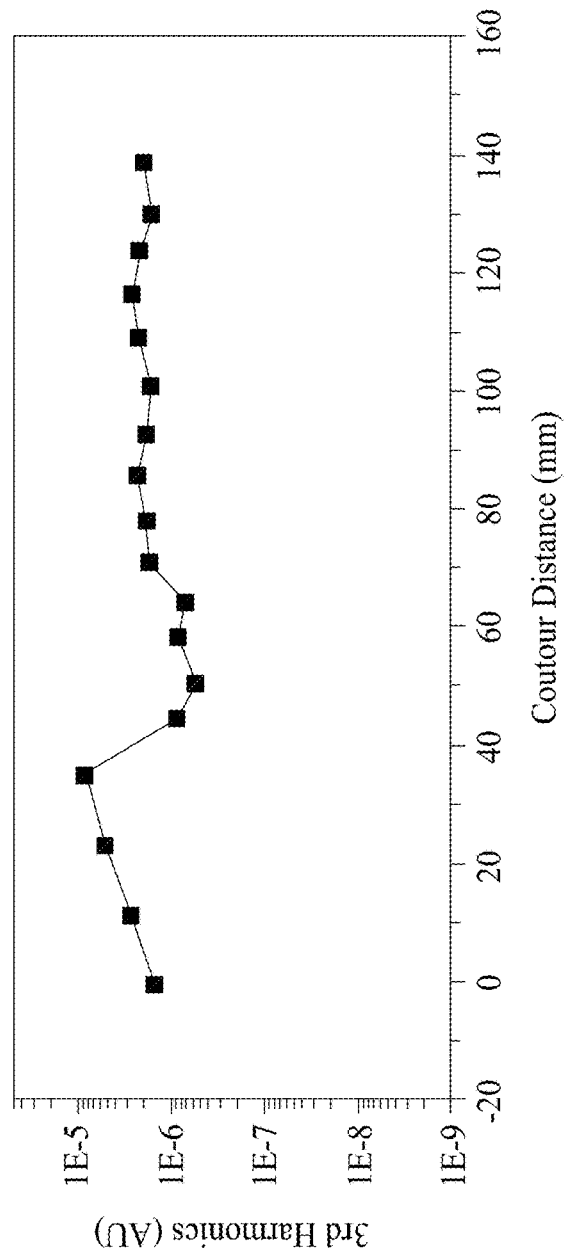

These same pipe sections are also tested with 100 kHz AC magnetic modulation, and the data are shown in FIGS. 11D-E for the cylindrical pipe section, and in FIG. 11F for the arc-shaped pipe section. FIGS. 11D-11F shows similar measurements as in FIGS. 11A-11C, but with 100 kHz magnetic modulation and measured only from outside of the pipe materials. For the cylindrical pipe section, the measurements from outside of the weld show a distinguishing feature around the weld that contains hard phase such as martensite or bainite phase (FIGS. 11D and 11E). In comparison, for the arc-shaped pipe section, the measured curve of nonlinear magnetic response is rather flat as the weld contains only ferrite or ferrite-pearlite phase with a small crack.

Figure 12A:
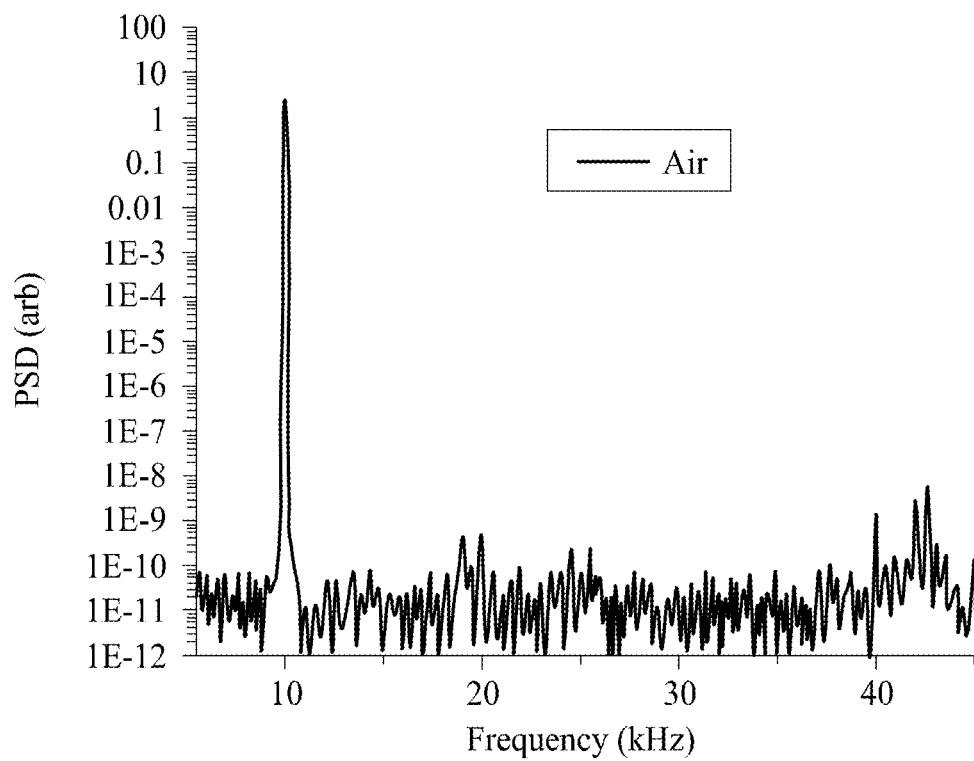
FIGS. 12A-12C show embodiments of the detection and differentiation between nonhysteretic material and nonhysteretic material with inhomogeneities of hysteretic ferromagnetic materials.
Figure 12B:
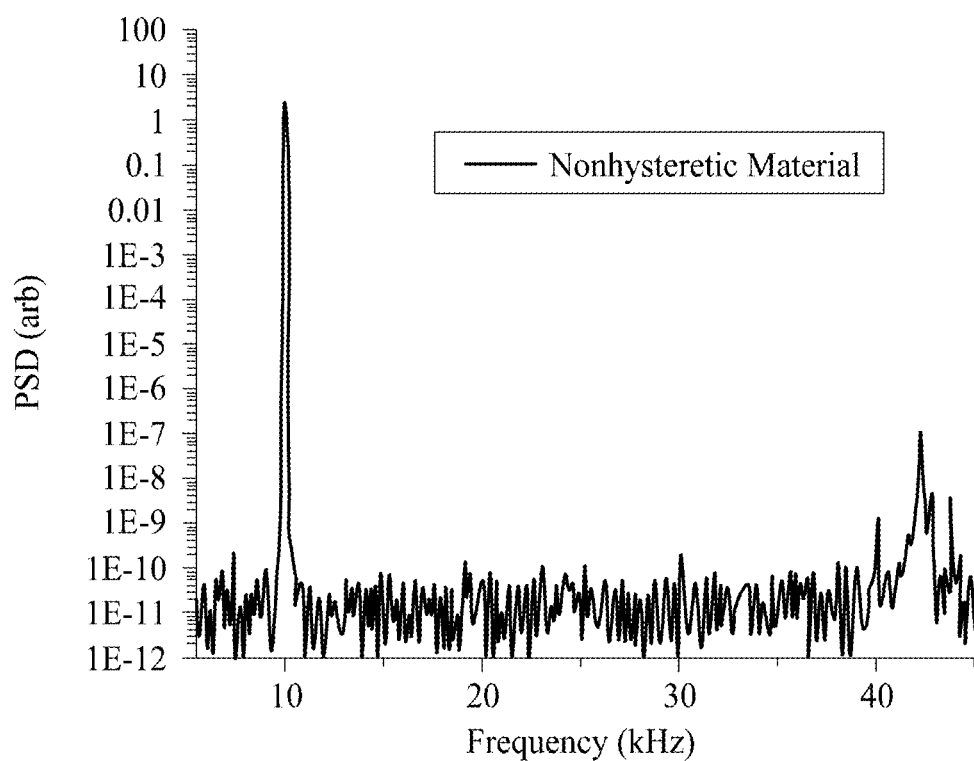
Figure 12C:
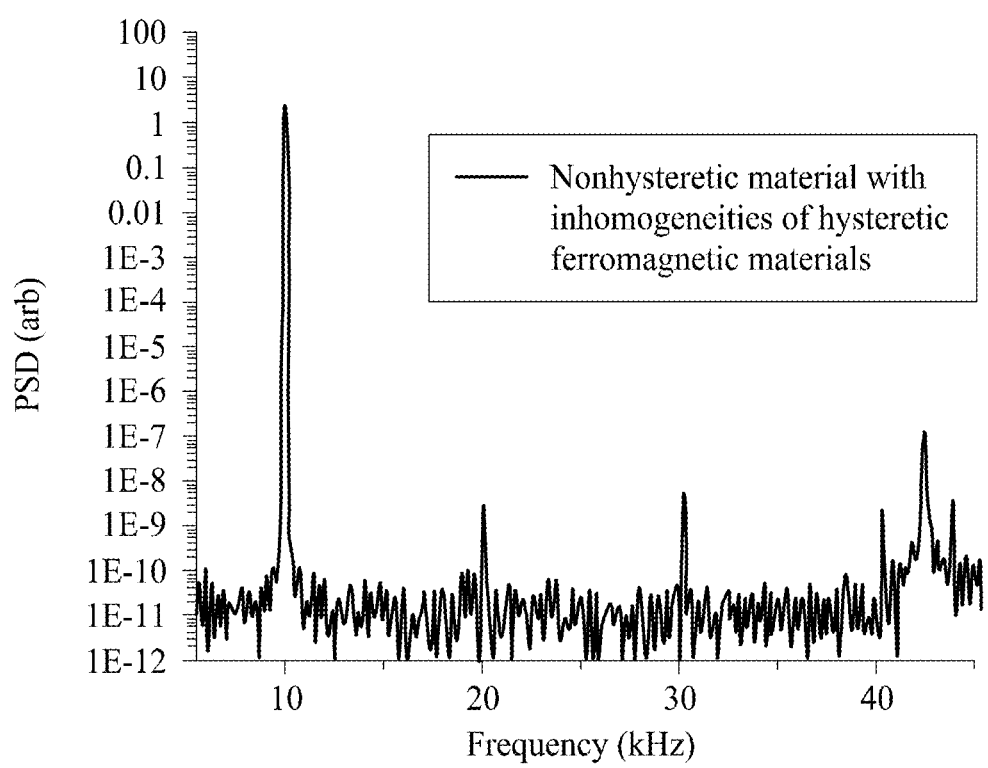

FIGS. 12A-12C show embodiments of the detection and differentiation between nonhysteretic material and nonhysteretic material with inhomogeneities of hysteretic ferromagnetic materials. In the tests of FIGS. 12A-12C, the system 200 can be configured for use on a single side of the interrogated material shown in FIG. 12B. As presented above, in certain embodiments, the one or more conditions of the material to be determined can include one or more specific material phases, for example. Example results for determining material phases between a nonhysteretic material and a nonhysteretic material with inhomogeneities of hysteretic ferromagnetic materials are shown in FIGS. 12A-12C.

As a control experiment in FIG. 12A, the device 200 was tested at 10 kHz frequency in air without any conducting/magnetic materials within half a meter. The electrical current used here is lower than what is used in FIGS. 2B-D and FIGS. 3B-D to reduce electronic noise floor. The power spectral densities (PSDs) of pickup voltages are shown. The peaks of higher order harmonics (2nd, 3rd, and 4th, etc.) are at least 9 orders of magnitude lower than the primary frequency of 10 kHz. These small values of harmonics are due to electronic processing and system noise, and should be calibrated as a baseline for specific material testing.

As can be seen in these examples from FIGS. 12A-12C, both even and odd harmonics show orders of magnitude differences between the nonhysteretic material (FIG. 12B) and the nonhysteretic material with inhomogeneities of hysteretic ferromagnetic materials (FIG. 12C), allowing for identification of different materials, for example. Nonlimiting examples of nonhysterestic materials include austenitic stainless steel, duplex stainless steel, and high manganese steel. Nonlimiting examples of nonhysteretic material with inhomogeneities of hysteretic ferromagnetic materials include high manganese steel with epsilon martensite inclusions. FIGS. 12A-12B show that the nonlinear magnetic response does not change dramatically when the end of coils are placed on a plate of nonhysteretic material (e.g., 200 mm (L)×200 mm (W)×20 mm (H)). This is consistent with the fact that a nonhysteretic material is a linear magnetic material with constant magnetic permeability, and as a result it does not generate any nonlinear magnetic response. FIGS. 12A and 12C show that the nonlinear response changes dramatically when the end of coils are placed on a plate of nonhysteretic material with inhomogeneities of hysteretic ferromagnetic materials (e.g., 200 mm (L)×200 mm (W)×20 mm (H) with over 5% inhomogeneities by weight in material weight fraction). The peaks for both odd and even numbers of harmonics increase dramatically. In particular, compared to nonhysteretic material in FIG. 12B, the peak of 3rd harmonics in FIG. 12C increases by two orders of magnitude with the nonhysteretic material with inhomogeneities of hysteretic ferromagnetic materials, providing unique nonlinear magnetic signatures that can be directly utilized to detect nonhysteretic material with inhomogeneities of hysteretic ferromagnetic materials.

Similar to the common practice in other non-destructive inspection tool, one familiar with the technique can calibrate the nonlinear magnetic response and/or the peak value of $3^{rd}$ harmonics with respect to different fractions of inhomogeneities of hysteretic ferromagnetic materials in a nonhysteretic material. As such, with proper calibrations, the methods and systems of the present disclosure can be used to measure the material phase fractions of a sample with two or more material phases, such as a nonhysteretic material with inhomogeneities of hysteretic ferromagnetic materials.

In accordance with at least one aspect of this disclosure, embodiments can be used without limitation for detection of undesirable phases on the surface and/or in the bulk of real TMCP steel plate and/or pipe. Referring to FIGS. 13A-13E, embodiments can be applied to detect anomalies in real pipeline steel, for example. A curved pipe section was cut from a TMCP pipe (28" inner-diameter (ID) and about ¾ inch thick), and about 4" by 4" area of the pipe section was tested. The majority of the pipe has ferrite/pearlite and/or softer granular bainite phase, while part of the ID surface contains lath bainite or martensite hard steel phase that naturally formed during the TMCP manufacturing process at the steel mill.

Figure 13B:
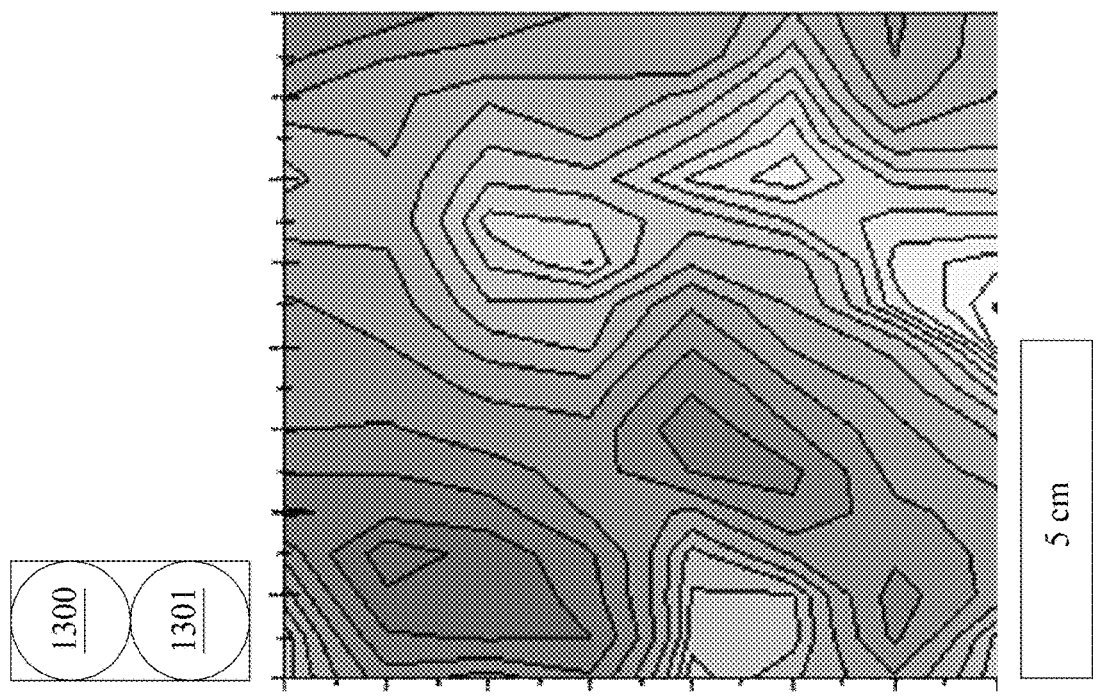
FIGS. 13A-13E show an application of a device of the present disclosure to detect anomalies in real pipeline steel.
Figure 13A:
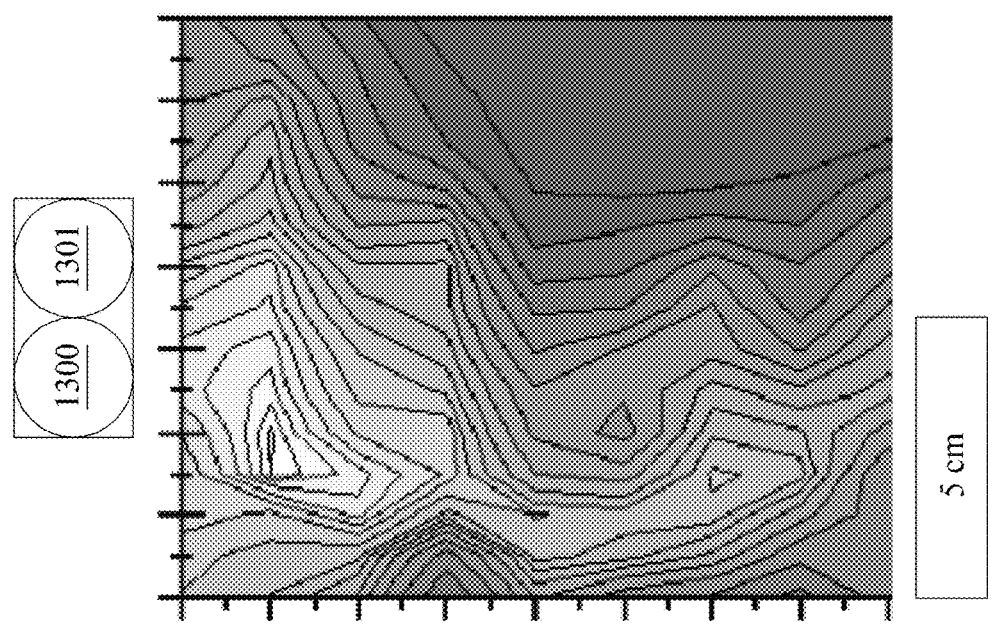
Figure 13C:
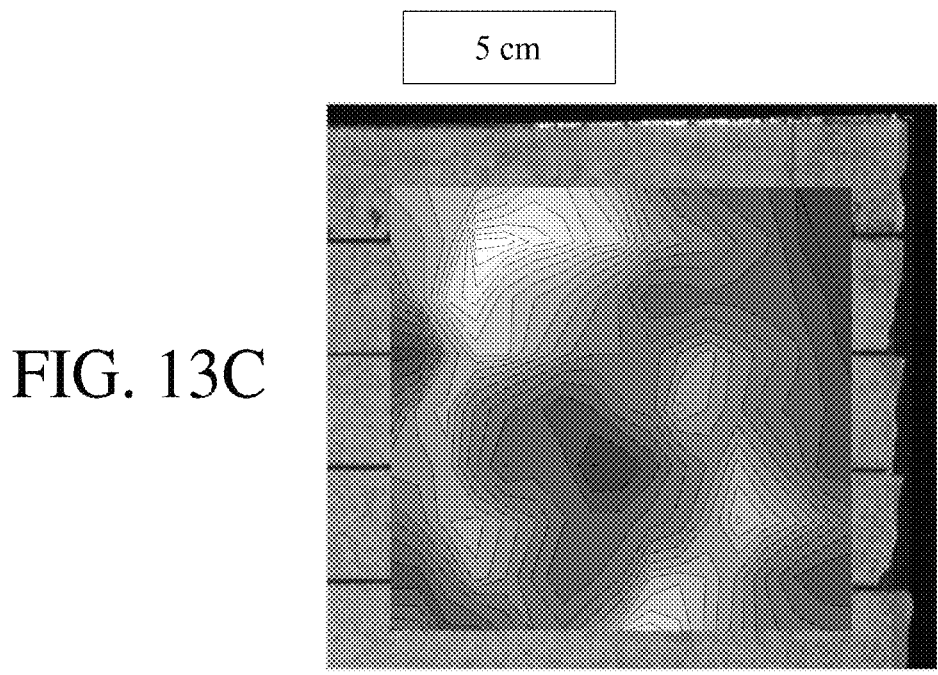

When the longer side of the coil-bundle comprising a magnetic sensor/acoustic sensor 1300 and a magnetic transmitter 1301 is aligned with the horizontal direction as shown in FIG. 13A (also the circumferential direction of the pipe), a data map of the normalized $3^{rd}$ harmonics is shown in FIG. 13A. When the longer side of the same coil-bundle is aligned with the vertical direction as shown in FIG. 13B (also the longitudinal direction of the pipe), a data map of the normalized $3^{rd}$ harmonics is shown in FIG. 13B. FIG. 13C is a data map with combined data sets from both FIGS. 13A and 13B and at any specific location FIG. 13C only uses the lower value of the normalized $3^{rd}$ harmonics between FIGS. 13A and 13B.

Figure 13D:
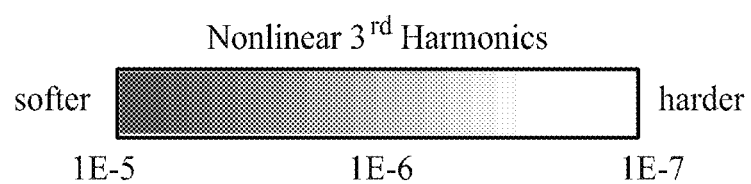
Figure 13D:
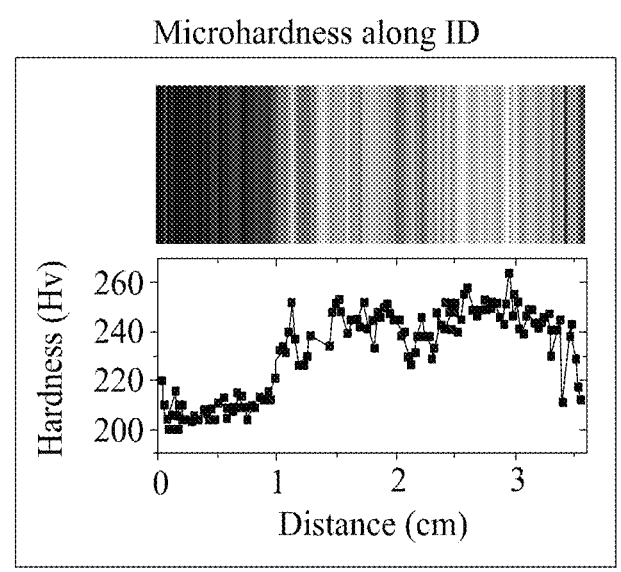
Figure 13E:
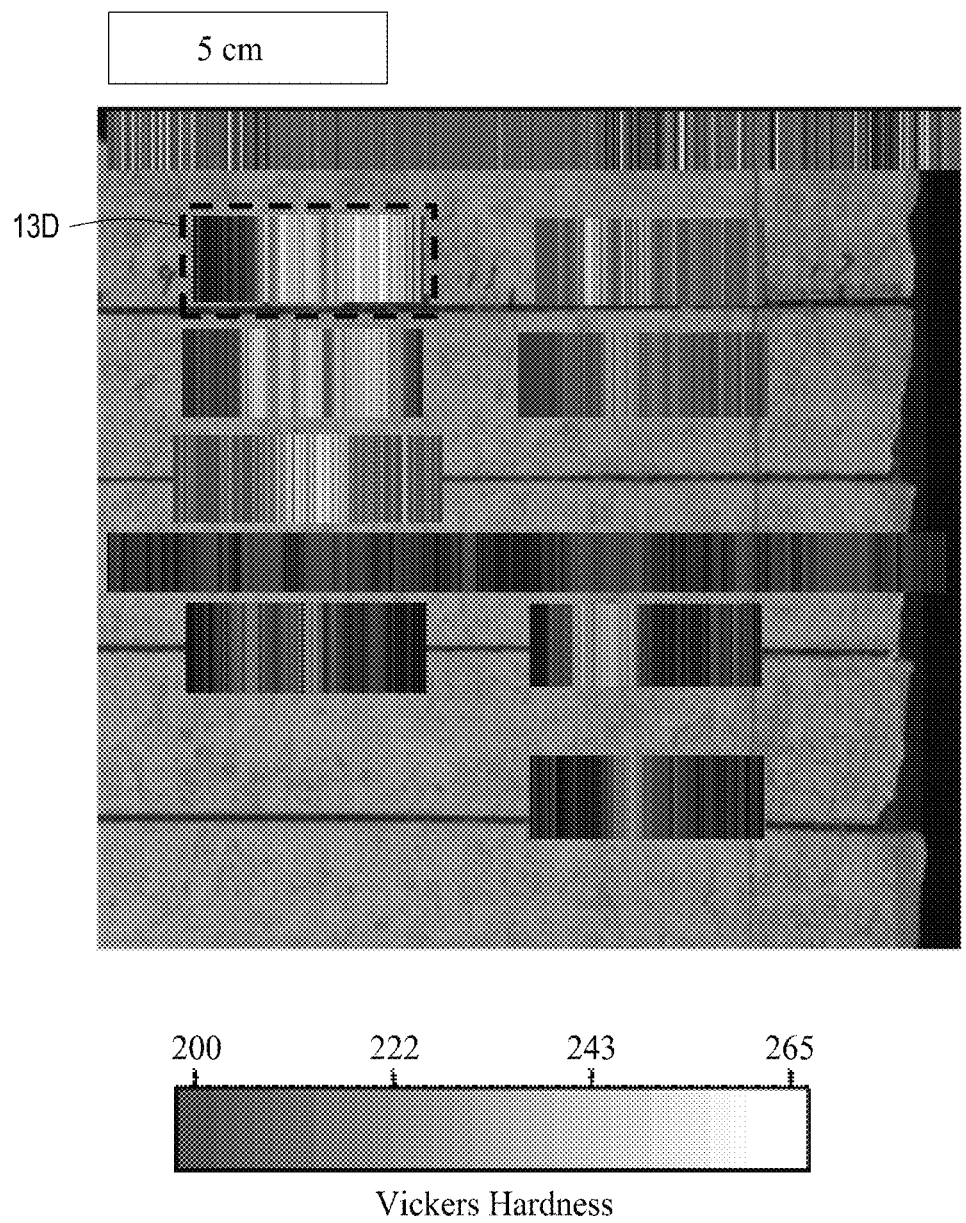

On the same pipe section, two different anomaly-zones show up with two different transmitter-sensor orientations, a white to light grey zone around the top-left of FIG. 13A and a white to light grey zone around bottom-right of FIG. 13B. To validate that both zones from different transmitter-sensor orientations are consistent with actual material hardness properties, the TMCP pipe section was cut and ten cross sectioned material samples were made from different parts of the pipe section. Those samples are then metallographically polished and Vickers Hardness (VHN) measurements are performed in the cross-section with 100-gram load at 100 μm below the surface by indentation. For example, one of the cross-sectioned samples is cut from location of the box 13D in FIG. 13E, and the corresponding Vickers Hardness (VHN) measurements for the specific sample are shown in FIG. 13D in a one-dimension measurement bar as well as a simple data plot. FIG. 13E demonstrates the ensemble of ten VHN results. The hardness measurement bars are placed at the locations where cross sectioned samples were cut from.

Consistent with the Vickers Hardness measurements, the nonlinear magnetic response in particular normalized $3^{rd}$ harmonics data maps (FIGS. 13A-13C) are able to capture both the top-left and bottom-right hard zones as validated in FIG. 13E. Specifically the data with the transmitter-sensor orientations in FIG. 13A and FIG. 13B are able to capture respectively the top-left and bottom-right hard zones in FIG. 13E. The data anisotropy comes from the intrinsic texture anisotropy in carbon steel generated from the manufacturing process such as hot rolling process, and in order to achieve better and more complete inspection results, a preferred transmitter-sensor arrangement may include many copies of sensors at different locations around and/or paired with each magnetic transmitter.

In the embodiment shown, the transmitting coil 201 and pickup coil 203 used to produce the data below include coils with a maximum outer diameter of about ¾ inch and an inductance of L~7 mH. For the data shown from FIGS. 14A-14C, the transmitting coil 201 and pickup coil 203 are placed to the same side of the interrogated material (e.g., ferromagnetic plate).

Figure 14A:
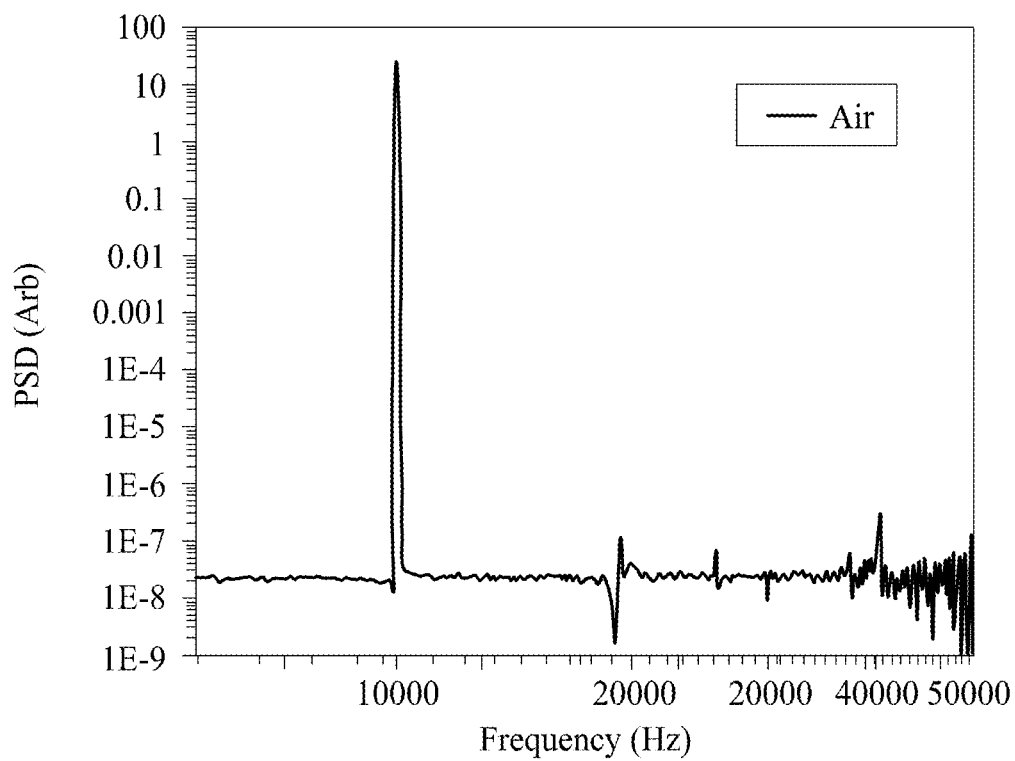
FIGS. 14A-14C are power spectral density charts in use on Air, Martensite, and Ferrite, respectively.
Figure 14B:
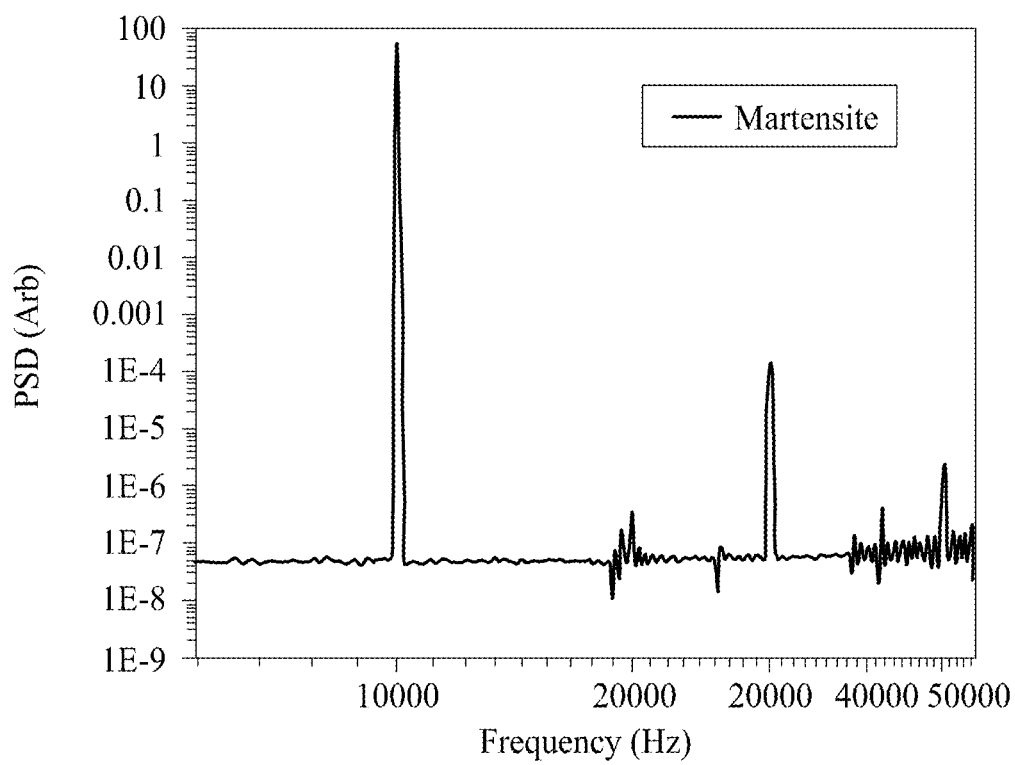
Figure 14C:
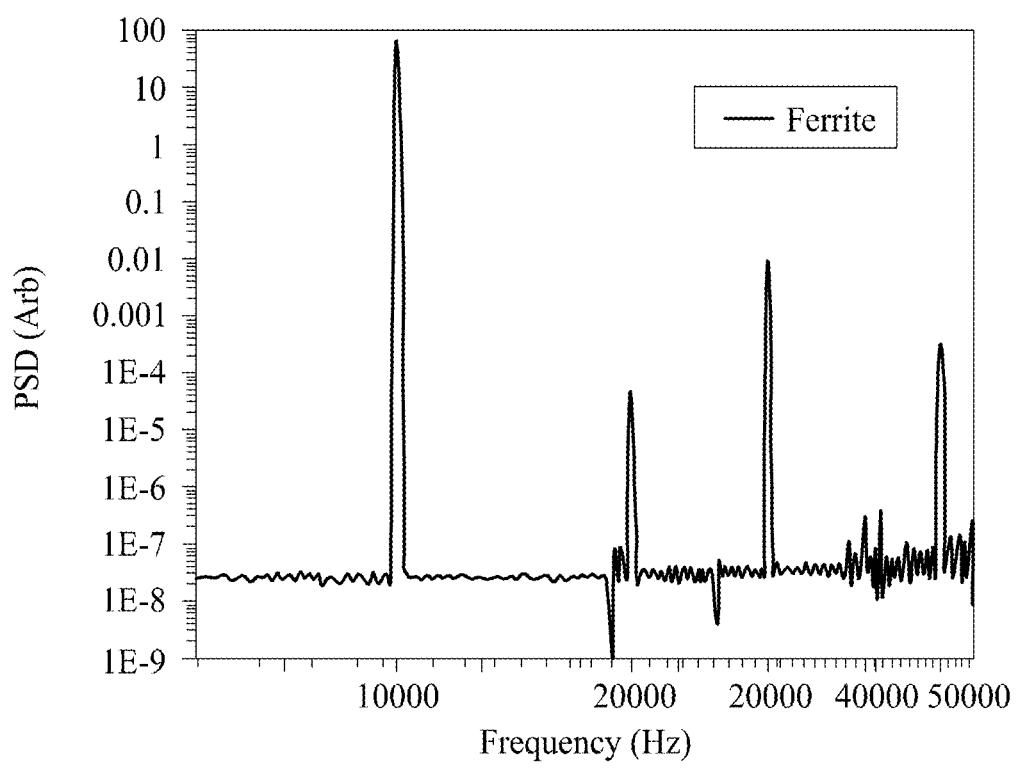

The coils with smaller diameter work in a similar fashion as previously disclosed 1-inch coils as shown in FIGS. 2B-D and FIGS. 3B-D. As a control experiment, the device 200 was tested at 10 kHz frequency in air without any conducting/magnetic materials within half a meter. The power spectral densities (PSDs) of the pick up voltages are shown in FIGS. 14A-14C. The peaks of higher order harmonics (2nd, 3rd, 4th, and 5th, etc.) are at least 8 orders of magnitude lower than the primary frequency of 10 kHz in the air case (FIG. 14A). These small values of harmonics are due to electronic processing and system noise, and should be calibrated as a baseline for material testing.

Similar to the disclosure from FIGS. 2B-D to FIGS. 3B-D, odd harmonics show orders of magnitude differences between the different material types, allowing for identification of different materials, for example. The nonlinear response changes dramatically once a coupon of martensite or ferrite (e.g., 38.1 mm (L)×25.4 mm(W)×4.7 mm (H)) is placed at the end of smaller coils. The even numbers of harmonics do not experience significant changes, while the peaks for odd number of harmonics increase dramatically, with the most significant increases coming from 3rd and 5th harmonics at 30 kHz and 50 kHz (e.g., in FIGS. 14B and 14C). In particular, the peak of 3rd harmonics increases by over three orders of magnitude with a martensite coupon (FIG. 14B) and over five orders of magnitude with ferrite coupon (FIG. 14C), providing unique nonlinear magnetic signatures that can be directly utilized to detect the hard phases such as martensite phase that make up the hard spots in pipeline steel, for example.

In accordance with at least one aspect of this disclosure, the smaller-diameter magnetic transmitters and sensors can be used to generate inspection results with higher lateral spatial resolution. In the embodiment shown, the transmitting coil 201 and pickup coil 203 used to produce the data below include coils of ¾ inch diameters as used in FIGS. 15A-15B. Both the transmitting coil and the pickup coil are mounted onto a carriage of a two-dimensional automated scanner. The two-dimensional automatic scanner is capable of moving a carriage in a flat horizontal plane with a minimal step-size smaller than 0.1 mm in either dimension, and the two-dimensional spatial motions and locations of the carriage and/or the coils can be controlled and monitored through computer program codes.

Figure 15A:
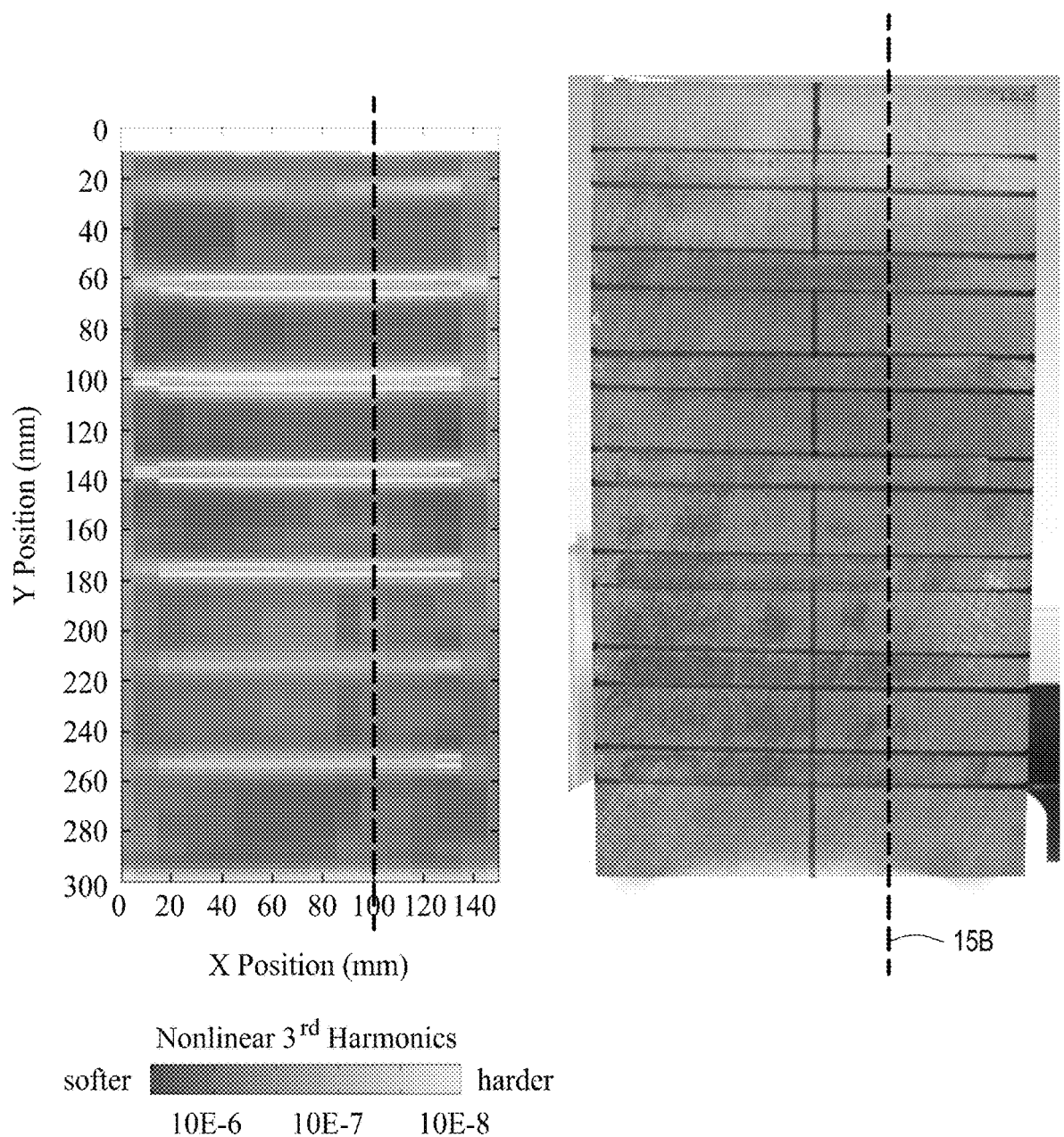
FIGS. 15A-15B show an application of a device of the present disclosure to detect anomalies in carbon steel plate.
Figure 15B:
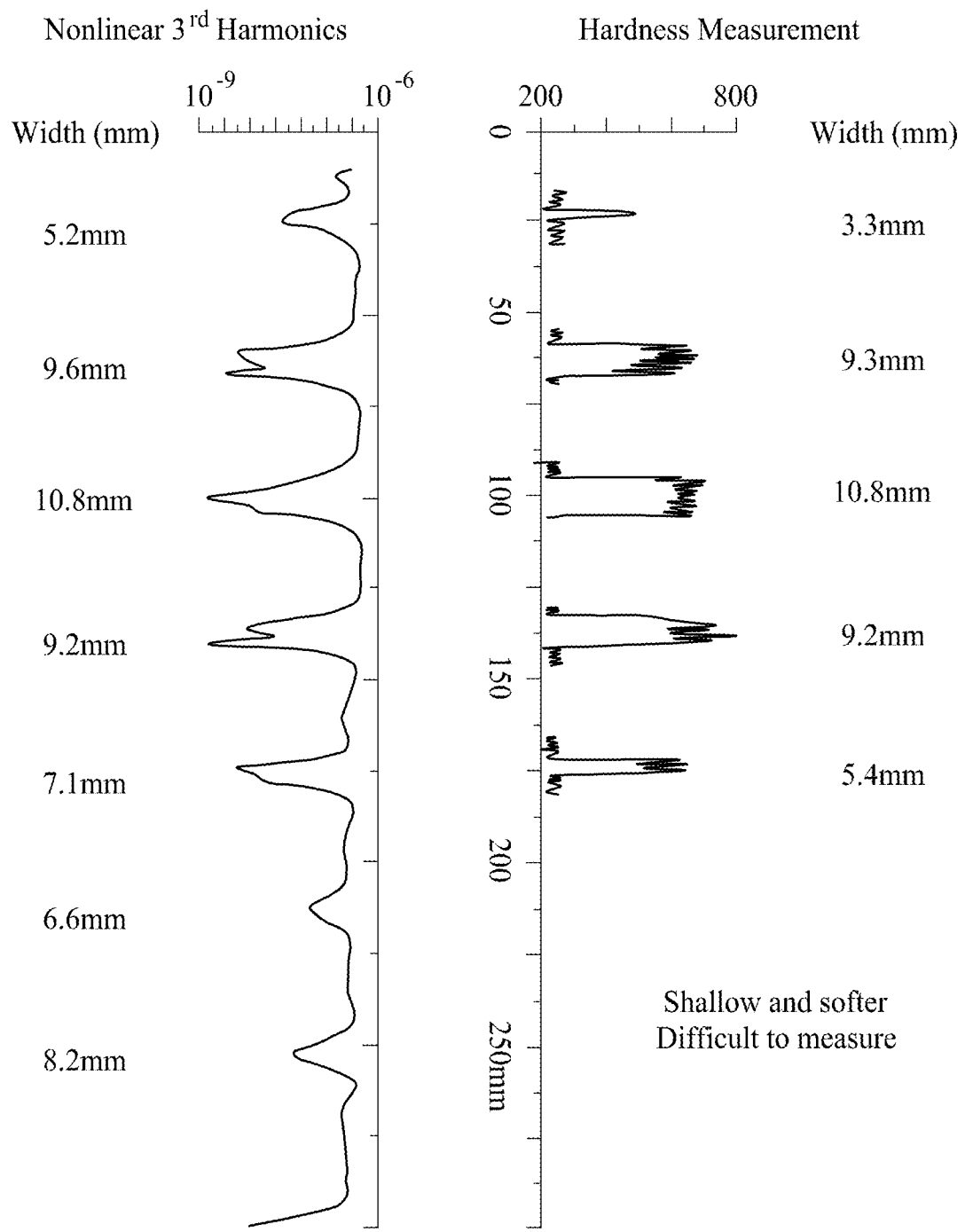

In accordance with at least one aspect of this disclosure, embodiments can be used without limitation for detection on real pipes and plates with spatially varying hard phase on the surface and/or in the bulk. Referring to FIGS. 15A-15B, embodiments can be applied to detect anomalies in carbon steel plate, for example. A flat 4140 carbon steel plate (e.g., 12" (L)×6" (W)×1¼ (H)) was tested as shown in FIG. 15A right panel. The majority of the plate has ferrite/pearlite phase, while there are seven horizontal streaks of hard phase regions or hard zones. These simulated hard zones are made with local surface heating using electron beam in vacuum environment followed by fast self-temperature-quenching with the steel body as a heat sink. The heating parameters used in HZ1 to HZ7 are different, thus these seven hard zones have different local hardness and widths, and they contain different volume fractions of lath bainite or martensite hard steel phase.

During measurements with the two-dimensional automated scanner, the transmitting and pickup coils are placed within 0.1 cm to the surface of the interrogated sample, and the longer side of the coil-bundle is aligned with the longer direction (12") of the plate direction. The nonlinear magnetic responses at different two-dimensional positions across the whole steel plate were measured at 10 kHz magnetic modulation, and from the measurements a data map of the normalized 3rd harmonics coefficients is shown in FIG. 15A left panel. As detailed in FIG. 15A left panel, darker grey indicates higher value of normalized $3^{rd}$ harmonics (softer in material properties) and white indicates lower value of normalized $3^{rd}$ harmonics (harder in material properties). All seven hard phase regions (HZ1 to HZ7) are detected by the nonlinear magnetic response measurements with different levels of $3^{rd}$ harmonics among them.

To validate the nonlinear magnetic response measurements and the resulting data map are consistent with material hardness properties, the 4140 carbon steel plate was cut along the dash line 15B as in FIG. 15A right panel. Along the dash line, 15B seven cross sectioned material samples were made and metallographically polished and Vickers Hardness (VHN) measurements are performed in the cross-section with 100-gram load at 100 µm below the surface by indentation. The hardness measurements across HZ1 to HZ5 along the dash line 15B are shown in FIG. 15B right panel. For HZ6 and HZ7, the hardness measurements do not capture any elevated hardness when measured at 100 µm below the surface, demonstrating that both HZ6 and HZ7 do not have elevated hard zones at 100 µm or deeper. In accord with the Vickers hardness measurements, the nonlinear magnetic response in particular normalized $3^{rd}$ harmonics are plotted along the same dash line 15B and the results are shown in FIG. 15B left panel, the data of normalized $3^{rd}$ harmonics are able to capture all HZ1 to HZ7 with consistent correlations of height and width of results. Specifically, the FWHM (Full width at half maximum) widths are labeled for all the measured hard zones for both the $3^{rd}$ harmonics responses and the hardness measurements. The widths measured from $3^{rd}$ harmonics responses are within 1 mm to 2 mm variations from widths measured from the hardness measurements which are generally considered as ground truth. In the embodiment shown, the nonlinear magnetic response is capable of detecting surface hard zone with a lateral spatial resolution of 2 mm or greater.

Figure 16A:
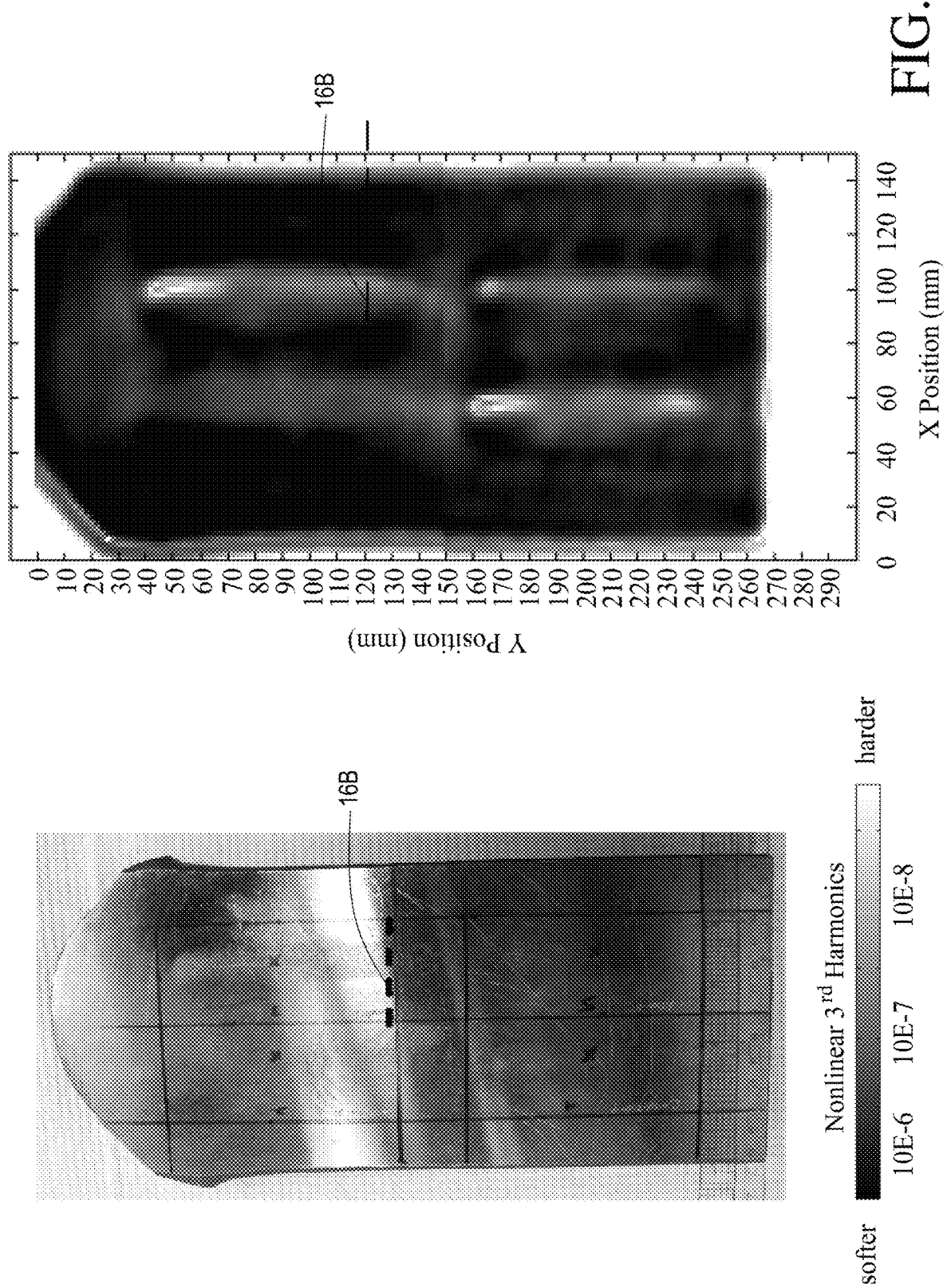
FIGS. 16A-16B show an application of a device of the present disclosure to detect anomalies in carbon steel plate.
Figure 16B:
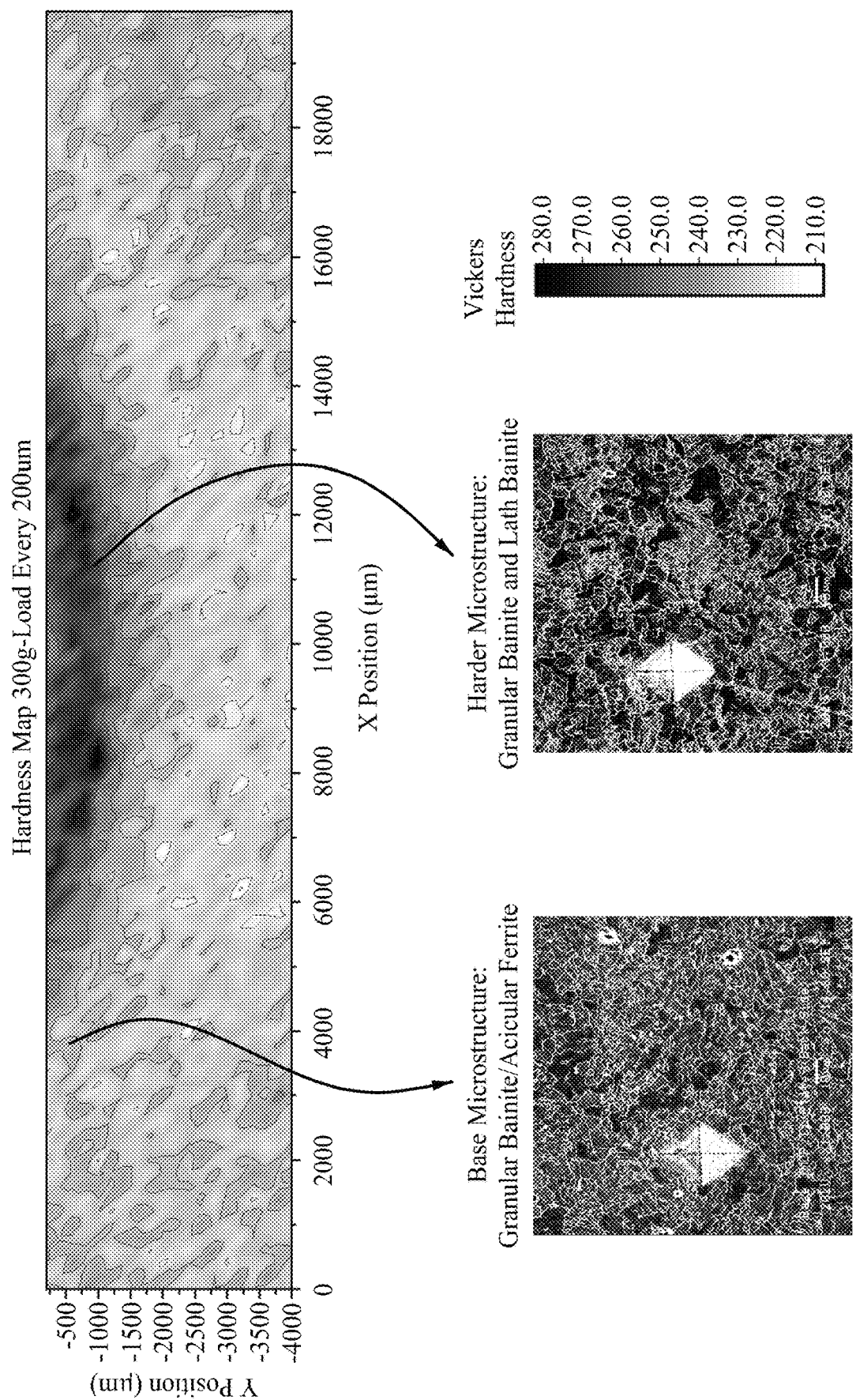

Referring to FIGS. 16A-16B, embodiments can be applied to detect anomalies in carbon steel plate, for example. Referring to FIG. 16A left panel, a flat TMCP carbon steel plate (e.g., 9" (L)×5" (W)×1" (H)) was tested. The majority of this plate has ferrite/pearlite and/or soft granular bainite phase, while there are four vertical streaks of hard phase regions or hard zones, the centers of which are labeled with cross marker signs on the plate. These simulated hard zones are made with local surface heating using electron beam in vacuum environment followed by fast self-temperature-quenching with the steel body as a heat sink. The heating parameters used here are the same parameters used for HZ2 to HZ5 in previous plate (FIG. A14), thus these four hard zones have different local hardness and widths, and they contain different volume fractions of lath bainite or martensite hard steel phase. With the same heating parameters, the hardness in HZ2 to HZ5 between 4140 carbon steel and TMCP carbon steel are also different as the chemistry of base steel plates are different.

With the same two-dimensional automated scanner, from the nonlinear magnetic response measurements a data map of the normalized 3rd harmonics coefficients is shown in FIG. 16A right panel. As detailed in FIG. 16A right panel, black to dark grey indicates higher value of normalized $3^{rd}$ harmonics (softer in material properties) and white to light grey indicates lower value of normalized $3^{rd}$ harmonics (harder in material properties). All four hard phase regions (HZ2 to HZ5) are detected by the nonlinear magnetic response measurements with different levels of $3^{rd}$ harmonics among them.

To validate and test the sensitivity of the nonlinear magnetic response measurements are consistent with material hardness properties, the TMCP carbon steel plate was cut along the dash line 16B as in FIG. 16A left panel. Along the dash line 16B, one cross sectioned material sample was made and metallographically polished and Vickers Hardness measurements are performed in the cross-section with 100-gram load at 100 µm below the surface by indentation. As an example, a cross-section hardness map across HZ3 is shown in FIG. 16B top panel. In the cross-section, the elevated hard zone has a semi-elliptical shape with a width of about 8.0 mm and depth of 1.1 mm with an average increment of 40 in Vickers Hardness within the hard zone (VHN larger than 250). The material microstructure in bulk region (VHN smaller than 250) is a mixture of granular bainite and acicular ferrite as shown in the scanning electron microscope image (FIG. 16B bottom left), and the material microstructure in the elevated hard zone (VHN larger than 250) is a mixture of granular bainite and lath bainite as shown in FIG. 16B bottom right. In accord with the Vickers Hardness measurements, the FWHM width for HZ3 from the $3^{rd}$ harmonics responses are determined to be about 10.0 mm across the same dash line 16B, consistent with the hardness measurements with 2 mm spatial resolution.

Similar to the common practice in other non-destructive inspection tool, one familiar with the technique can calibrate the nonlinear magnetic response and/or the peak value of $3^{rd}$ harmonics with respect to different levels of Vickers Hardness (VHN), surface area sizes and the depth of hard metallurgical phase in a sample. As such, with proper calibrations, the methods and systems of the present disclosure can be used to measure the Vickers Hardness as well as the material phase fractions of a sample with two or more material phases, such as a hysteretic material with inhomogeneities of hard metallurgical phase.

The foregoing methods can be extended to the inspection of other steel components including, but not limited to, bolts, forgings, castings, and the like.

In accordance with at least one aspect of this disclosure, embodiments can be used without limitation for detection of hysteretic magnetic material phases in nonhysteretic materials. Nonhysteretic materials can include, but is not limited to, aluminum, austenitic stainless steel, duplex stainless steel, and high manganese steel. Example of hysteretic magnetic material phases include, but are not limited to, at least one of martensite, epsilon martensite, ferrite, pearlite, bainite, lath bainite, acicular ferrite, and quasi-polygonal ferrite. A first example application of the detection of hysteretic magnetic material phases in nonhysteretic materials includes determining an amount of magnetic ferrite content in duplex stainless steels (DSS), which can be used for grading the DSS or as a quality control measure. More specifically, the amount of delta ferrite in a ferrite-austenite DSS can be ascertained and used to grade the ferrite-austenite DSS or as quality control to determine if the amount of delta ferrite fall within a desired range.

In yet another example, the detection of hysteretic magnetic material phases in nonhysteretic materials can be used for quality control when austenitic stainless steel (e.g., grades 304, 308, 316, and the like) weldments and austenitic stainless steel welds are exposed to high temperatures, for example, when refinery operating equipment such as piping, vessels, reactors, and weld overlays is exposed to hydrotreating conditions or hydroprocessing conditions. Under such conditions, the sigma phase (e.g., of ferrite) (a hysteretic magnetic material phase) can form, which causes the material to become brittle. The methods and devices described herein can be used to measure the amount of or detect the presence or absence of the embrittling sigma phase in all or portions of the refinery operating equipment. In hydrotreating, typically, the refinery operating equipment and welds thereof contain austenitic stainless steels. In hydroprocessing, typically, the refinery operating equipment downstream of the reactor contains austenitic stainless steels, and the welds in refinery operating equipment upstream, in, and downstream of the reactor are contain austenitic stainless steels. The reactor in hydroprocessing is typically composed of Cr—Mo materials with austenic steel weld overlays. In some embodiments, the methods and devices described herein can also be used to measure the amount of or detect the presence or absence of ferrite content in girth and seam welds that are used for fabrication of austenic stainless steel piping, vessels and weld overlay of heavy wall Cr—Mo reactors in hydroprocessing reactors in D/S. The amount of ferrite content needs to meet a desired amount for preventing weld solification cracking in stainless steel weldments.

In each of the foregoing examples of detecting hysteretic magnetic material phases in nonhysteretic materials, calibration samples can be prepared with different amounts of hysteretic magnetic material phases in nonhysteretic materials to correlate the nonlinear magnetic response signal to the amount or content of the hysteretic magnetic material phases.

In accordance with at least one aspect of this disclosure, embodiments can be used without limitation for characterizing the hardness of welds. Similar to the disclosure regarding FIGS. 13A-E, the VHN or Brinell Hardness number (BHN) of different weld materials can be correlated to the nonlinear magnetic response signal described herein. In a first example of applying the characterization the hardness of welds, a handheld device can be used to measure the nonlinear magnetic response signal to welds (new, old, or repaired) or portions thereof, which can then be correlated to a VHN and/or a BHN.

Another example of applying the characterization the hardness of welds is to identify the type of electric resistance weld (ERW) (e.g., low-frequency heat-treated ERW, low-frequency non-heat-treated ERW, high-frequency heat-treated ERW, and high-frequency non-heat-treated ERW). In this example, the nonlinear magnetic response signal base pipe as compared to the nonlinear magnetic response signal of the ERW can correlate to the type of ERW. Such correlation can be determined via standard calibration measurements. Implementation of such methods can be with in-line pipeline inspection gauges, automatic or manually pulled pipeline inspection tools, steel mill inspection tools, in-the-ditch inspection tools, handheld inspection devices, and the like. In yet another example of applying the characterization the hardness of welds is to identify the hardness of base pipe and the pipe grade using in-the-ditch inspection. In this example, the nonlinear magnetic response signal can be calibrated and correlated to hardness, tensile and/or yield strength of the materials of base pipe. Such correlation can be used to determine the pipe grade using in-the-ditch inspection.

In yet another example of applying the characterization the hardness of welds, the hardness of welds (e.g., seam welds and/or girth welds) after repair. In one example, the repaired welds may be associated with pressure vessels (e.g., composed of Cr—Mo ½ Cr steels) used in hydrotreating and hydroprocessing reactors. The repair process can include removing the weld and a portions metal around the weld and replacing/patching the area. The newly formed welds can optionally be heat treated. The inspection process can include determining if the welds after repair (with or without post-weld heat treatment) meet industry standards and/or company specifications for the hardness of the weld and/or identify hard spots in the weld.

Another similar example includes measuring the hardness of welds associated with 21/4 Cr—V steel vessels. The inspection process can include determining if fabrication welds and/or welds after a repair (with or without post-weld heat treatment) meet industry standards and/or company specifications for the hardness of the weld and/or identify hard spots in the weld.

Yet another similar example includes management of weld hardness over time. That is, the vessels, pipes, and the like can be inspected over time monitoring the hardness and/or location and size of hard spots. Inspection can be carried out with any suitable device include handheld devices and automated crawlers. The inspection process can be performed on fabrication welds and/or repaired welds (with or without post-weld heat treatment).

In another embodiment of using the nonlinear magnetic response signal correlated to weld hardness and/or hard spots in a weld, weld roots and/or weld caps specifically can be inspected and analyzed. In a preferred instance, this application can be applied to in-field welds of risers and sour service pipelines. Optionally, the inspection of root welds by the nonlinear magnetic response signal methods/devices described herein can be conducted in combination with laser root profiling. Increased hardness in a root weld (e.g., a girth weld root) can originate from high cooling rates in an improper weld procedures (e.g., using Cu cooled shoes to close to the weld root) and/or dissolved Cu contamination in the weld metal from equipment such as Cu cooled shoes).

In yet another example of using the nonlinear magnetic response signal correlated to weld hardness and/or hard spots in a weld, the quality of back welds can be assessed. Back welds are internal repairs to girth welds that are made manually. Determining the hardness and/or location and size of hard spots in a back welds can verify if the back weld meets the industry standards and/or company specifications for the hardness or determine if further repair is needed. Implementation of such methods can be with in-line pipeline inspection gauges, automatic or manually pulled pipeline inspection tools, handheld inspection devices, and the like.

In another example of using the nonlinear magnetic response signal correlated to weld hardness and/or hard spots in a weld, methods and devices described herein can be used in conjunction with welding bugs used to produce girth welds and/or ultrasonic testing bugs used to inspect girth welds. Bugs are automated machinery that moves around the circumference of a pipe to produce girth welds and/or inspect girth welds. The devices described herein can be incorporated with bugs to measure the nonlinear magnetic response signal of the girth weld after being formed (i.e., with a welding bug) or when also measuring the ultrasonic response of the girth weld (i.e., with an ultrasonic testing bug).

In accordance with at least one aspect of this disclosure, embodiments can be used without limitation for characterizing the hardness, tensile strength, and/or yield strength of the material used to produce or in pipes or similar structures. Similar to the disclosure regarding FIGS. 13A-E, the hardness (e.g., VHN or BHN), tensile strength, and/or yield strength of different materials used to produce or in pipes or similar structures can be correlated to the nonlinear magnetic response signal described herein. Once a hardness, tensile strength, and/or yield strength is determined, the pipe grade can be derived. Implementation of such methods can be with in-line pipeline inspection gauges, automatic or manually pulled pipeline inspection tools, steel mill inspection tools, in-the-ditch inspection tools, handheld inspection devices, and the like.

In accordance with at least one aspect of this disclosure, embodiments can be used without limitation for detecting and locating hard zones (e.g., cold worked areas or dents)

that can cause stress corrosion cracking that lower the integrity of pipeline and similar structures. Stress corrosion cracking is the formation of or growth of a crack in a corrosive environment. In austenitic stainless steel and aluminum alloys, chlorides (e.g., NaCl, KCl, and $MgCl_2$) can be the source of stress corrosion cracking. Stress corrosion cracking typically start with a small flaw in the surface that propagates under conditions where fracture mechanics predicts failure should not occur. Being able to detect stress corrosion cracking and/or regions of local hard worked zones (hard zones) that can cause stress corrosion cracking with a nondestructive material inspection method or tool could mitigate the failure pipeline or other structures. Implementation of such methods can be with in-line pipeline inspection gauges, automatic or manually pulled pipeline inspection tools, handheld inspection devices, and the like.

As will be appreciated by those skilled in the art, aspects of the present disclosure may be embodied as a system, method or computer program product. Accordingly, aspects of the this disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the this disclosure may be written in any combination of one or more programming languages, including an object oriented programming language such as Java, Smalltalk, C++ or the like, conventional procedural programming languages, such as the "C" programming language or similar programming languages, and visual programming languages, such as LabView or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In certain embodiment, for example in current pipeline inspection gauge (PIG) technology, an on-board computer and processor on the PIG is sent through the pipeline, during which time the computer use pre-loaded instructions and program codes to control the onboard transmitters and sensors, perform initial analysis, and stores the measurement results. At the pipeline outlet, the users retrieve the PIG and download the stored data, which can be further analyzed and post-processed on another computer with different program codes.

Aspects of this disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Through laboratory experimentation and computer simulation, nonlinear magnetic and magnetoacoustic systems and methods for detecting and distinguishing ferromagnetic materials with different hysteresis curves, e.g., differentiating hard martensite spot from soft ferrite phase, have been disclosed. Examples of hysteretic materials include ferromagnetic materials (e.g., steel, nickel, cobalt, etc.) and some of their alloys, such as a variety of carbon steels. It has also been observed that the nonlinear magnetic responses depend on the initial/residual magnetization of the materials, and to avoid such complication, embodiments include an effective approach to regulate magnetization inside the material. An example of such an effective approach, without limitation, has been provided in the above discussions as in FIGS. 7A, 7B and 7C, in which the materials are externally magnetized in a direction that is perpendicular to the small AC magnetic modulation.

Additionally, based on the fundamental electromagnetism, a natural derivative of the nonlinear magnetic response is the nonlinear electrical Eddy current generation. Once coupled with a large permanent magnetic field, this Eddy current produces a nonlinear mechanical wave, producing a magnetoacoustic response with hysteretic materials that has been evaluated. To improve the detection of magnetic anomalies (e.g., in pipeline inspection), nonlinear magnetic embodiments can be incorporated into an MFL setup within a conventional PIG system, and nonlinear magnetoacoustic detection embodiments can be applied on existing EMAT sensors, as appreciated by those having ordinary skill in the art.

Embodiments provide unprecedented nonlinear magnetic and magnetoacoustic detection to identify flaws and hard spots/regions in a pipe, for example. Embodiments provide highly distinguishable features to differentiate various hysteretic materials (soft ferrite steel/regions and hard martensite steel/regions, for example) enabled by an in-depth understanding of the nonlinear magnetic response. In particular, both even and odd harmonic responses have been investigated and their relationship to the magnetic properties and states of materials has been discovered. In addition, embodiments are highly favorable for field applications because the method can be used across a wide frequency band (e.g., 100 Hz to 1 MHz), which can be highly favorable for high-speed inspection and depth scan, and embodiments operates at low current and low magnetic field without any metal core and are thus relatively energy efficient.

Improvement in nondestructive pipeline inspection significantly reduces risk of pipeline failures and leakage. Embodiments provide a new tool in the arsenal of methods for pipeline inspection.

The methods and systems of the present disclosure, as described above and shown in the drawings, provide for nondestructive material inspection with superior properties. In one application, the methods and systems can be used as a nondestructive evaluation tool for in-line-inspection to identify material phases and assess regions with higher hardness, or metal loss, or cracks from inside of the pipe. In another application, the methods and systems can be used as a nondestructive evaluation tool to screen metal plates by identifying material phases and assessing regions with higher hardness, or metal loss, or cracks from surfaces of plates. Yet in another application, the methods and systems can be used as a handheld device to screen metal pipes, plates, surfaces, welds and joints by identifying material phases and assessing regions with higher hardness, or metal loss, or cracks from surfaces of the metal object. Yet in another application, the methods and systems can be used as nondestructive evaluation tool to identify steel phases in pipeline welds, welding types and/or heat treatment states of pipelines with electrical resistance welding (ERW). Additionally, in another application, the methods and systems can be used as a nondestructive evaluation tool to inspect girth weld roots by identifying material phases and assessing regions with higher hardness, or metal loss, or cracks for risers, and sour service pipelines.

In the above mentioned applications, the material phases can include, but are not limited to, at least one of austenite, martensite, ferrite, pearlite, bainite, lath bainite, acicular ferrite, and quasi-polygonal ferrite. In certain embodiments, the systems can be incorporated onto nondestructive evaluation tools to interrogate the material with an input time varying magnetic field and correlating the time dependent nonlinear characteristic of the received magnetic response or acoustic response to one or more material conditions of the material. Nonlimiting examples of the nondestructive evaluation tools include in-line pipeline inspection gauges, automatic or manually pulled pipeline inspection tools, steel mill inspection tools and handheld inspection devices.

In certain embodiments, the application can include, but is not limited to, multiple copies of magnetic transmitters, magnetic sensors, acoustic sensors and horseshoe magnets located at positions placed at a preferred nearby location of the interrogated material. In certain embodiments, the application includes, but is not limited to, one or more copies of magnetic sensors and/or acoustic sensors paired with one magnetic transmitter. In certain embodiments, a preferred arrangement includes 4 copies of magnetic sensors and/or acoustic sensors at different locations around and/or paired with each magnetic transmitter (shown in FIG. 9). A more preferred arrangement may include 8 copies of magnetic sensors and/or acoustic sensors at different locations around and/or paired with each magnetic transmitter (shown in FIG. 10). An even more preferred arrangement may include maximum copies of magnetic sensors and/or acoustic sensors with different sizes and at different locations around and/or paired with each magnetic transmitter. In certain embodiments, the application includes, but is not limited to, at least one horseshoe magnet with its two legs contacting the surface of interrogated material. In certain embodiments, the application includes, but is not limited to, at least one magnetic transmitter, and at least one of either magnetic sensor or acoustic sensor located at the center of the horseshoe magnets. In certain embodiments, the application includes, but is not limited to, an optional magnet or electromagnet to regulate the magnetization in the interrogated material. In certain embodiments, the application includes, but is not limited to, an optional magnet or electromagnet to provide DC magnetic field for magnetoacoustic response.

In certain embodiments, the application can include, but is not limited to, a computer-controlled automatic moving platform to move the magnetic transmitters, magnetic sensors and acoustic sensors to detect magnetic response or acoustic response at different spatial locations. In certain embodiments, the application can include, but is not limited to, a manually controlled translating and rotating platform to move the magnetic transmitters, magnetic sensors and acoustic sensors to detect magnetic response or acoustic response at different spatial locations. In certain embodiments, the application can include, but is not limited to, a handheld device that includes at least one magnetic transmitter and one magnetic sensor. In certain embodiments, interrogated sample in the application can include, but is not limited to, low-frequency heat-treated ERW pipes, low-frequency non-heat-treated ERW pipes, high-frequency heat-treated ERW pipes, and high-frequency non-heat-treated ERW pipes.

EXAMPLE EMBODIMENTS

A first embodiment of the invention is a method for determining material conditions of at least one hysteretic ferromagnetic material and/or at least one nonhysteretic material, wherein the method comprises: interrogating the hysteretic ferromagnetic material and/or the nonhysteretic material with an input time varying magnetic field; detecting a magnetic response and/or acoustic response over time from the hysteretic ferromagnetic material and/or the non-hysteretic material; determining a time dependent nonlinear characteristic of the received magnetic response and/or acoustic response; and correlating the time dependent non-linear characteristic of the received magnetic response and/or acoustic response to one or more material conditions of the material. Optionally, this embodiment can include one or more of the following: Element 1: wherein the interrogation magnetic field includes additional magnetic fields; Element 2: Element 1 and wherein the additional magnetic fields includes a constant DC magnetic field; Element 3: wherein the interrogation magnetic field includes a degaussing magnetic field; Element 4: wherein the one or more material conditions of the material is a material phase, and wherein the material includes at least one hysteretic ferromagnetic material; Element 5: wherein the one or more material conditions of the material is a material phase, and wherein the material includes at least one nonhysteretic material; Element 6: wherein the one or more material conditions of the material is the presence of a nonhysteretic material, and wherein the material includes at least one hysteretic ferromagnetic material; Element 7: wherein determining the time dependent non-linear characteristic includes performing a frequency domain analysis that includes power spectral density analysis of the received magnetic response and/or acoustic response to create power spectral density data; Element 8: Element 7 and wherein determining the time dependent non-linear characteristic includes determining one or more harmonic peak values of the power spectral density data; Element 9: Element 8 and wherein determining the one or more harmonic peak values includes determining one or more harmonic coefficients of the spectral density data; Element 10: Element 9 and wherein determining the one or more harmonic coefficients and/or peak values includes determining odd harmonic coefficients and/or peak values of the spectral density data; Element 11: Element 10 and wherein determining the odd harmonic coefficients and/or peak values includes determining 3rd and/or 5th harmonics of the spectral density data; Element 12: Element 11 and wherein correlating the time dependent nonlinear characteristic includes comparing and correlating the 3rd and/or 5th harmonics to the one or more material conditions; Element 13: Element 9 and wherein determining the one or more harmonic coefficients and/or peak values includes determining even harmonic coefficients and/or peak values of the spectral density data; Element 14: Element 13 and wherein determining the even harmonic coefficients and/or peak values includes determining 2nd harmonics of the spectral density data; Element 15: Element 14 and wherein correlating the time dependent nonlinear characteristic includes comparing and correlating 2nd harmonics to additional materials information including magnetization state of the materials and the pre-existing residual magnetization of the materials; Element 16: wherein the one or more material conditions include the presence of at least a material phase of the hysteretic ferromagnetic material and/or the nonhysteretic material; Element 17: wherein the hysteretic ferromagnetic material includes steel and wherein the material phase includes at least one of austenite, martensite, ferrite, pearlite, bainite, lath bainite, acicular ferrite, quasi-polygonal ferrite; Element 18: the method further comprising: wherein the one or more material conditions of the material are one or more first material conditions of the material; repeating the steps of interrogating, detecting, determining, and correlating with the input time varying magnetic field in a different configuration to produce one or more material second conditions of the material; and combining the one or more first material conditions and one or more material second conditions of the material to produce combined data set that represents the one or more material conditions; Example of combinations include, but are not limited to, Elements 1 and 3 in combination and optionally in further combination with Element 2; two or more of Elements 4-6 in combination; Element 7, Element 8, Element 10 (optionally one or both of Elements 11 and 12), Element 13 (optionally with one or both of Elements 14-15) in combination; Element 16 in combination with one or more of Elements 4-6 and optionally in further combination with Element 17; Elements 16 and 17 in combination; Element 18 in combination with one or more of Elements 1-17; and any combination thereof.

Another embodiment of the present invention includes a non-transitory computer readable medium, comprising instructions for performing the method of the first embodiment, optionally with one or more of Elements 1-18.

Yet another embodiment of the present invention includes a device for detecting material conditions of at least one hysteretic ferromagnetic material and/or at least one non-hysteretic material, wherein the device comprises: at least one magnetic transmitter configured to output an interrogation time varying magnetic field; at least one magnetic sensor and/or acoustic sensor configured to receive a magnetic response and/or acoustic response, and to convert the magnetic response and/or acoustic response into magnetic response signals and/or acoustic response signals; and a processor, configured to execute a method, the method comprising detecting the magnetic signals and/or acoustic response signals over time from at least one magnetic sensor and/or acoustic sensor; determining a time dependent non-linear characteristic of the magnetic signals and/or acoustic signals; and correlating the time dependent nonlinear characteristic of the magnetic signals and/or acoustic signals to one or more material conditions of the material. Optionally, this embodiment can include one or more of the following: Element 1; Element 2; Element 3; Element 4; Element 5; Element 6; Element 7; Element 8; Element 9; Element 10; Element 11; Element 12; Element 13; Element 14; Element 15; Element 16; Element 17; Element 18; Element 19: wherein the device includes an output device configured to indicate to a user the one or more conditions of the material; Element 20: Element 19 and wherein the device includes an indicator, which implies to notify one or more nearby users for appropriate immediate, real-time actions, and the users can directly observe the indicator; Element 21: Element 19 and wherein the device includes a device for communicating to users, which also implies notify users for appropriate immediate, real-time actions, but the users may be at a remote location, and the communication may through wired or wireless routes; Element 22: Element 19 and wherein the device includes a data collection and storage device for later retrieval and post-processing, which is not for immediate, real-time actions; Element 23: wherein the processes include determining and correlating a time dependent non-linear characteristic of the magnetic signals and/or acoustic signals is in real-time with a computer on board; Element 24: wherein the magnetic signals and/or acoustic signals are stored to a computer readable storage media for post processing steps including determining and correlating a time dependent non-linear characteristic of the magnetic signals and/or acoustic signals; Element 25: wherein the at least one magnetic sensor and/or acoustic sensor is 4 copies of magnetic sensors and/or acoustic sensors at different locations around and/or paired with each of the at least one magnetic transmitter; and Element 26: wherein the at least one magnetic sensor and/or acoustic sensor is 8 copies of magnetic sensors and/or acoustic sensors at different locations around and/or paired with each of the at least one magnetic transmitter. Example of combinations include, but are not limited to, Elements 1 and 3 in combination and optionally in further combination with Element 2; two or more of Elements 4-6 in combination; Element 7, Element 8, Element 10 (optionally one or both of Elements 11 and 12), Element 13 (optionally with one or both of Elements 14-15) in combination; Element 16 in combination with one or more of Elements 4-6 and optionally in further combination with Element 17; Elements 16 and 17 in combination; Element 18 in combination with one or more of Elements 1-17; one or more of Elements 1-18 in combination with one or more of Elements 19-26; Element 19 in combination with two or more of Elements 20-22 and optionally one or both of Elements 23-24; Element 25 and 26 in combination (e.g., two or more configurations of device implemented together such as in a tool); Element 25 and/or Element 26 in combination with one or more of Elements 1-24; and any combination thereof.

While the apparatus and methods of the subject disclosure have been shown and described with reference to embodiments, those skilled in the art will readily appreciate that changes and/or modifications may be made thereto without departing from the spirit and scope of the subject disclosure.

The invention claimed is:

1. A method for determining material conditions of at least one hysteretic ferromagnetic material and/or at least one nonhysteretic material, comprising:
   interrogating the hysteretic ferromagnetic material and/or the nonhysteretic material with an input time varying magnetic field;
   detecting a magnetic response and/or acoustic response over time from the hysteretic ferromagnetic material and/or the nonhysteretic material;
   determining a time dependent nonlinear characteristic of the received magnetic response and/or acoustic response; and
   correlating the time dependent nonlinear characteristic of the received magnetic response and/or acoustic response to one or more material conditions of the material, wherein the one or more material conditions of the material comprises a material phase, and wherein the material includes at least one hysteretic ferromagnetic material.

2. The method of claim 1, wherein the interrogation magnetic field includes additional magnetic fields.

3. The method of claim 2, wherein the additional magnetic fields includes a constant DC magnetic field.

4. The method of claim 1, wherein the interrogation magnetic field includes a degaussing magnetic field.

5. The method of claim 1, wherein the one or more material conditions of the material comprises the presence of a nonhysteretic material, and wherein the material includes at least one hysteretic ferromagnetic material.

6. The method of claim 1, wherein determining the time dependent non-linear characteristic includes performing a frequency domain analysis that includes power spectral density analysis of the received magnetic response and/or acoustic response to create power spectral density data.

7. The method of claim 6, wherein determining the time dependent non-linear characteristic includes determining one or more harmonic peak values of the power spectral density data.

8. The method of claim 7, wherein determining the one or more harmonic peak values includes determining one or more harmonic coefficients of the spectral density data.

9. The method of claim 8, wherein determining the one or more harmonic coefficients and/or peak values includes determining odd harmonic coefficients and/or peak values of the spectral density data.

10. The method of claim 9, wherein determining the odd harmonic coefficients and/or peak values includes determining 3rd and/or 5th harmonics of the spectral density data.

11. The method of claim 10, wherein correlating the time dependent nonlinear characteristic includes comparing and correlating the 3rd and/or 5th harmonics to the one or more material conditions.

12. The method of claim 7, wherein determining the one or more harmonic coefficients and/or peak values includes determining even harmonic coefficients and/or peak values of the spectral density data.

13. The method of claim 12, wherein determining the even harmonic coefficients and/or peak values includes determining 2nd harmonics of the spectral density data.

14. The method of claim 13, wherein the correlating the time dependent nonlinear characteristic includes comparing and correlating 2nd harmonics to additional materials information including magnetization state of the materials and the pre-existing residual magnetization of the materials.

15. The method of claim 1 further comprising:
   wherein the one or more material conditions of the material are one or more first material conditions of the material;
   repeating the steps of interrogating, detecting, determining, and correlating with the input time varying magnetic field in a different configuration to produce one or more material second conditions of the material; and
   combining the one or more first material conditions and one or more material second conditions of the material to produce combined data set that represents the one or more material conditions.

16. A non-transitory computer readable medium, comprising instructions for performing a method, the method comprising:
   interrogating a hysteretic ferromagnetic material and/or a nonhysteretic material with an input time varying magnetic field;
   detecting a magnetic response and/or acoustic response over time from magnetic sensors and/or acoustic sensors;
   determining a time dependent non-linear characteristic of the received magnetic response and/or acoustic response; and
   correlating the time dependent nonlinear characteristic of the received magnetic response and/or acoustic response to one or more material conditions of the material, wherein the one or more material conditions of the material comprises a material phase, and wherein the material includes at least one hysteretic ferromagnetic material.

17. The non-transitory computer readable medium of claim 16, wherein determining the time dependent non-linear characteristic includes performing a frequency domain analysis that includes power spectral density analysis of the received magnetic response and/or acoustic response to create frequency domain data that includes power spectral density data.

18. A device for detecting material conditions of at least one hysteretic ferromagnetic material and/or at least one nonhysteretic material, comprising:
    at least one magnetic transmitter configured to output an interrogation time varying magnetic field;
    at least one magnetic sensor and/or acoustic sensor configured to receive a magnetic response and/or acoustic response, and to convert the magnetic response and/or acoustic response into magnetic response signals and/or acoustic response signals; and
    a processor, configured to execute a method, the method comprising
        detecting the magnetic signals and/or acoustic response signals over time from at least one magnetic sensor and/or acoustic sensor;
        determining a time dependent non-linear characteristic of the magnetic signals and/or acoustic signals; and
        correlating the time dependent nonlinear characteristic of the magnetic signals and/or acoustic signals to one or more material conditions of the material, wherein the one or more material conditions of the material comprises a material phase, and wherein the material includes at least one hysteretic ferromagnetic material.

19. The device of claim 18, wherein the interrogation magnetic field includes additional magnetic fields.

20. The device of claim 19, wherein the additional magnetic fields include a constant DC magnetic field.

21. The device of claim 18, wherein the device includes an output device configured to indicate to a user the one or more conditions of the material.

22. The device of claim 18, wherein the at least one magnetic sensor and/or acoustic sensor is 4 copies of magnetic sensors and/or acoustic sensors at different locations around and/or paired with each of the at least one magnetic transmitter.

23. The device of claim 18, wherein the at least one magnetic sensor and/or acoustic sensor is 8 copies of magnetic sensors and/or acoustic sensors at different locations around and/or paired with each of the at least one magnetic transmitter.

* * * * *